United States Patent
Kreuger

(10) Patent No.: US 9,845,998 B2
(45) Date of Patent: Dec. 19, 2017

(54) THERMAL ENERGY STORAGE AND RETRIEVAL SYSTEMS

(71) Applicant: Sten Kreuger, Chonburi (TH)

(72) Inventor: Sten Kreuger, Chonburi (TH)

(*) Notice: Subject to any disclaimer, the term of this patent is extended or adjusted under 35 U.S.C. 154(b) by 0 days.

(21) Appl. No.: 15/369,200

(22) Filed: Dec. 5, 2016

(65) Prior Publication Data
US 2017/0219293 A1 Aug. 3, 2017

Related U.S. Application Data

(60) Provisional application No. 62/290,898, filed on Feb. 3, 2016.

(51) Int. Cl.
| | |
|---|---|
| *F01K 3/00* | (2006.01) |
| *F28D 15/00* | (2006.01) |
| *F28D 15/02* | (2006.01) |
| *F28D 20/00* | (2006.01) |
| *F24J 2/34* | (2006.01) |
| *F03G 6/00* | (2006.01) |
| *F01K 3/12* | (2006.01) |

(52) U.S. Cl.
CPC ............... *F28D 15/00* (2013.01); *F01K 3/12* (2013.01); *F03G 6/003* (2013.01); *F24J 2/345* (2013.01); *F28D 15/02* (2013.01); *F28D 15/0266* (2013.01); *F28D 20/00* (2013.01); *F01K 3/00* (2013.01)

(58) Field of Classification Search
CPC . F01K 3/00; F01K 3/12; Y02E 60/142; Y02E 10/46

USPC ................................................. 60/652, 659
See application file for complete search history.

(56) References Cited

U.S. PATENT DOCUMENTS

| | | | |
|---|---|---|---|
| 938,309 A | 10/1909 | Ferranti | |
| 1,615,003 A | 1/1927 | Bottomley et al. | |
| 1,781,368 A | 11/1930 | Davidson | |
| 2,964,910 A | 12/1960 | Sonnefeld | |
| 3,681,920 A | 8/1972 | Margen | |
| 3,979,914 A | 9/1976 | Weber | |
| 4,089,744 A * | 5/1978 | Cahn ..................... | F01K 3/00 |
| | | | 376/322 |
| 4,285,203 A * | 8/1981 | Vakil ..................... | F01K 23/04 |
| | | | 60/652 |
| 4,557,112 A * | 12/1985 | Smith ..................... | F01K 7/00 |
| | | | 60/651 |
| 5,421,157 A | 6/1995 | Rosenblatt | |
| 8,572,968 B2 | 11/2013 | Schaal | |
| 2005/0103465 A1* | 5/2005 | Brasz ..................... | F01K 25/08 |
| | | | 165/61 |

(Continued)

*Primary Examiner* — Justin Jonaitis
*Assistant Examiner* — Eric Ruppert
(74) *Attorney, Agent, or Firm* — Andrew D. Fortney; Central California IP Group, P.C.

(57) ABSTRACT

A thermal energy storage and retrieval device includes at least one working fluid and a plurality of thermodynamic circuits. Each thermodynamic circuit has a first process exchanging heat with a first material in a first temperature range common for all of the thermodynamic circuits. Each thermodynamic circuit also has a second process exchanging heat with a second material in a second temperature range. The second material comprises a heat storage material or a working fluid in another circuit or another device. Each thermodynamic circuit includes a gas pressure changing device and a liquid pressure changing device.

19 Claims, 43 Drawing Sheets

CHARGING ⟶
DISCHARGING ⟶

(56) References Cited

U.S. PATENT DOCUMENTS

| | | | |
|---|---|---|---|
| 2011/0100611 A1* | 5/2011 | Ohler | F01K 3/00 |
| | | | 165/104.28 |
| 2013/0205778 A1* | 8/2013 | Hansen | F24J 2/045 |
| | | | 60/641.8 |
| 2014/0060051 A1* | 3/2014 | Ohler | F01K 3/12 |
| | | | 60/652 |
| 2015/0260463 A1* | 9/2015 | Laughlin | F02C 1/10 |
| | | | 165/10 |

* cited by examiner

THERMAL ENERGY STORAGE AND RETRIEVAL SYSTEMS

RELATED APPLICATION(S)

The present application claims priority to U.S. Provisional Pat. Appl. No. 62/290,898, filed Feb. 3, 2016, incorporated herein by reference in its entirety.

FIELD OF THE INVENTION

The present invention generally relates to the field of thermal energy storage and retrieval systems and methods of making and using the same. More specifically, embodiments of the present invention pertain to a thermal energy storage and retrieval device that has wide operating temperature and/or pressure range(s), using any of a variety of working and/or heat storage fluids and fluid mixtures, and that includes a plurality of thermodynamic circuits, each of which has first and second phase change processes. The present thermal energy storage and retrieval device can provide energy storage for commercial PV power plants and wind turbines, for example.

DISCUSSION OF THE BACKGROUND

A crucial element in sustainable energy supply is energy storage. Batteries are relatively expensive and have short life-span, and they can consume valuable natural resources. They are used for very small installations, when no other choice is available. In large-scale power generation, usually only concentrating solar power (CSP) plants have energy storage because they can be easily charged with solar heat. In large-scale CSP plants, molten salt is used (e.g., at Andasol in Spain and at Crescent Dunes in Nevada) for storage of heat from very large solar concentrating installations.

Photovoltaic (PV) collectors are cheap and easy to install, and require less monitoring and maintenance than CSP plants. This is important for small and medium size installations.

Wide-temperature range (e.g., gradient) heat storage is a very efficient way of storing energy. A trilateral cycle is a very efficient cycle for charging and discharging a gradient heat storage device or unit. Trilateral cycles have (1) a high-temperature, high-pressure, isobaric gradient process, (2) a gas pressure-changing process, (3) a low-temperature, isothermal, low-temperature isobaric process and (4) a liquid pressure-changing process.

Working fluids for trilateral cycles can be classified in three categories, depending on the slope of the saturation vapor curve on a TS diagram. The fluids may be classified as wet, isentropic or dry. Water and ammonia are wet fluids with a negative dT/ds slope, trichlorofluoromethane (R11) is isentropic with a vertical slope (infinite dT/ds), and some organic Rankine cycle (ORC) fluids such as pentane are considered dry and have a positive dT/ds slope.

Traditionally, a trilateral cycle may be made in one of three different ways, but each has at least one disadvantage. For example, disadvantages of a transcritical trilateral cycle (e.g., using carbon dioxide as a working fluid) include nonlinearity and very high pressures. Disadvantages of an ORC cycle is the fixed top temperature and the narrow temperature range. Wet subcritical trilateral flash cycles are not reversible.

A thermoelectric energy storage device that uses environmental air as the low-temperature heat source/sink is bulky and has low efficiency because of losses in the heat transfer to the air. In that case, a combined cycle with both high- and low-temperature heat storage may be useful. If abundant water is available, then a single trilateral cycle is efficient. However, this may not be the case in a city or a desert.

Increasing the efficiency of a Rankine cycle by preheating the feed water with steam tap is a 100-year-old technology having different names in the literature. It is called feed water heating or preheating in U.S. Pat. Nos. 938,309 and 8,572,968, steam tap in U.S. Pat. No. 1,781,368, steam-bleed in U.S. Pat. No. 1,615,003, regenerative Rankine or Rankine recuperator in U.S. Pat. No. 5,421,157, Carnotization of steam cycle in U.S. Pat. No. 2,964,910, multi-stage heat recovery in U.S. Pat. No. 3,681,920, and partly expanded steam in U.S. Pat. No. 3,979,914. A Rankine cycle with steam tap is not reversible, and has a fixed relation between heat absorbed from an isothermal source and heat rejected to an isothermal sink.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to thermal energy storage and retrieval systems and devices. The present thermal energy storage and retrieval device includes at least one working fluid and a plurality of thermodynamic circuits. Each thermodynamic circuit has a first process exchanging heat with a first material in a first temperature range common for all of the thermodynamic circuits (i.e., the first process in each thermodynamic circuit is in the same temperature range). Each thermodynamic circuit also has a second process exchanging heat with a second material in a second temperature range. The second material comprises a heat storage material or a working fluid in another circuit or another device. The second temperature ranges of the thermodynamic circuits may be different for each thermodynamic circuit, but may constitute together a continuous temperature range in which the device exchanges heat with the second material. Each thermodynamic circuit includes a gas pressure changing device and a liquid pressure changing device. Each thermodynamic circuit in the device may have a third process and a working fluid, and the second material may further include the working fluid in the third process in the same thermodynamic circuit or a different thermodynamic circuit in the device. The working fluid may also function as a heat storage material.

In one embodiment, the present device operates as a heat pump, and the first process occurs at a temperature that is lower than that at which the second process occurs, in which case the second material may include a warm heat energy storage material. Alternatively, the first process occurs at a temperature that is higher than that at which the second process occurs, in which case the second material may include a cold heat energy storage material. In a further alternative, the device operates as a heat engine, and the first process occurs at a temperature that is lower (or higher) than that at which the second process occurs. In further embodiments, the present device is reversible, and works as a heat pump in a forward (or charging) mode and as a heat engine in a reverse (or discharging) mode.

In some embodiments, at least two (e.g., all) of the thermodynamic circuits include the working fluid, and the first material may be a heat collection material, a heat storage material, or a working fluid in another device or another thermodynamic circuit. Alternatively or additionally, the second material may be a heat storage material or a working fluid in another device or another thermodynamic circuit.

In some embodiments, the device is a (sliced) Rankine cycle and/or a vapor compression cycle, and the (sliced) Rankine cycle and/or vapor compression cycle may include one or both of the first and second processes. In such embodiments, the first material may be a heat collection material, a heat storage material or a working fluid, and the Rankine cycle and/or vapor compression cycle is/are regenerative.

Other or further embodiments of the present invention relate to a combined device, comprising first and second devices, each having at least one working fluid, and at least one of which is the present device (e.g., described above in this Summary). In some embodiments, each thermodynamic circuit in the other device has (i) a third process exchanging heat with the first process and (ii) at least one fourth process exchanging heat with a third material. The thermodynamic circuits in the other device may also include a gas pressure changing device and a liquid pressure changing device. In various examples of the combined device, the first and second devices operate as heat pumps or as heat engines, the first process occurs at a temperature that is lower than that at which the second process occurs, and the third process occurs at a temperature that is higher than that at which the fourth process occurs. In some embodiments, the combined device is reversible, and works as a combined heat pump in a forward mode and as a combined heat engine in a reverse mode. In other examples, the thermodynamic circuit(s) of the first and second devices have a high pressure side, the second process also exchanges heat in an adjacent temperature range with a first liquid line (or gradient process) on the high pressure side of another of the thermodynamic circuits (e.g., in the first device), and the fourth process also exchanges heat in an adjacent temperature range with a second liquid line (or gradient process) on the high pressure side of another of the thermodynamic circuits (e.g., in the second device).

Alternatively, the first and third processes in the combined device may exchange heat with an intermediary thermodynamic cycle, in which case the combined device may further include the intermediary thermodynamic cycle. The intermediary thermodynamic cycle may comprise a plurality of thermodynamic circuits, each having a fifth process that exchanges heat with one of the first and third processes, and one of which has a sixth process that exchanges heat with the other of the first and third processes. When the first and second devices respectively exchange heat with first and second heat storage systems operating in non-overlapping temperature ranges, the intermediary thermodynamic cycle may advantageously transfer heat at one temperature or temperature span to another temperature or temperature span that is more suitable to match the heat storage liquid(s).

In a further alternative, the combined device may comprise the present device and a trilateral cycle having an isothermal process, and the first process exchanges heat with the isothermal process. In various examples, the present device and the trilateral cycle operate as heat engines or heat pumps, and the first process occurs at a temperature that is higher than that at which the second process occurs. When the present device operates as a heat engine, the first process may occur at a temperature that is higher than that at which the second process occurs. When the device operates as a heat pump, the trilateral cycle may also operate as a heat pump, and the first process occurs at a higher temperature than the second process. In any case, the thermodynamic circuits in the device have a high pressure side, and the second process in one or more of the thermodynamic circuits also exchanges heat in an adjacent temperature range with a liquid line on the high pressure side of the same or another of the thermodynamic circuits. Additionally or alternatively, the trilateral device may have a high pressure gradient process that exchanges heat with a heat storage material, and the heat storage material may comprise a gas, liquid or solid heat storage material.

The trilateral cycle may include an isothermal phase change process, and the first material is a working fluid in the isothermal phase change process(es). In further embodiments, the trilateral cycle may be a transcritical cycle, in which case the working fluid may comprise carbon dioxide. Alternatively, the trilateral cycle may comprise a flash cycle (e.g., an organic Rankine cycle [ORC] or a steam flash cycle).

In some embodiments, at least one of the thermodynamic circuits may be a closed loop, the first and/or second materials may comprise a gas or liquid heat storage material, and/or the working fluid in the present device functions as a working fluid in each of the thermodynamic circuits and as a heat storage material. In other or further embodiments, each of the thermodynamic circuits includes a desuperheating process. The desuperheating process may comprise liquid injection in the gas pressure changing device or before the gas pressure changing device.

In some embodiments, the working fluid comprises a zeotropic mixture (e.g., a mixture of condensable fluids with a characteristic ["gliding"] condensation temperature curve in an isobaric phase change process). In such embodiments or other embodiments, the working fluid may comprise ammonia, water, carbon dioxide, butane, cyclohexane or toluene. Also, the heat storage fluid may comprise a mixture of ammonia and water, a brine, a mixture of glycol and water, or glycerol.

In other embodiments, the first process comprises solar heat absorption in the first temperature range, and the device works as a heat pump configured to charge a heat storage material in a temperature range higher than the first temperature range. Alternatively, the device works as a heat engine configured to charge a heat storage material in a temperature range lower than the first temperature range. One of the first and second processes may comprise a heat-exchanging evaporation or condensation process. In some embodiments of the present device, work from the heat engine drives a heat pump configured to charge a heat storage material over a temperature range that includes the second temperature.

The present invention facilitates energy storage, for example, for PV power plants and wind turbines. The flexibility of the operating temperature range(s), the operating pressure range(s), the working fluids and heat storage fluids, and device reversibility makes it valuable in wide-temperature range heat energy storage systems.

The present invention can use many different liquids in a gradient heat storage cycle. For example, the heat storage liquid may comprise a liquid metal mixture. Unlike a steam tap cycle, the sliced cycle(s) in the present invention are reversible, and can also change the relation between the flows in the different circuits of the sliced cycle, depending on how much heat is taken out from or supplied to the gradient process(es). A sliced cycle can also compensate for non-linear behavior of a liquid (e.g., a heat storage liquid).

Sliced thermodynamic cycles such as the sliced Rankine cycles as disclosed herein open up a number of options to combine different fluids in the system and optimize pressure conditions for the most effective thermal energy storage and retrieval and to make the cycles reversible. It is accordingly possible to have a top (e.g., high-temperature) cycle with liquid metal as a working fluid, a bottom (e.g., low-temperature) cycle with liquid air as a working fluid, optionally with one or more intermediary cycles. Furthermore, energy storage as heat can be implemented either as hot and cold storage subsystems, or as hot or cold storage subsystems that use an internal or external environment (e.g., outdoor air, a lake, ocean, sea, river, home, office building, warehouse, arena, etc.) as a heat source and/or heat sink. Devices including these sliced thermodynamic cycles may be termed "STEN" (Sliced Thermodynamic ENgine) devices, although the terminology "STEN" and "sliced thermodynamic engine" is intended merely as a label for the devices, and not as a limiting description of the devices. For example, a STEN device may be a sliced thermodynamic cycle of any kind or type (e.g., a heat engine and/or a heat pump).

DETAILED DESCRIPTION

Examples of various embodiments of the invention are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. Thus, based on the described embodiments of the present invention, other embodiments can be obtained by one skilled in the art without creative contribution and are in the scope of legal protection given to the present invention. In other instances, well-known methods, procedures, components, and materials have not been described in detail so as not to unnecessarily obscure aspects of the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "connected to," "coupled with," "coupled to," and "in communication with" may be used interchangeably and may refer to direct or indirect connections, couplings or communications, and use of one of these terms will generally include the others unless the context of use clearly indicates otherwise, but these terms are generally given their art-recognized meanings. Similarly, the terms "system" and "device" may be used interchangeably, and use of one of the terms will generally include the other unless the context of use clearly indicates otherwise. Also, a "gas" refers to a material or substance that is in the gas phase at temperatures of the processes in which it participates, and a "liquid" refers to a material or substance that is in the liquid phase at temperatures of the processes in which it participates. For the sake of convenience, a reversible Rankine cycle may be or comprise a Rankine heat pump cycle in one mode or direction, and a vapor compression cycle in a different mode or opposite direction.

The invention, in its various aspects, will be explained in greater detail below with regard to exemplary embodiments.

Exemplary Energy Conversion and Heat Storage and Retrieval Devices

Figure 1:
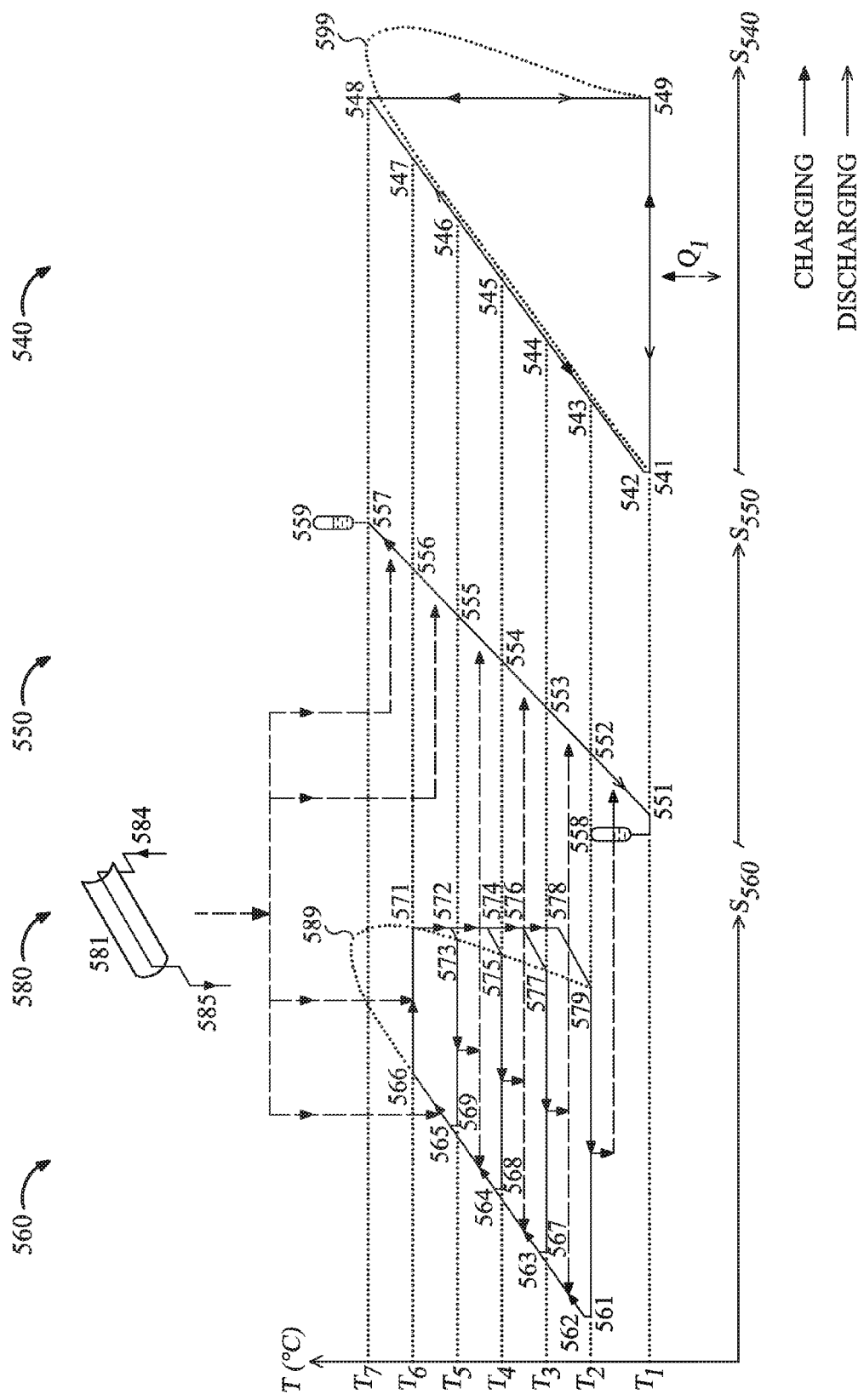
FIG. 1 shows a TS diagram illustrating the charging and discharging cycles of a sliced Rankine heat engine cycle and a trilateral cycle, in conjunction with a thermal energy storage and retrieval subsystem according to one or more embodiments of the present invention.

FIG. 1 is a TS diagram of a Rankine heat engine cycle 560 (i.e., an exemplary STEN device) with a trilateral cycle 540, in conjunction with thermal energy storage and retrieval system 550 and a solar heat collecting system 580.

The Rankine cycle 560 (e.g., a sliced Rankine cycle) is a heat engine. A pumping process occurs at each of 561-562, 567-563, 568-564 and 569-565. Gradient heat absorption processes occur at 562-566. An isothermal heat absorption occurs at 566-571. Adiabatic expansion processes (e.g., from a turbine) occur at various points and at various (e.g., successively lower) pressures at 571-572, 571-574, 571-576, and 571-578. An isothermal evaporation process with heat absorption occurs at 566-571. Isothermal or substantially isothermal condensation processes with heat rejection occur at various different pressures and temperatures (e.g., successively lower temperatures) at 572-569, 574-568, 576-567, and 578-561. Heat from the solar collector 580 is transferred via the heat collection material therein to the evaporator at 566-571, to the Rankine working fluid at 565-566, and to the heat storage fluid at 556-557 and 555-556. Heat from the condensation process at 572-569 is transferred to the heat storage fluid at 554-555 and to the working fluid at 564-565. Heat from the condensation process at 574-568 is transferred to the heat storage fluid at 553-554 and to the working fluid at 563-564. Heat from the condensation process at 576-567 is transferred to the heat storage fluid at 552-553 and to the working fluid at 562-563. Heat from the condensation process at 578-561 is transferred to the storage fluid at 551-552.

The thermal energy storage and retrieval system 550 transfers heat to the trilateral cycle 540 in discharging mode, and transfers heat from the Rankine cycle 560 and the solar collector 580 and optionally also from the trilateral cycle 540 in charging mode to a heat storage medium between the tanks 558 and 559.

In discharging mode, the trilateral cycle 540 is a heat engine. A pumping process occurs at 541-542. Gradient heat absorption processes occur at 542-543, 543-544, 544-545, 545-546, 546-547 and 547-548, respectively, in which heat is transferred from the heat storage. An adiabatic expansion process occurs at 548-549. An isothermal heat rejection process occurs at 549-541, in which heat is rejected (e.g., to an internal or external environment) at temperature $T_1$.

In charging mode, the trilateral cycle 540 is a heat pump. An adiabatic compression process occurs at 549-548. Gradient heat rejection processes occur at 548-547, 547-546, 546-545, 545-544, 544-543 and 543-542, respectively, that transfer heat to the heat storage subsystem 550. An adiabatic expansion process occurs at 542-541. An isothermal heat absorption process occurs at 541-549, absorbing heat (e.g., from the internal or external environment) at temperature $T_1$.

Figure 2:
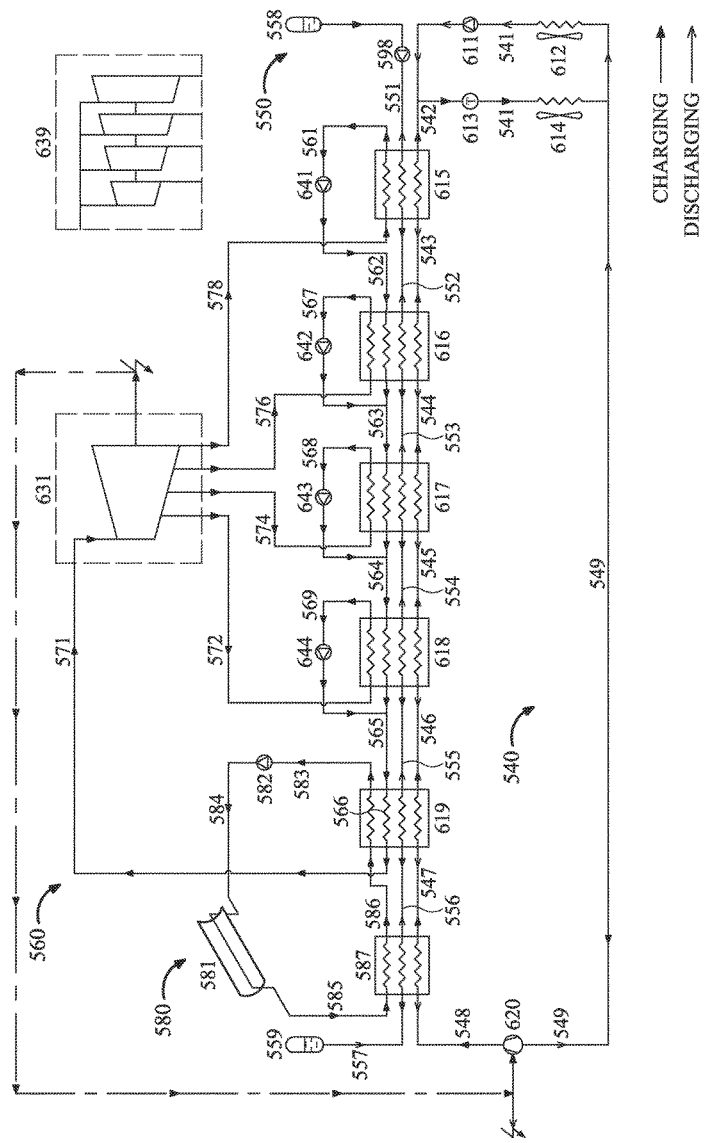
FIG. 2 shows a layout (or outlay) of a wide-temperature range, pumped heat storage device with a cycle for recovering energy while distributing the charging solar heat over a wide temperature range and supplying the recovered energy to a reversible trilateral organic Rankine cycle (ORC) cycle that implements the TS diagram of FIG. 1, in which both cycles have a common fluid and common circuits.

FIG. 2 shows a layout of an exemplary energy storage and retrieval system depicted in the TS diagram of FIG. 1, implementing the heat storage system 550, the exemplary STEN device (Rankine heat engine cycle) 560, the trilateral cycle 540 and the solar heat collecting system 580. The system is powered by the solar heat collecting system 580. In charging mode, at least the heat engine cycle 560 and the heat storage system 550 are operating, and in discharging mode, at least the heat storage system 550 and the trilateral cycle 540 are operating. Optionally, in charging mode, the trilateral cycle 540 may support extra charging of the heat storage system 550. The layout of FIG. 2 shows a wide-temperature range, pumped heat storage device with a cycle for recovering energy while supplying recovered energy to a reversible triilateral organic Rankine cycle (ORC). The advantage of an ORC is that the adiabatic process(es) can be vertical or close to vertical in the TS diagram (see, e.g., FIG. 1) to get the entropy changes as low as possible when using an organic working fluid.

The trilateral cycle 540 is always utilized in discharging mode. In charging mode, the power generated by the sliced Rankine cycle 560 can be used for power demand/marketing or to power the trilateral cycle 540 for extra heat generation to be stored in the heat storage and retrieval subsystem 550 for later use, depending on the demand.

The sliced Rankine cycles 560, when operating together with a solar collector such as collector 581, work as heat engines in charging mode, and generate both heat and power. When the solar energy collector 581 is included as heat in (e.g., Qin), it can appear as heat out (e.g., Qout) from the system in discharging mode (i.e., that does not go into heat storage).

In charging mode, the solar collecting cycle 580 collects the heat in the collector 581 by heating a solar working fluid at 584-585. The solar working fluid flows through a first heat exchanger 587, transferring heat from the solar working fluid at 585-586 to the heat storage liquid at 556-557. The solar working fluid then passes through the heat exchanger

619, where heat is transferred to the heat storage liquid at 555-556 and to the working fluid of the Rankine cycle 560 at 565-571. The pump 582 pumps and regulates the flow of the solar working fluid in the solar collecting cycle 580. The pump 598 pumps and regulates the flow and the flow direction of the heat storage liquid.

In discharging mode, the trilateral cycle 540 is a heat engine. Starting at 541, a pump 611 pumps the working fluid at 541-542. The relatively hot storage fluid in the heat storage and retrieval system 550 exchanges heat with the working fluid in the heat exchangers 615, 616, 617, 618, 619 and 587, respectively, as it flows from a warm tank 559 to a cool tank 558. At 548-549, an expander 620 expands the hot high-pressure working fluid. Mechanical energy may be retrieved or recovered during the expansion process. The low-temperature condensing process 549-541 in the condenser 612 of the trilateral heat engine cycle rejects heat isothermally at a temperature $T_1$ (see FIG. 1) to the environment (e.g., outdoor air, a pond or a lake in a warm climate or to an indoor environment such as a home or office building in a cold climate). The thermal energy storage and retrieval system 550 exchanges heat with the trilateral cycle 540 in the heat exchangers 615, 616, 617, 618, 619 and 587, respectively, across a temperature gradient at 557-551 (or 551-557 in the reverse cycle in a charging mode).

The trilateral cycle 540 is reversible and functions as a heat pump in charging mode with a constant temperature heat source and a gradient heat sink (i.e., the heat storage and retrieval system). In the charging mode, starting at 541, the working fluid absorbs heat isothermally at 541-549 from a heat source via the heat exchanger 614, and then is compressed adiabatically by compressor 620 at 549-548. The working fluid rejects heat to the heat storage fluid in the heat storage system in the heat exchangers 587, 619, 618, 617, 616 and 615, respectively. At 542-541, the high-pressure working fluid either passes through a JT valve (not shown) or drives a turbine 613. The turbine 613 may recover or retrieve mechanical and/or electrical energy. The trilateral heat pump cycle, low-temperature evaporation process 541-549 in the heat exchanger (evaporator) 614 absorbs heat isothermally at a temperature $T_1$ (see FIG. 1), like from an indoor environment in a warm climate or from an external environment (e.g., outdoor air, a sea, pond ocean or lake, etc.) in a cold climate.

The sliced Rankine cycle 560 is a heat engine and operates only in the charging mode. The sliced Rankine cycle 560 includes a combination of cycles that has a heat and power transfer (e.g., a heat transfer function and a power transfer function) that provides behavior and/or functions like that of an inverted trilateral cycle. In general, an inverted trilateral cycle has (i) a low-temperature, low-temperature, isobaric gradient process, (ii) a gas pressure-changing process, (iii) a high-temperature, isothermal, high-pressure isobaric process and (iv) a liquid pressure-changing process. A combined trilateral and inverted trilateral cycle with the isothermal processes in each cycle exchanging heat has the same properties as a Brayton cycle, but with higher round trip efficiency. This is useful, for example, in thermoelectric energy storage devices, in which energy storage over a wide temperature range or gradient is desirable.

The sliced Rankine cycle 560 includes a plurality of pumps 641, 642, 643 and 644, a plurality of heat exchangers 615, 616, 617, 618 and 619, and an expander or turbine 631 (e.g., a multi-stage expander or turbine), where expansions occur in more than one step. In this example, expansions occur in four steps. The expansion steps can be in series or, as in this example, in parallel (see multi-stage expander/turbine 639 in FIG. 2). The pumps 641, 642, 643 and 644 pump the condensed working fluid from the low-temperature side to the high pressure side of the cycle. Starting at 561, the pump 641 pumps the condensed working fluid from 561 to 562 and further on, passing the heat exchangers 616, 617, 618 and 619 from 562 to 566, where the working fluid is pre-heated and thereby absorbing heat. At 566-571, the working fluid absorbs sufficient heat in the heat exchanger 619 to evaporate. In a similar way, the condensed working fluid pumped by the pumps 642, 643 and 644 are preheated up to the point 566 in the heat exchanger (evaporator) 619, where after the evaporation occurs. The working fluid then enters the expander (turbine) 631 at 571. After each expansion step in the expander (turbine) 631/639, each portion of the working fluid condenses in the heat exchangers 618, 617, 616 and 615 at 572-569, 574-568, 576-567 and 578-561, respectively. The condensing working fluid simultaneously heats the storage fluid at 551-555 and pre-heats the working fluid at 562-565. The storage fluid circuit 551-556 may absorb additional heat from the high pressure rejection process 547-546-545-544-543-542 from the trilateral cycle 540 in heat pump mode.

Solar heat is introduced in an intermediary isothermal evaporation process (e.g., 563-577, 564-575, or 565-573) in the sliced Rankine cycle 560.

The Rankine cycle 560 and/or the trilateral cycle 540 operate together with the heat storage system 550, depending on the load demand. The Rankine cycle 560 always operates during daytime, and as a heat engine. The heat storage system 550 can always operate. It operates in charging mode by storing heat and in discharging mode by transferring heat to the trilateral cycle 540 when the trilateral cycle 540 operates in heat engine mode. At a normal daytime load, if half or about half of the energy is stored and half or about half of the energy is consumed, then only the Rankine cycle 560 operates. At a low daytime load (e.g., on the weekend), more energy may be stored by letting the trilateral cycle operate as a heat pump, driven by the Rankine cycle 560 (e.g., turbine 631). During a high daytime load, if all or substantially all of the energy generated by the turbine 631 is consumed, then both the Rankine cycle 560 and the trilateral cycle 540 can operate in heat engine mode. During the night-time, the Rankine cycle 560 does not operate, and the trilateral cycle 540 operates in heat engine mode.

Figure 3:
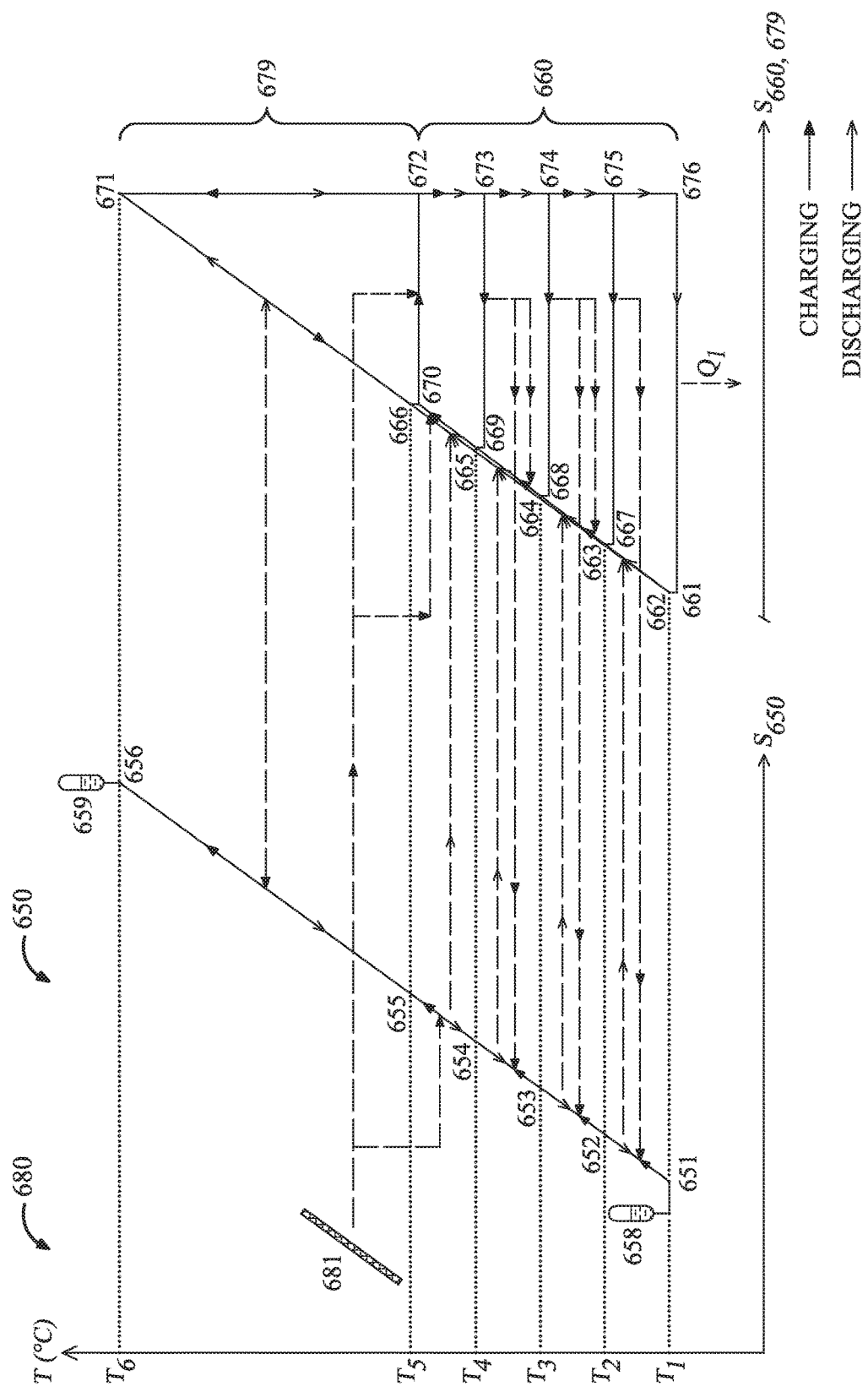
FIG. 3 shows a TS diagram illustrating the charging and discharging modes of a Rankine heat engine sub cycle, a trilateral inverted sliced heat engine sub cycle and a trilateral heat pump sub cycle, in conjunction with a thermal energy storage and retrieval subsystem according to one or more embodiments of the present invention.

FIG. 3 is a TS diagram of a combined cycle comprising a Rankine heat engine cycle 660 (e.g., another STEN device) and a trilateral cycle 679, in conjunction with a thermal energy storage and retrieval system 650. The system of FIG. 3 collects heat from the sun in the charging mode within a limited temperature span in the operating temperature range (e.g., in the middle of the operating temperature range) of the thermal energy storage and retrieval system 650, but transfers the heat to a heat storage medium in the thermal energy storage and retrieval system 650 over a wide temperature span. In discharging mode, the trilateral cycle is expanded to cover the full temperature range of the combined Rankine cycle 660 and trilateral cycle 679 to retrieve the stored heat energy. The Rankine cycle 660 does not operate in the discharging mode.

The Rankine cycle 660 (e.g., a sliced Rankine cycle) is a heat engine and operates as such in the charging mode. Pumping processes occur at 667-663, 668-664, and 669-665. Gradient heat absorption processes occur at 663-664, 664-665, and 665-670. An isothermal heat absorption process occurs at 670-672. Adiabatic expansion processes (e.g., from a turbine) occur at 672-673, 672-674 and 672-675, and start at a common point (e.g., at 672) and end at various different temperatures and pressures (e.g., successively decreasing pressures). An isothermal evaporation process with heat absorption occurs at 670-672. Isothermal or substantially isothermal condensation processes with heat rejection occur at various different temperatures and pressures (e.g., successively lower temperatures and, in most cases, successively decreasing pressures) at 673-669, 674-668 and 675-667. Heat from the solar collector 680 is transferred to the working fluid (evaporator) at 670-672, to the working fluid at 665-670, and to the heat storage fluid at 654-655. Heat from the condensation process at 673-669 is transferred to the heat storage fluid at 653-654, and to the working fluid at 664-665. Heat from the condensation process at 674-668 is transferred to the heat storage fluid at 652-653, and to the working fluid at 663-664. Heat from the condensation process at 675-667 is transferred to the heat storage fluid at 651-652.

In charging mode, the trilateral cycle 679 defined by 670-672-671-666-670 is a heat pump. An isothermal heat absorption process occurs at 670-672. An adiabatic compression process occurs at 672-671. A gradient heat rejection process occurs at 671-666. An adiabatic expansion process occurs at 666-670. The heat is absorbed in the isothermal process 670-672 and heat is transferred at 671-666 to the heat storage liquid at 655-656 at matching temperatures within the $T_5$-$T_6$ temperature span.

The trilateral charging cycle 679 is defined by the processes at 670-672-671-666-670. However, the trilateral discharging cycle 679 is expanded to include the temperature span $T_6$-$T_1$ and is defined by the processes at 661-662-663-664-665-666-671-676-661, and thus, may be identified as an "expanded trilateral cycle 679" or "trilateral heat engine cycle 679."

The thermal energy storage and retrieval system 650 transfers heat to the expanded trilateral discharging cycle 679 in discharging mode, and absorbs heat from the Rankine cycle 660, the solar collector 680, and the trilateral charging cycle 679 in charging mode. In the discharging mode, the heat is transferred from a heat storage medium or liquid moving from the tank 659 (for the hot heat storage liquid; see FIG. 4) to the tank 658 (for the cold heat storage liquid; see FIG. 4), and in the charging mode, the heat is transferred to the heat storage medium or liquid between the tank 658 (for the cold heat storage liquid) and the tank 659 (for the hot heat storage liquid).

In discharging mode, the expanded trilateral cycle 679 is a heat engine. A pumping process occurs at 661-662. Gradient heat absorption processes occur at 662-663, 663-664, 664-665, 665-666, and 666-671, respectively. An adiabatic expansion process occurs at 671-676. An isothermal heat rejection process occurs at 676-661, where heat is rejected at a temperature $T_1$.

Figure 4:
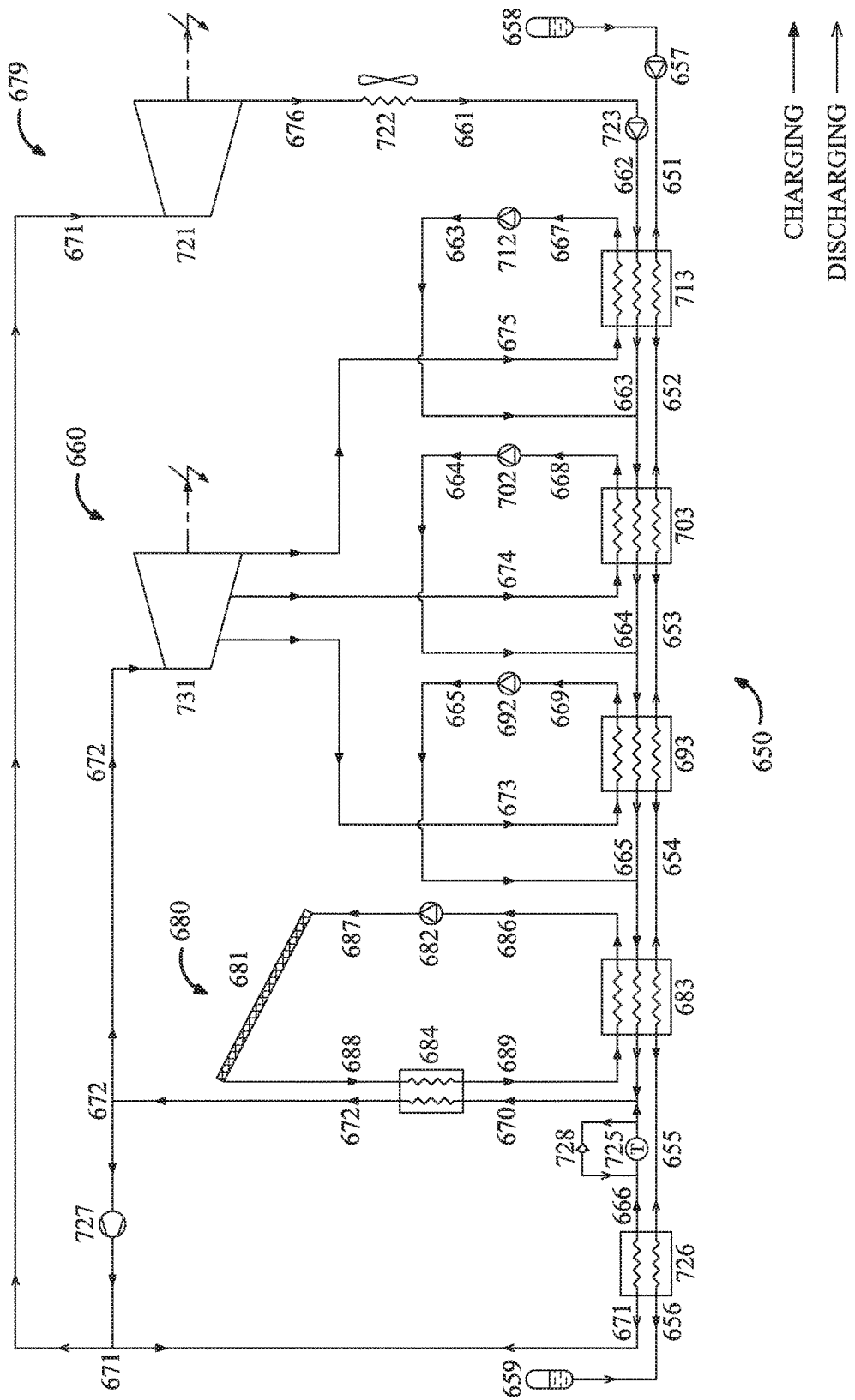
FIG. 4 shows a layout (or outlay) of a wide-temperature range, pumped heat storage device with a high reversible trilateral ORC cycle and a sliced cycle that implements the TS diagram of FIG. 3, with a common fluid and common circuits.

FIG. 4 shows a layout of an exemplary energy storage and retrieval system depicted in the TS diagram of FIG. 3, implementing the heat storage system 650, the exemplary STEN device (Rankine heat engine cycle) 660 and the trilateral heat pump cycle 679, as well as the expanded trilateral cycle or heat engine cycle 679 defined by 661-662-671-676-661. The system is powered by the solar heat collecting system 680. The Rankine cycle 660 operates in charging mode and as a heat engine. The trilateral heat pump cycle 679 defined by 670-672-671-666-670 operates in charging mode, and the expanded trilateral heat engine cycle 679 operates in discharging mode.

In charging mode, both the Rankine cycle 660 and the trilateral heat pump cycle 679 transfer heat to the heat storage system 650. In discharging mode, heat transfers from the heat storage system 650 to the trilateral heat engine cycle 679, and the Rankine heat engine cycle 660 is switched off.

In the charging mode, the solar collecting cycle 680 collects the heat in the collector 681 (FIG. 4) by heating a solar working fluid at 687-688. The solar working fluid flows through heat exchanger 684 at 688-689, and transfers heat to the trilateral heat pump cycle 679, and the Rankine heat engine cycle 660 at 670-672, then flows through heat exchanger 683 at 689-686 where heat transfers to the Rankine heat engine cycle 660 at 665-670, and to the heat storage liquid at 654-655. The pump 682 pumps and regulates the flow of the solar working fluid in the solar heat collecting cycle 680. The pump 657 pumps and regulates the flow, and the flow direction of the heat storage liquid.

The Rankine heat engine cycle 660 is a sliced Rankine cycle, and operates only in the charging mode. The Rankine heat engine cycle 660 has a heat and power transfer similar or identical to that of an inverted trilateral cycle. The Rankine heat engine cycle 660 includes a plurality of pumps 692, 702 and 712, a plurality of heat exchangers 683, 684, 693, 703 and 713, and an expander or turbine 731 (e.g., a multi-stage expander or turbine), where expansions occur in more than one step. In the example of FIG. 4, expansions occur in three steps. The expansion steps can be in parallel or, as in this example, in series. The pumps 712, 702, and 692 pump the condensed working fluid from the low-temperature side to the high-pressure side of the cycle. Starting at 667, the pump 712 pumps the condensed working fluid from 667 to 663, and further on, passing the heat exchangers 703 and 693 from 663 to 665, where the working fluid is pre-heated, and thereby absorbing heat. In heat exchanger 683, the working fluid absorbs heat from the solar heat collecting system 680 at 665-670, and in heat exchanger (evaporator) 684, further heat absorption from the solar heat collecting system 680 evaporates the working fluid at 670-672. In a similar way, the condensed working fluid pumped by the pumps 702 and 692 heats up to point at 670 where it enters into the heat exchanger (evaporator) 684 and evaporates at 670-672. The working fluid then enters the expander (turbine) at 672. After each expansion step in the expander (turbine), each portion of the working fluid condenses in the heat exchangers 713, 703 and 693, at 675-667, 674-668 and 673-669, respectively. The condensing working fluid heats the heat storage fluid at 651-654, and pre-heats the working fluid (in the part of the heat exchangers 713, 703, and 693 in direct fluid communication with heat exchanger 683) at 663-665.

The trilateral heat pump cycle 679 operates in charging mode with a constant temperature heat source and a gradient heat sink, where the heat source is the solar heat collecting system 680, and the heat sink is the heat storage and retrieval system 650. Starting at 670, the working fluid absorbs heat isothermally at 670-672 from the solar heat collecting system 680 through the heat exchanger 684, and is then compressed adiabatically by compressor 727 at 672-671. The working fluid then rejects heat to the heat storage fluid in the heat storage system 650 in the heat exchanger 726, passes through the expander 725 (e.g., a turbine) at 666-670, and enters the heat exchanger 684 again, where the cycle is completed. The expander or turbine 725 may recover or retrieve mechanical and/or electrical energy. The low-temperature evaporation process 670-672 in the trilateral heat pump cycle 679 absorbs heat isothermally in the heat exchanger (evaporator) 684 at a temperature $T_5$ (see FIG. 3).

In charging mode, the defined Rankine cycle 660 pre-heats the storage liquid through the heat exchangers 713, 703, and 693. The solar heat collecting system 680 then heats the storage liquid through the heat exchanger 683, and finally, the defined trilateral heat pump cycle 679 heats the storage liquid through the heat exchanger 726 up to a temperature $T_6$ (see FIG. 3).

In discharging mode, only the trilateral heat engine cycle 679 operates. Starting at 661, a pump 723 pumps the working fluid at 661-662, and further on through the heat exchangers 713, 703, 693, 683 and 726 (at 662-663-664-665-666-671). The relatively hot storage fluid in the heat storage and retrieval system 650 is pumped by the pump 657 in a reverse direction through the same heat exchangers (at 656-655-654-653-652-651) from the hot heat storage tank 659 to the cold heat storage tank 658 to transfer heat to the working fluid. At 671-676, an expander 721 expands the hot high-pressure working fluid. Mechanical energy may be retrieved or recovered during the expansion process. The trilateral heat engine cycle 679 has a low-temperature condensing process at 676-661 in the condenser 722 that rejects heat isothermally at a temperature $T_1$ (see FIG. 3) that can be to an outdoor environment (e.g., outdoor air, a pond or a lake) in a warm climate or to an indoor environment in a cold climate.

Figure 5:
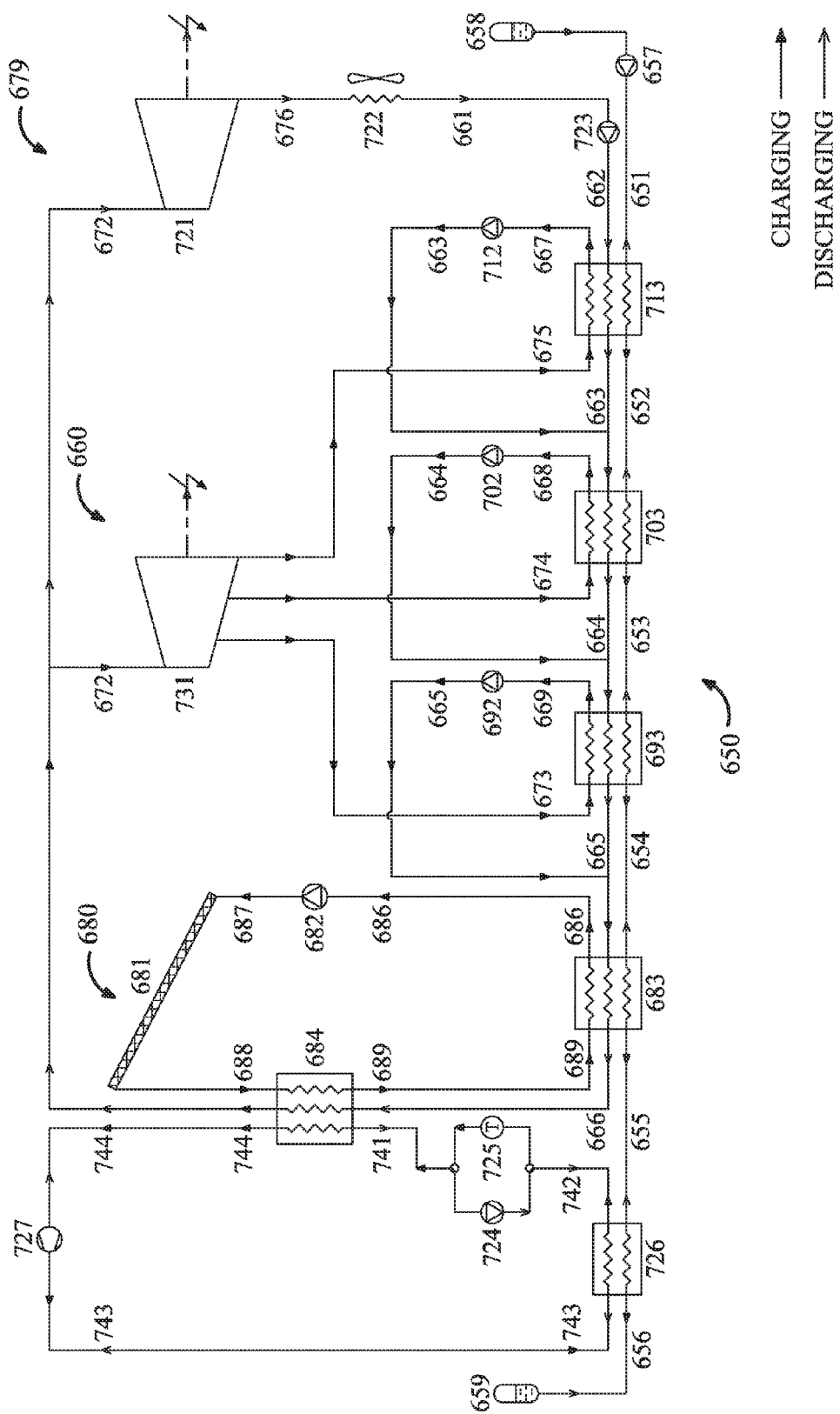
FIG. 5 shows a layout (or outlay) of a device similar to that shown in FIG. 4, but with different fluids for the high- and low-temperature circuits, in accordance with one or more embodiments of the present invention.

FIG. 5 shows a layout of an exemplary energy storage and retrieval system, similar to the layout of FIG. 4. The description of the layout of FIG. 4 also applies to the exemplary layout of FIG. 5, with a few differences that will be described below. With different fluids, the temperature span can be increased, and the pressure can be reduced.

In FIG. 5, the trilateral heat pump cycle 741-744-743-742-741 is in a separate loop with a separate working fluid. The cycle is also reversible and operates as a heat pump in charging mode (together with the exemplary STEN device, the Rankine heat engine cycle) and as a heat engine in discharging mode (in this example, together with a second Rankine heat engine cycle). The trilateral heat engine cycle of FIG. 4 changes to a second Rankine heat engine cycle in FIG. 5, and includes an isothermal evaporating process at the same or substantially the same temperature as the isothermal condensing process in the reversible trilateral heat pump cycle in discharging (heat engine) mode. The heat from the condensation process transfers to the evaporation process.

The advantages of this system include reduced pressure or pressure differences in the loops, and an option to have a wider range of fluids to match desired or required performance targets in different applications. In charging mode, the Rankine heat engine cycle, trilateral heat pump cycle and the solar heat collecting system operate as in FIG. 4, but the physical connections at 672 and 670 in FIG. 4 between the different loops are broken (e.g., are not made). The heat exchanger 684 of FIG. 4 includes one extra pipe to separate the loops, and since the trilateral heat pump cycle is reversible, it operates also in the reverse direction in discharging mode as a heat engine, with the pump 724 in the loop instead of the turbine 725.

In discharging mode, the second Rankine heat engine cycle operates together with the reversible trilateral heat pump cycle in heat engine mode. One difference with the system of FIG. 3 is that the second Rankine heat engine cycle loop does not exchange heat with the heat storage liquid in the heat exchanger 726. That reduces the second Rankine heat engine cycle working fluid temperature to $T_5$ (see FIG. 3) when the working fluid enters the turbine 721, compared to $T_6$ in the system of FIG. 4.

The reversible trilateral heat pump cycle operates as a heat engine in discharging mode. The working fluid pumped by the pump 724 is heated by the heat storage liquid in the heat exchanger 726 at 742-743, enters the expander 727 at 743 at a temperature $T_6$ (see FIG. 3), releases energy in the expander 727, condenses in the heat exchanger 684 at 744-741 (while heat transfers to the second Rankine heat engine cycle working fluid), and finally enters the pump 724 at 741 to complete the cycle. In discharging mode, the mechanical energy is delivered by the expander 721 (e.g., a turbine) and by the expander 727, where energy is released from the working fluids from $T_6$ to $T_5$ in the expander 727 and from $T_5$ to $T_1$ (see FIG. 3) in expander 721.

Figure 6:
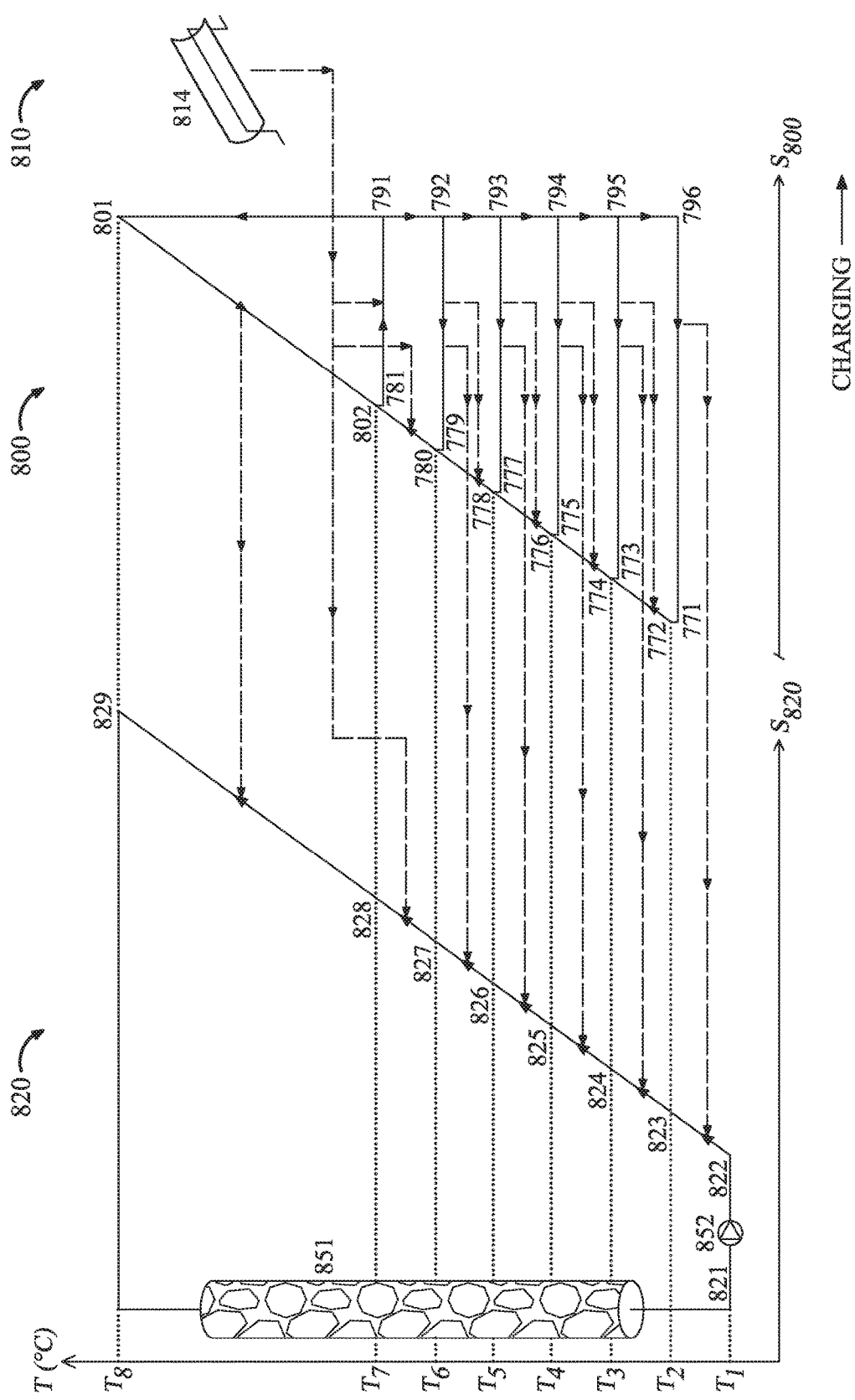
FIG. 6 shows a TS diagram for the charging mode of a heat storage device with a high-temperature trilateral ORC (heat pump) and a low-temperature sliced cycle (heat engine) with a common fluid and common circuits, receiving heat from one or more solar collectors and supplying the high temperature range of the heat storage device with heat from the trilateral heat pump and the low temperature range of the heat storage device with heat from the sliced heat engine, in accordance with one or more embodiments of the present invention.

FIG. 6 is a TS diagram of a combined cycle 800 comprising a further exemplary STEN device (e.g., Rankine heat engine cycle) 800 and a trilateral heat pump cycle, in conjunction with a thermal energy storage and retrieval system 820. The system of FIG. 6 collects heat from the sun within a limited temperature span in the operating temperature range (e.g., in the middle of the operating temperature range) of the thermal energy storage and retrieval system 820, and transfers the heat to a heat storage medium in the thermal energy storage and retrieval system 820 over a relatively wide temperature span.

The Rankine cycle 800 (e.g., a sliced Rankine cycle) is a heat engine in the charging cycle. Pumping processes occur at 771-772, 773-774, 775-776, 777-778, and 779-780. Gradient heat absorption processes occur at 772-774, 774-776, 776-778, 778-780 and 780-802. An isothermal heat absorption process occurs at 781-791. Adiabatic expansion processes (e.g., from a turbine) 791-792, 791-793, 791-794, 791-795 and 791-796 start at a common point (e.g., at 791) and end at various different temperatures and pressures (e.g., successively decreasing temperatures and optionally successively decreasing pressures). An evaporation process with heat absorption occurs at 781-791. Isothermal condensation processes with heat rejection occur at 792-779, 793-777, 794-775, 795-773 and 796-771 at various different temperatures and pressures. Heat from the condensation process at 792-779 is transferred to the heat storage fluid at 826-827 and to the working fluid at 778-780. Heat from the condensation process at 793-777 is transferred to the heat storage fluid at 825-826 and to the working fluid at 776-778. Heat from the condensation process at 794-775 is transferred to the heat storage fluid at 824-825 and to the working fluid at 774-776. Heat from the condensation process at 795-773 is transferred to the heat storage fluid at 823-824 and to the working fluid at 772-774. Heat from the condensation process at 796-771 is transferred to the heat storage fluid at 822-823. Heat from the solar collector 810 is transferred to the working fluid (evaporator) at 781-791, to the working fluid at 780-802, and to the heat storage fluid at 827-828.

The thermal energy storage and retrieval system 820 absorbs heat from the Rankine cycle 800, the solar collector 810 and the trilateral charging cycle 781-791-801-802-781 in charging mode. In the charging mode, the heat is transferred to the heat storage medium 851. The trilateral charging cycle is defined by the processes at 781-791-801-802-781, and thus may be identified as "trilateral cycle 800."

In charging mode, the trilateral charging cycle 781-791-801-802-781 is a heat pump. An isothermal heat absorption process occurs at 781-791. An adiabatic compression process occurs at 791-801. A gradient heat rejection process occurs at 801-802. An adiabatic expansion process occurs at 802-781.

Figure 7:
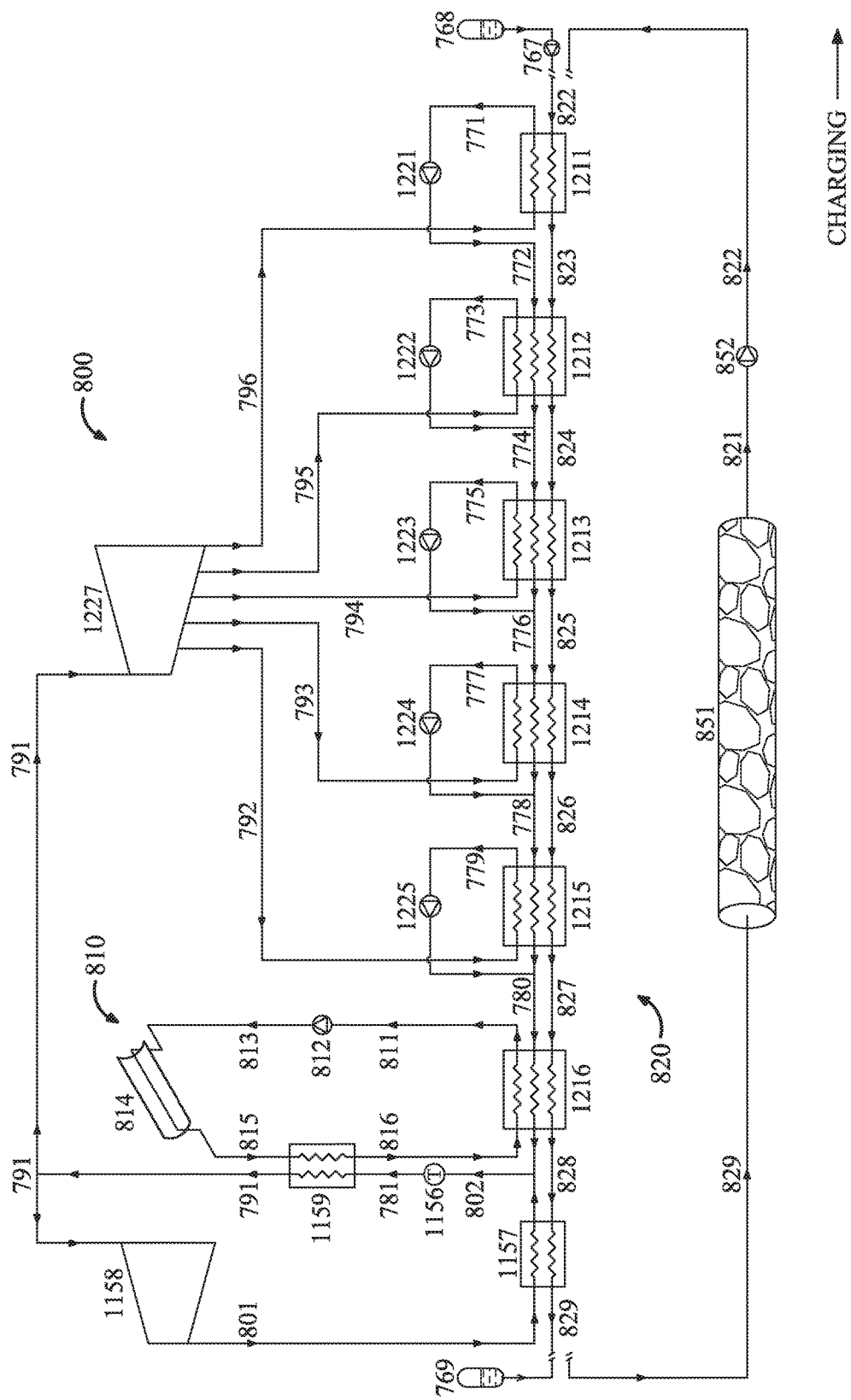
FIG. 7 shows a layout (or outlay) of a wide-temperature range solid heat storage device with a high-temperature trilateral ORC and a low-temperature sliced cycle that implements the TS diagram of FIG. 6, with a common fluid and common circuits.

FIG. 7 shows a layout of an exemplary energy storage and retrieval system, implementing the heat storage system 820 and the STEN device (trilateral/sliced Rankine cycle) 800 of FIG. 6. The system is powered by the solar heat collecting system 810. The trilateral cycle 781-791-801-802-781 works as heat pump and the sliced Rankine cycle 771-772-774-776-778-780-802-781-791-792-793-794-795-796-771 works as heat engine in charging mode. Each cycle has its own gas pressure changing device. In charging mode, the system of FIG. 7 includes compressor 1158, a turbine 1156, pumps 812, 1221-1225 and 852, condensers 1211-1215, an evaporator 1159, and heat exchangers 1216 and 1157.

Figure 8:
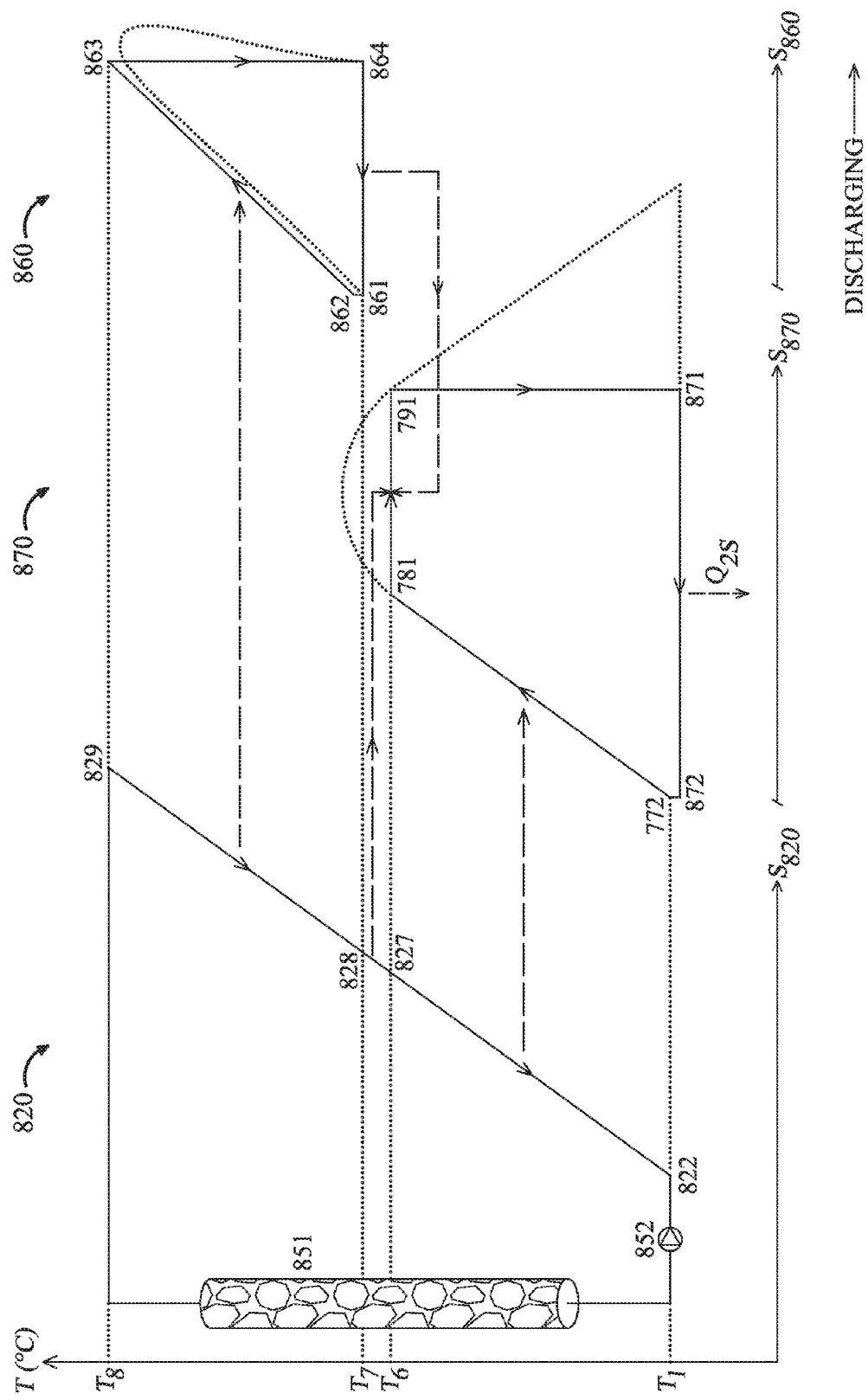
FIG. 8 shows a TS diagram for the discharging mode of a wide-temperature range solid heat storage device with a trilateral cycle and a Rankine heat engine, in accordance with one or more embodiments of the present invention.

FIG. 8 is a TS diagram of a combined cycle comprising a Rankine heat engine cycle 870 and a trilateral heat engine cycle 860 (in discharging mode), in conjunction with a thermal energy storage and retrieval system 820. The thermal energy storage and retrieval system 820 transfers heat to the Rankine cycle 870 and to the trilateral heat engine cycle 860 in the discharging mode.

In discharging mode, the Rankine cycle 870 is a heat engine. A pumping process occurs at 872-772. A gradient heat absorption process occurs at 772-781. An isothermal heat absorption process occurs at 781-791. an adiabatic expansion process (e.g., from a turbine) occurs at 791-871. An isothermal heat rejection process occurs at 871-872.

The trilateral cycle 860 is a heat engine. A pumping process occurs at 861-862. A gradient heat absorption process occurs at 862-863. An adiabatic expansion process occurs at 863-864. An isothermal heat rejection process occurs at 864-861.

Figure 9:
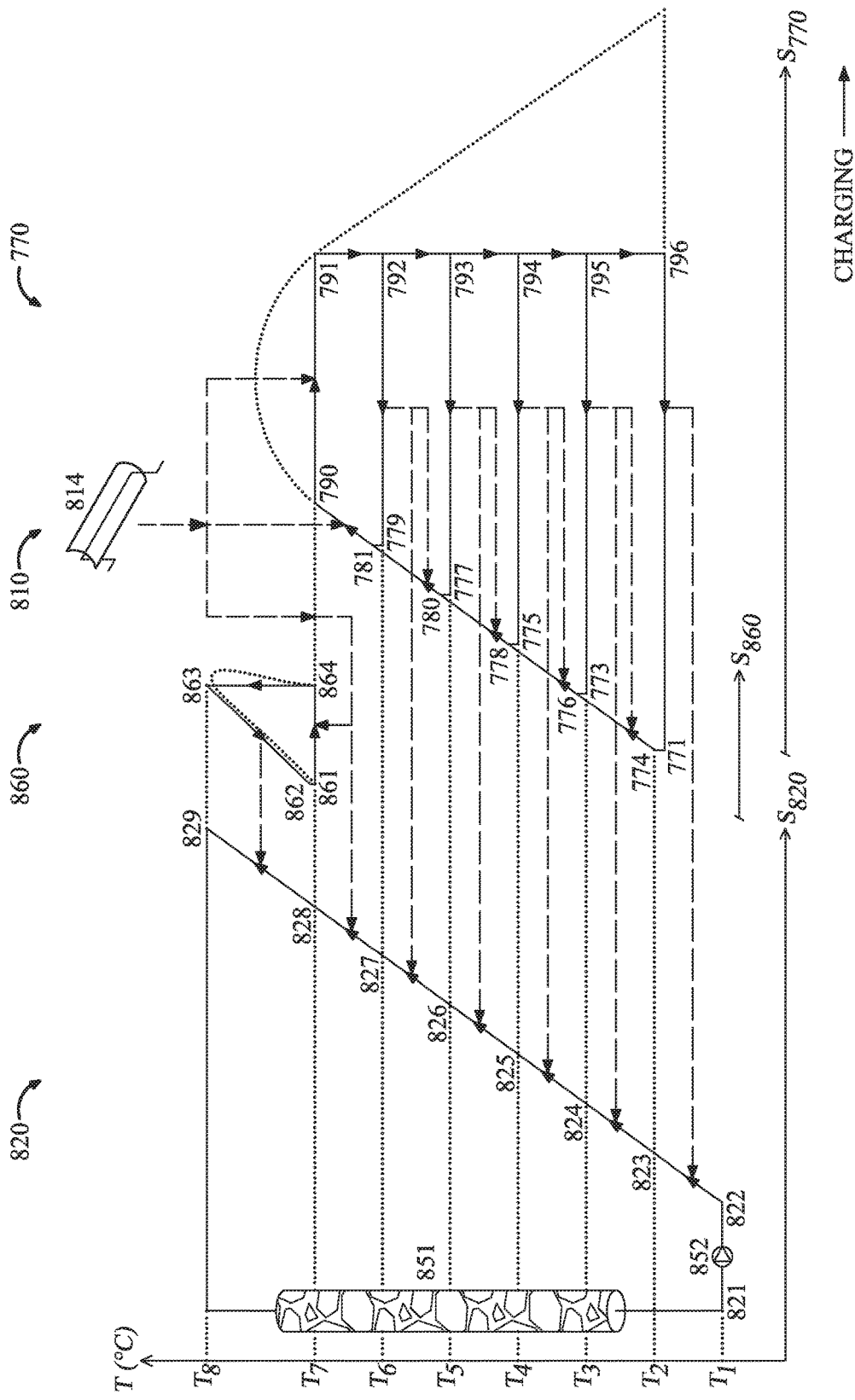
FIG. 9 shows a TS diagram for the charging mode of the heat storage device in FIG. 8 with a trilateral heat pump and a sliced Rankine heat engine, in accordance with one or more embodiments of the present invention.

FIG. 9 is a TS diagram of a combined cycle comprising the STEN device (Rankine heat engine cycle) 770 and a trilateral heat pump cycle 860 (in charging mode), in conjunction with a thermal energy storage and retrieval system 820.

In charging mode, the Rankine cycle 770 (e.g., a sliced Rankine cycle) is a heat engine. Pumping processes occur at 771-774, 773-776, 775-778, 777-780, and 779-781. Gradient heat absorption processes occur at 774-776, 776-778, 778-780, 780-781, and 781-790. 790-791 is an evaporation process with heat absorption. Adiabatic expansion processes (e.g., from a turbine) that start at a common point (e.g., at 791) and that end at various different temperatures and pressures (e.g., at successively decreasing temperatures and pressures) occur at 791-792, 791-793, 791-794, 791-795 and 791-796. Isothermal condensation processes with heat rejection occur at 792-779, 793-777, 794-775, 795-773 and 796-771 at various different temperatures and pressures (e.g., at successively decreasing temperatures and pressures). Heat from the condensation process at 792-779 is transferred to the heat storage fluid at 826-827, and to the working fluid at 780-781. Heat from the condensation process at 793-777 is transferred to the heat storage fluid at 825-826, and to the working fluid at 778-780. Heat from the condensation process at 794-775 is transferred to the heat storage fluid at 824-825, and to the working fluid at 776-778. Heat from the condensation process at 795-773 is transferred to the heat storage fluid at 823-824, and to the working fluid at 774-776. Heat from the condensation process at 796-771 is transferred to the heat storage fluid at 822-823.

In the charging mode, the trilateral cycle 860 is a heat pump. An isothermal evaporation process with heat absorption occurs at 861-864. An adiabatic compression process occurs at 864-863. A gradient heat rejection process occurs at 863-862. An adiabatic expansion process occurs at 862-861. Heat from the solar collector 810 is transferred to working fluid of the trilateral heat pump cycle 860 at 861-864 and to working fluid of the Rankine heat engine cycle 770 at 781-790 and 790-791, and to the heat storage fluid 820 at 827-828.

Figure 10:
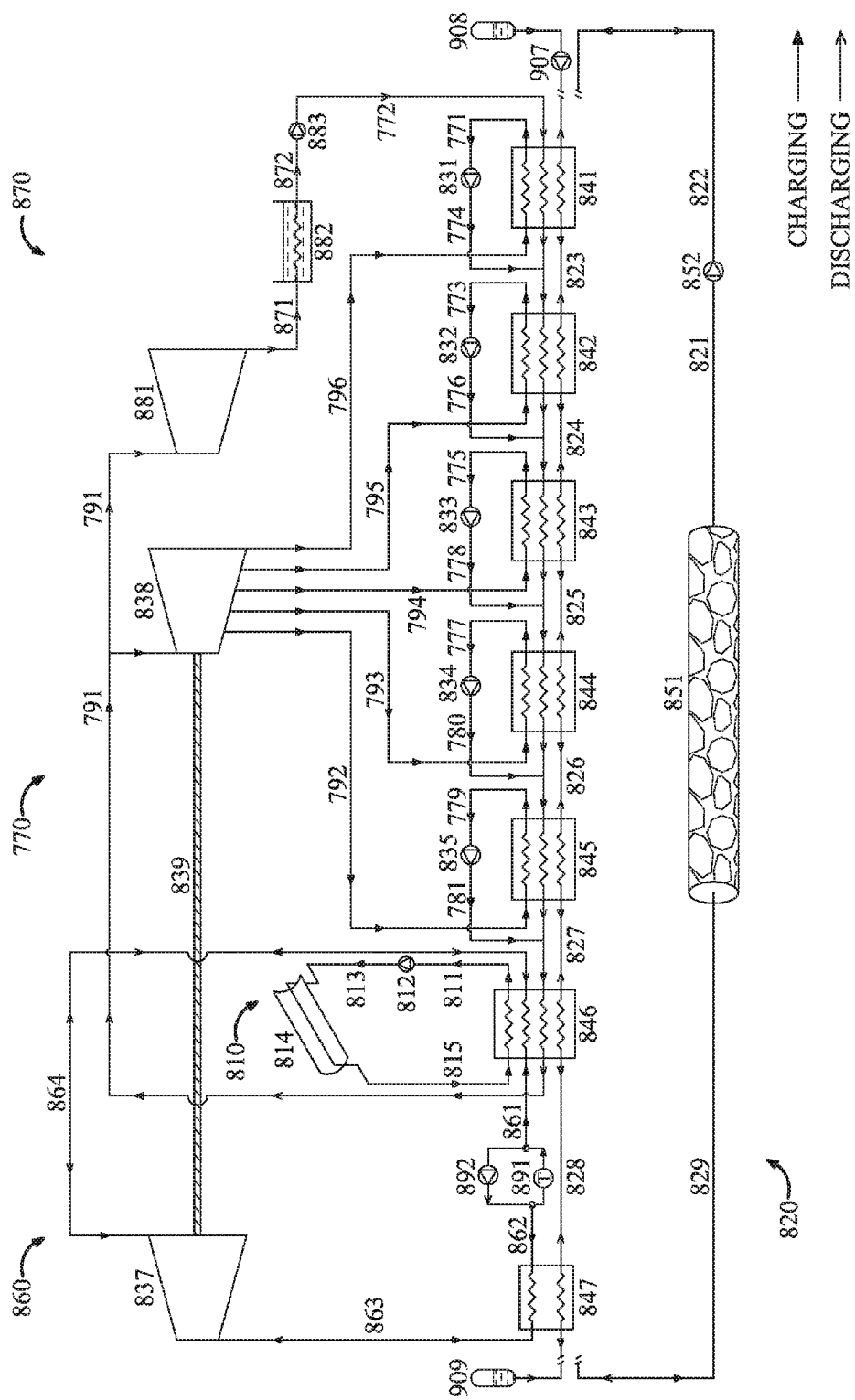
FIG. 10 shows a layout (or outlay) of a wide-temperature range solid heat storage device with a high-temperature trilateral ORC cycle and a low-temperature sliced Rankine cycle that implements the TS diagrams of FIGS. 8-9, with different fluids for the high- and the low-temperature circuits, in accordance with one or more embodiments of the present invention.

FIG. 10 shows a layout of an exemplary energy storage and retrieval system implementing the heat storage system 820, the STEN device (Rankine cycle) 770, the trilateral cycle 860 of FIGS. 8 and 9. The system is powered by the solar heat collecting system 810. The Rankine cycle 770 works as a heat engine in charging mode and as a heat engine 870 in discharging mode. The trilateral cycle 860 works as a heat pump in charging mode and as a heat engine in discharging mode. Each cycle has its own gas pressure changing device.

In the charging mode, the system includes a compressor 837, an expander 838, a turbine 891, pumps 812, 831-835 and 852, condensers 841-845, and heat exchangers 846-847. In the discharging mode, the system includes expanders 837 and 881, pumps 852, 883, and 892, a condenser 882, and heat exchangers 841-847. The circuit 864-861 of the heat exchanger 846 is a condenser circuit, and the circuit 781-791 is an evaporating circuit in discharging mode.

Figure 11:
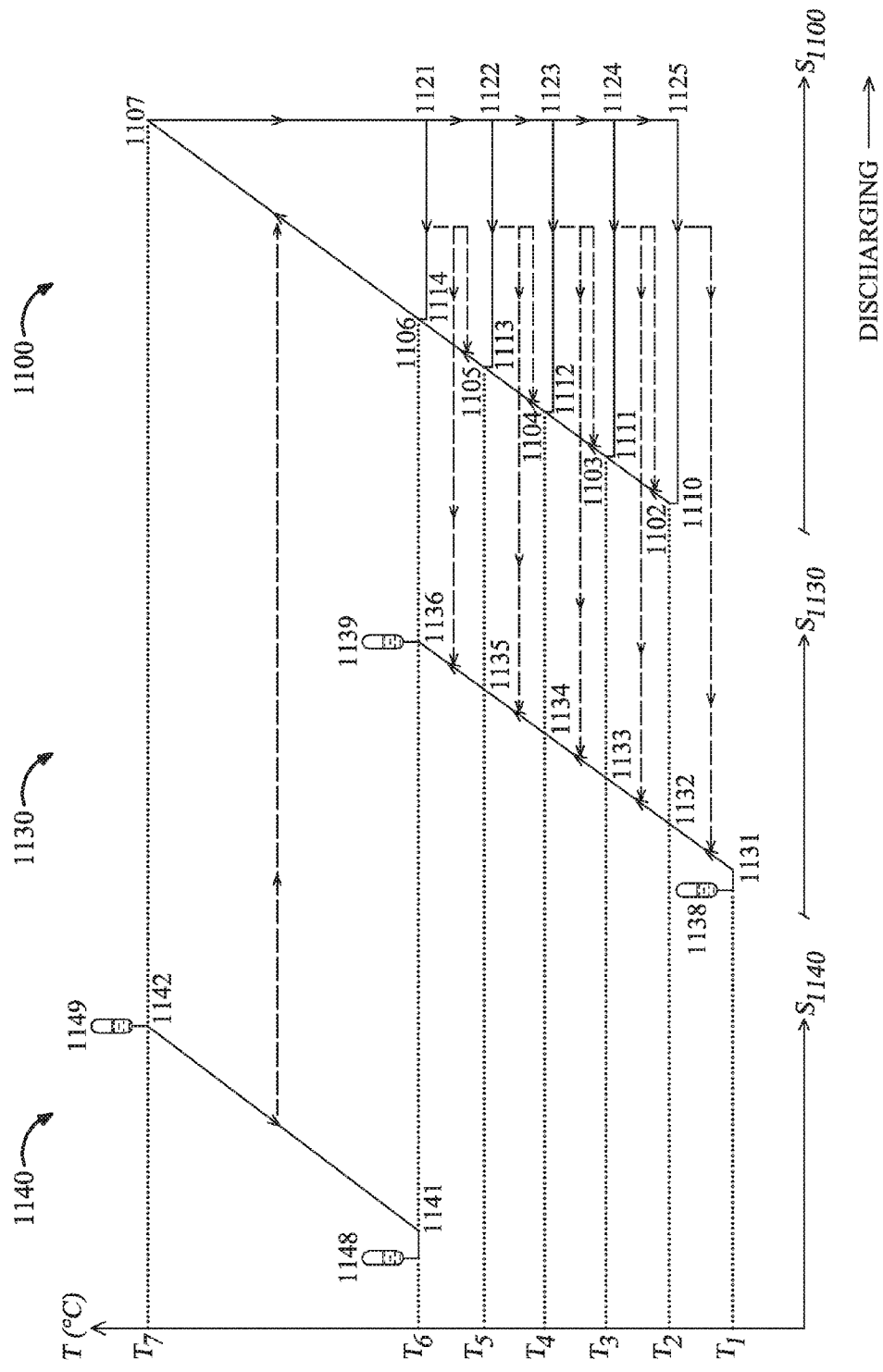
FIG. 11 shows a TS diagram for the discharging mode of hot and cold wide-temperature range heat storage devices with a trilateral ORC and a sliced heat engine, in accordance with one or more embodiments of the present invention.

FIG. 11 is a TS diagram of a STEN device 1100 (e.g., a sliced trilateral cycle with multiple isothermal processes at different temperatures and pressures), in conjunction with thermal energy storage and retrieval systems 1130 and 1140, in discharging mode.

In discharging mode, the trilateral cycle 1100 is a heat engine. Pumping processes occur at 1110-1102, 1111-1103, 1112-1104, 1113-1105 and 1114-1106. Gradient heat absorption processes occur at 1102-1103, 1103-1104, 1104-1105, 1105-1106 and 1106-1107. An adiabatic expansion process (e.g., from a turbine) occurs at 1107-1121. Adiabatic expansion processes (e.g., from a turbine) 1121-1122, 1121-1123, 1121-1124 and 1121-1125 generally start at a common point (e.g., at 1121) and end at various different temperatures and pressures (e.g., at successively decreasing temperatures and pressures).

Isothermal condensation processes with heat rejection occur at 1121-1114, 1122-1113, 1123-1112, 1124-1111 and 1125-1110 at various different temperatures and pressures (e.g., at successively decreasing temperatures and pressures). Heat from the condensation process at 1121-1114 is transferred to the heat storage fluid at 1135-1136 and to the working fluid at 1105-1106. Heat from the condensation process at 1122-1113 is transferred to the heat storage fluid at 1134-1135 and to the working fluid at 1104-1105. Heat from the condensation process at 1123-1112 is transferred to the heat storage fluid at 1133-1134 and to the working fluid at 1103-1104. Heat from the condensation process at 1124-1111 is transferred to the heat storage fluid at 1132-1133 and to the working fluid at 1102-1103. Heat from the condensation process at 1125-1110 is transferred to the heat storage fluid at 1131-1132. Heat from the heat storage fluid 1140 at 1142-1141 is transferred to the working fluid at 1106-1107.

Figure 12:
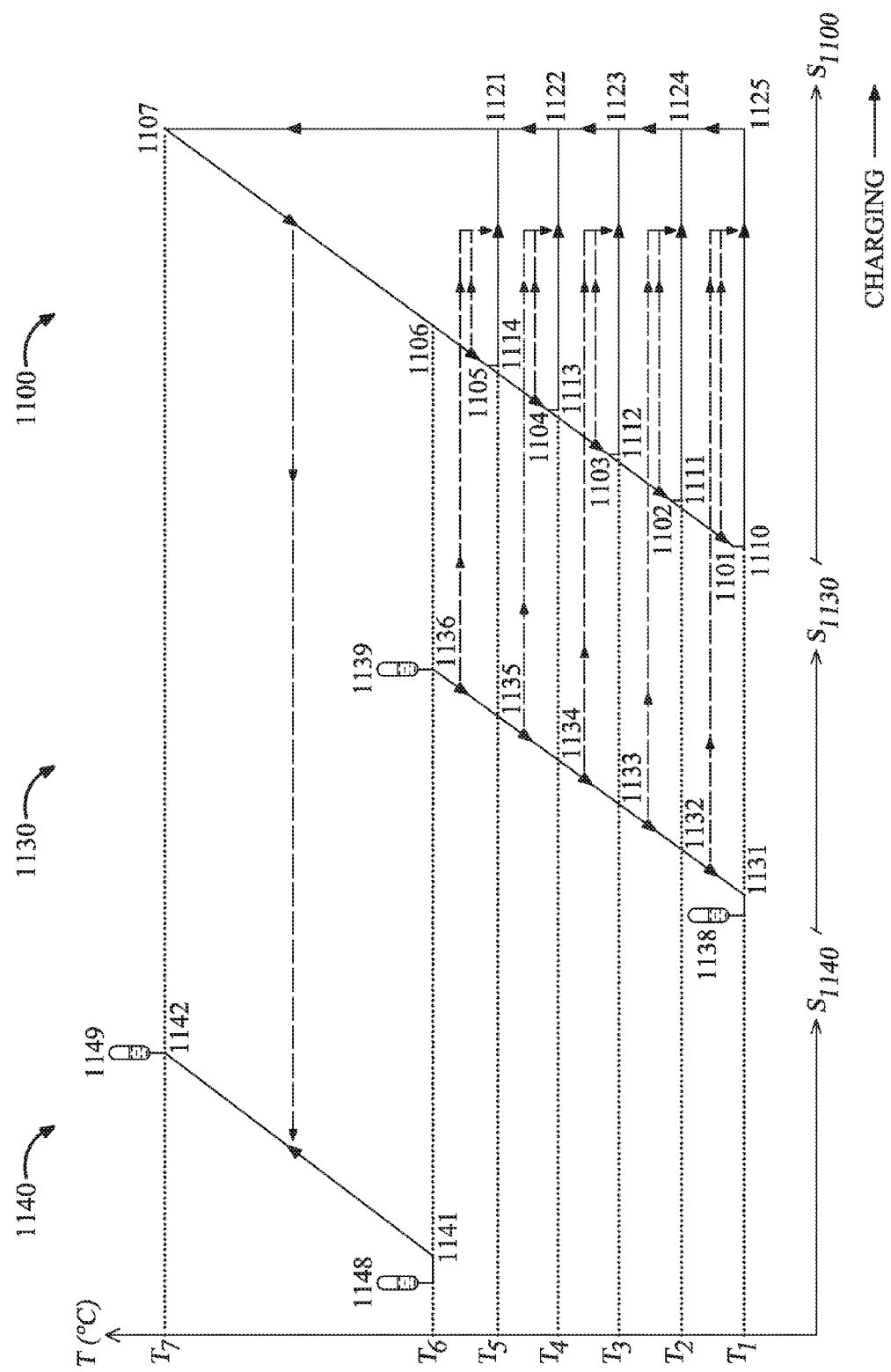
FIG. 12 shows a TS diagram for the charging mode of a trilateral ORC and a sliced heat pump, in accordance with one or more embodiments of the present invention.

FIG. 12 is a TS diagram of a combined cycle comprising the STEN device (trilateral cycle) 1100 in conjunction with the thermal energy storage and retrieval systems 1130 and 1140 in charging mode.

In the charging mode, the trilateral cycle 1100 is a heat pump. Adiabatic compression processes occur at 1125-1121, 1124-1121, 1123-1121, 1122-1121 and 1121-1107. Gradient heat rejection processes occur at 1107-1106, 1106-1105, 1105-1104, 1104-1103, 1103-1102 and 1102-1101. Adiabatic expansion processes (e.g., from a turbine) occur at 1105-1114, 1104-1113, 1103-1112, 1102-1111 and 1101-1110. Isothermal evaporation processes with heat absorption occur at 1110-1125, 1111-1124, 1112-1123, 1113-1122 and 1114-1121 at various different temperatures and pressures (e.g., at successively increasing temperatures and pressures). Heat from each of the heat storage fluid at 1136-1135 and the gradient heat rejection process at 1106-1105 is transferred to the isothermal evaporation process at 1114-1121. Heat from each of the heat storage fluid at 1135-1134 and the gradient heat rejection process at 1105-1104 is transferred to the isothermal evaporation process at 1113-1122. Heat from each of the heat storage fluid at 1134-1133 and the gradient heat rejection process at 1104-1103 is transferred to the isothermal evaporation process at 1112-1123. Heat from each of the heat storage fluid at 1133-1132 and the gradient heat rejection process at 1103-1102 is transferred to the isothermal evaporation process at 1111-1124. Heat from each of the heat storage fluid at 1132-1131 and the process at 1102-1101 is transferred to the isothermal evaporation process at 1110-1125. Heat from the gradient heat rejection process at 1107-1106 is transferred to the heat storage fluid 1140 at 1141-1142.

Figure 13:
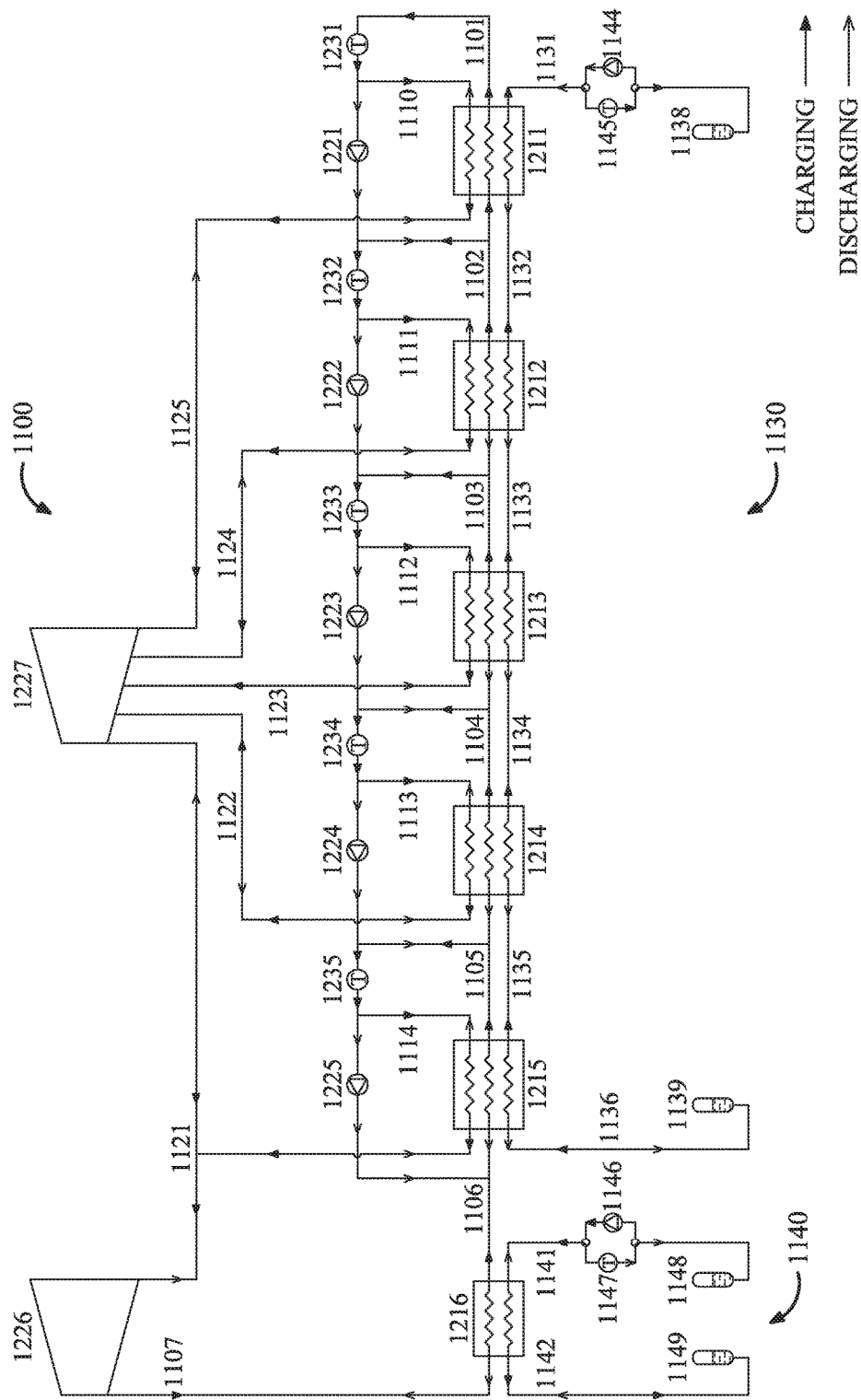
FIG. 13 shows a layout (or outlay) of hot and cold wide-temperature range heat storage devices with an ORC divided into a high-temperature trilateral cycle and a low-temperature sliced cycle with common fluid and circuits in accordance with one or more embodiments of the present invention.

FIG. 13 shows a layout of an exemplary energy storage and retrieval system implementing the heat storage systems 1130 and 1140 and the STEN device (sliced trilateral cycle) 1100 of FIGS. 11-12. Note that the system has no external heat input (Qin) or heat output (Qout). Such systems are suitable for self-contained energy storage systems. The system of FIGS. 11-13 uses three different liquids. Note also the liquids are used in different ways and may be charged and/or discharged differently.

The sliced trilateral cycle 1100 works as heat pump in charging mode and as heat engine in discharging mode. Each cycle has at least one unique pressure changing device in the loop of the cycle defined by expanders (e.g., turbines 1231-1235) in charging mode and pumps (e.g., pumps 1221-1225) in discharging mode.

The charging mode of the energy storage and retrieval system of FIG. 13 includes compressors 1226 and 1227, turbines 1145 and 1231-1235, a pump 1146, evaporators 1211-1215, and a heat exchanger 1216. In discharging mode, the energy storage and retrieval system of FIG. 13 includes expanders 1226 and 1227, a turbine 1147, pumps 1144 and 1221-1225, condensers 1211-1215, and heat exchanger 1216. When the heat storage systems 1130 and 1140 are fully charged, the tanks 1138 and 1149 are full, and the tanks 1139 and 1148 are empty or substantially empty. The situation is reversed when the heat storage systems 1130 and 1140 are discharged.

Figure 14:
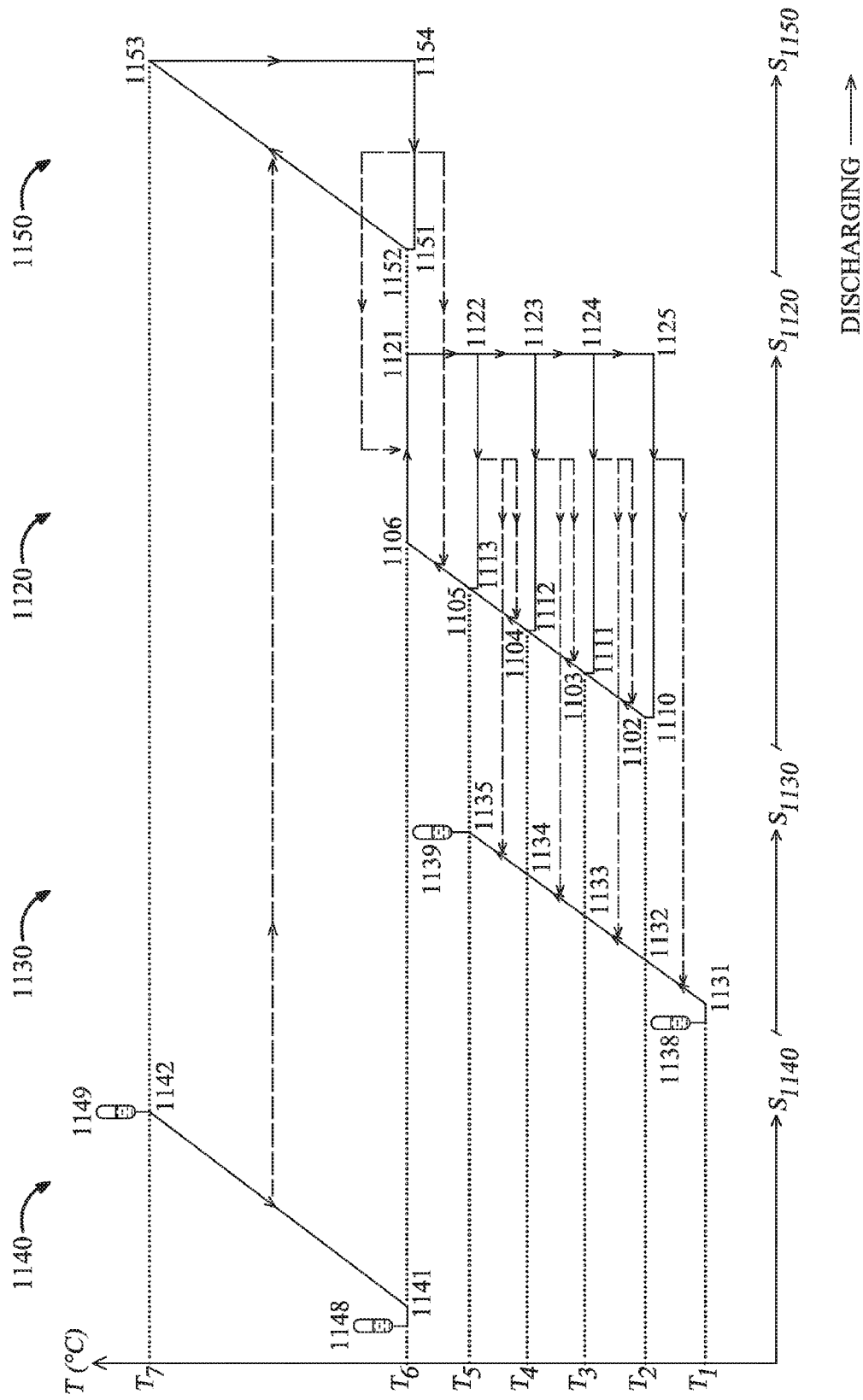
FIG. 14 shows a TS diagram for the discharging mode of hot and cold wide-temperature range heat storage devices with a high-temperature trilateral ORC cycle and a low-temperature sliced heat engine in accordance with one or more embodiments of the present invention.

FIG. 14 is a TS diagram of combined cycle in discharging mode, comprising an exemplary STEN device 1120 (e.g., a sliced Rankine cycle including multiple Rankine cycles) and a trilateral cycle 1150 in conjunction with the thermal energy storage and retrieval systems 1130 and 1140.

In discharging mode, the Rankine cycle 1120 (e.g., a sliced Rankine cycle) is a heat engine. Pumping processes occur at 1110-1102, 1111-1103, 1112-1104 and 1113-1105. Gradient heat absorption processes occur at 1102-1103, 1103-1104, 1104-1105 and 1105-1106. An isothermal evaporation process with heat absorption occurs at 1106-1121. Adiabatic expansion processes (e.g., from a turbine) that start at a common point (e.g., at 1121) and that end at various different temperatures and pressures (e.g., at successively decreasing temperatures and pressures) occur at 1121-1122, 1121-1123, 1121-1124 and 1121-1125. Isothermal condensation processes with heat rejection occur at 1122-1113, 1123-1112, 1124-1111 and 1125-1110 at various different temperatures and pressures (e.g., at successively decreasing temperatures and pressures). Heat from the condensation process at 1122-1113 is transferred to the heat storage fluid at 1134-1135 and to the working fluid at 1104-1105. Heat from the condensation process at 1123-1112 is transferred to the heat storage fluid at 1133-1134 and to the working fluid at 1103-1104. Heat from the condensation process at 1124-1111 is transferred to the heat storage fluid at 1132-1133 and to the working fluid at 1102-1103. Heat from the condensation process at 1125-1110 is transferred to the heat storage fluid at 1131-1132.

In the discharging mode, the trilateral cycle 1150 is a heat engine. A pumping process occurs at 1151-1152. A gradient heat absorption process occurs at 1152-1153. An adiabatic expansion process (e.g., from a turbine) occurs at 1153-1154. An isothermal condensation process with heat rejection occurs at 1154-1151. Heat from the heat storage fluid 1140 is transferred at 1142-1141 to the gradient heat absorption process at 1152-1153. Heat from the trilateral cycle 1150 is transferred at 1154-1151 to the Rankine cycle 1120 at 1105-1106 and 1106-1121.

Figure 15:
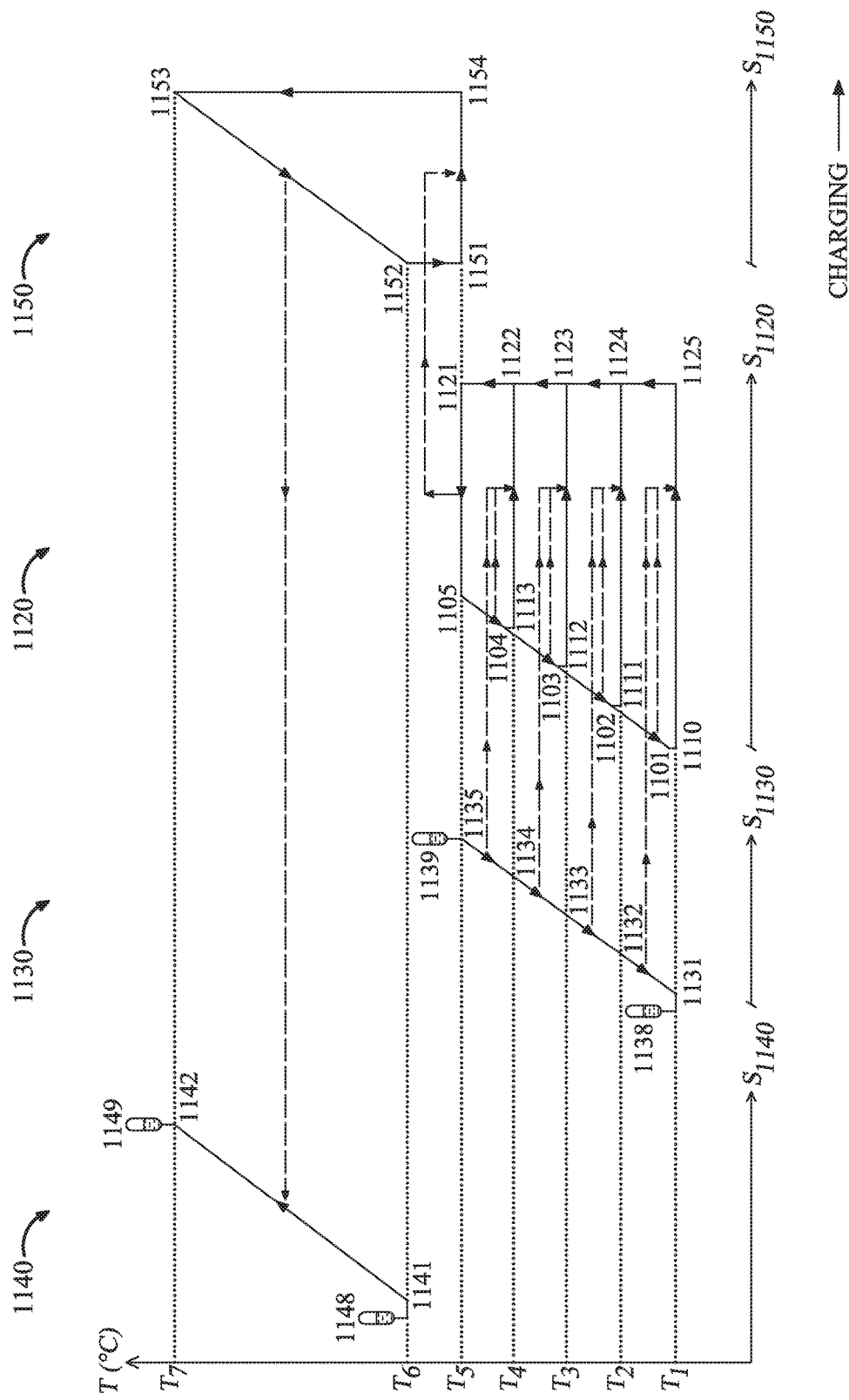
FIG. 15 shows a TS diagram for the charging mode of the hot and cold wide-temperature range heat storage devices in FIG. 14 with a high-temperature trilateral ORC cycle and a low-temperature sliced heat pump in accordance with one or more embodiments of the present invention.

FIG. 15 is a TS diagram of a combined cycle in charging mode, comprising the STEN device (Rankine cycle) 1120 and a trilateral cycle 1150, in conjunction with the thermal energy storage and retrieval systems 1130 and 1140.

In charging mode, the Rankine cycle 1120 (e.g., a sliced Rankine cycle) is a heat pump. Evaporation processes with heat absorption occur at 1110-1125, 1111-1124, 1112-1123 and 1113-1122 at various different temperatures and pressures (e.g., at successively decreasing temperatures and pressures). Adiabatic compression processes (e.g., from a compressor) that end at a common point (e.g., at 1121) and start at various different temperatures and pressures (e.g., at successively increasing temperatures and pressures) occur at 1125-1121, 1124-1121, 1123-1121 and 1122-1121. An isothermal condensation process occurs at 1121-1105. Gradient heat rejection processes occur at 1105-1104, 1104-1103, 1103-1102 and 1102-1101. Adiabatic expansion processes occur at 1104-1113, 1103-1112, 1102-1111 and 1101-1110. Heat from each of the heat storage fluid at 1135-1134 and the gradient heat rejection process at 1105-1104 is transferred to the isothermal evaporation process at 1113-1122. Heat from each of the heat storage fluid at 1134-1133 and the gradient heat rejection process at 1104-1103 is transferred to the isothermal evaporation process at 1112-1123. Heat from each of the heat storage fluid at 1133-1132 and the gradient heat rejection process at 1103-1102 is transferred to the isothermal evaporation process at 1111-1124. Heat from each of the heat storage fluid at 1132-1131 and the gradient heat rejection process at 1102-1101 is transferred to the isothermal evaporation process at 1110-1125.

In charging mode, the trilateral cycle 1150 is a heat pump. An evaporation process occurs at 1151-1154 with heat absorption from the Rankine cycle 1120 at 1121-1105. An adiabatic compression process occurs at 1154-1153. A gradient heat rejection process occurs at 1153-1152 to the thermal energy storage and retrieval system 1140 at 1141-1142. An adiabatic expansion process occurs at 1152-1151. Heat from the Rankine cycle 1120 at 1121-1105 is transferred to the trilateral cycle 1150 at 1151-1154.

Figure 16:
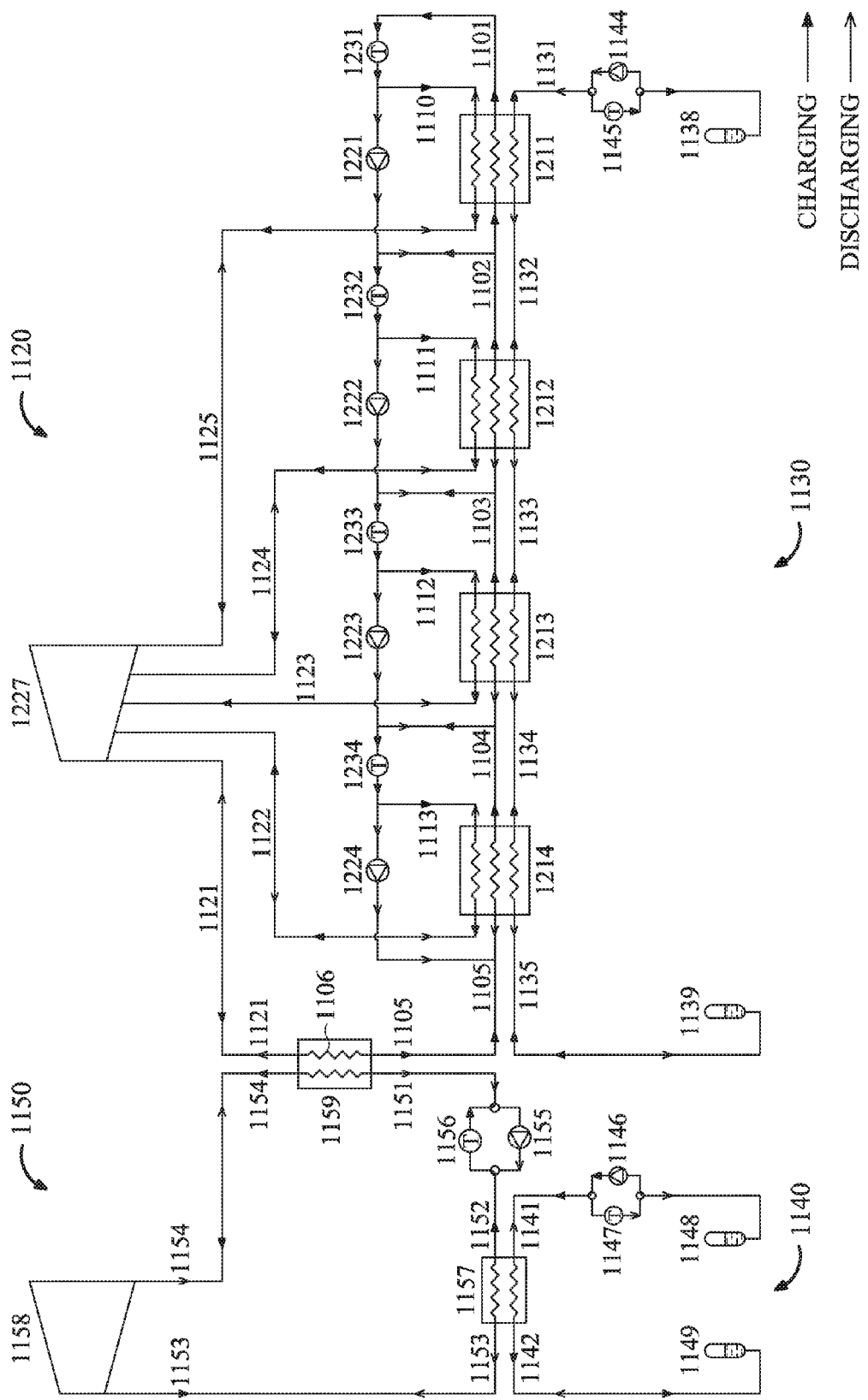
FIG. 16 shows a layout (or outlay) of hot and cold wide-temperature range heat storage devices with a high-temperature trilateral ORC cycle and a low-temperature sliced cycle that implement the TS diagrams of FIGS. 14-15, with different fluids for the high and low-temperature circuits, in accordance with one or more embodiments of the present invention.

FIG. 16 shows a layout of an exemplary energy storage and retrieval system implementing the heat storage systems 1130 and 1140, the STEN device (sliced Rankine cycle) 1120 and the trilateral cycle 1150 in accordance with the TS diagrams of FIGS. 14 and 15. The sliced Rankine cycle 1120 and the trilateral cycle 1150 work as heat pumps in charging mode and as heat engines in discharging mode. Each cycle has its own gas pressure changing devices.

In charging mode, the energy storage and retrieval system of FIG. 16 includes compressors 1158 and 1227, turbines 1145, 1231-1234 and 1156, a pump 1146, evaporators 1211-1214, and heat exchangers 1157 and 1159. In discharging mode, the energy storage and retrieval system of FIG. 16 includes expanders 1158 and 1227, a turbine 1147, pumps 1144, 1221-1224 and 1155, condensers 1211-1214, and heat exchangers 1157 and 1159. The circuit 1121-1105 of the heat exchanger 1159 is a condenser circuit, and the circuit 1151-1154 is an evaporating circuit in charging mode. In discharging mode, the circuit 1154-1151 is a condensation circuit. When the heat storage systems 1130 and 1140 is fully charged, the tanks 1138 and 1149 are full and the tanks 1139 and 1148 are empty. The situation is reversed when the heat storage systems 1130 and 1140 are discharged.

Figure 17:
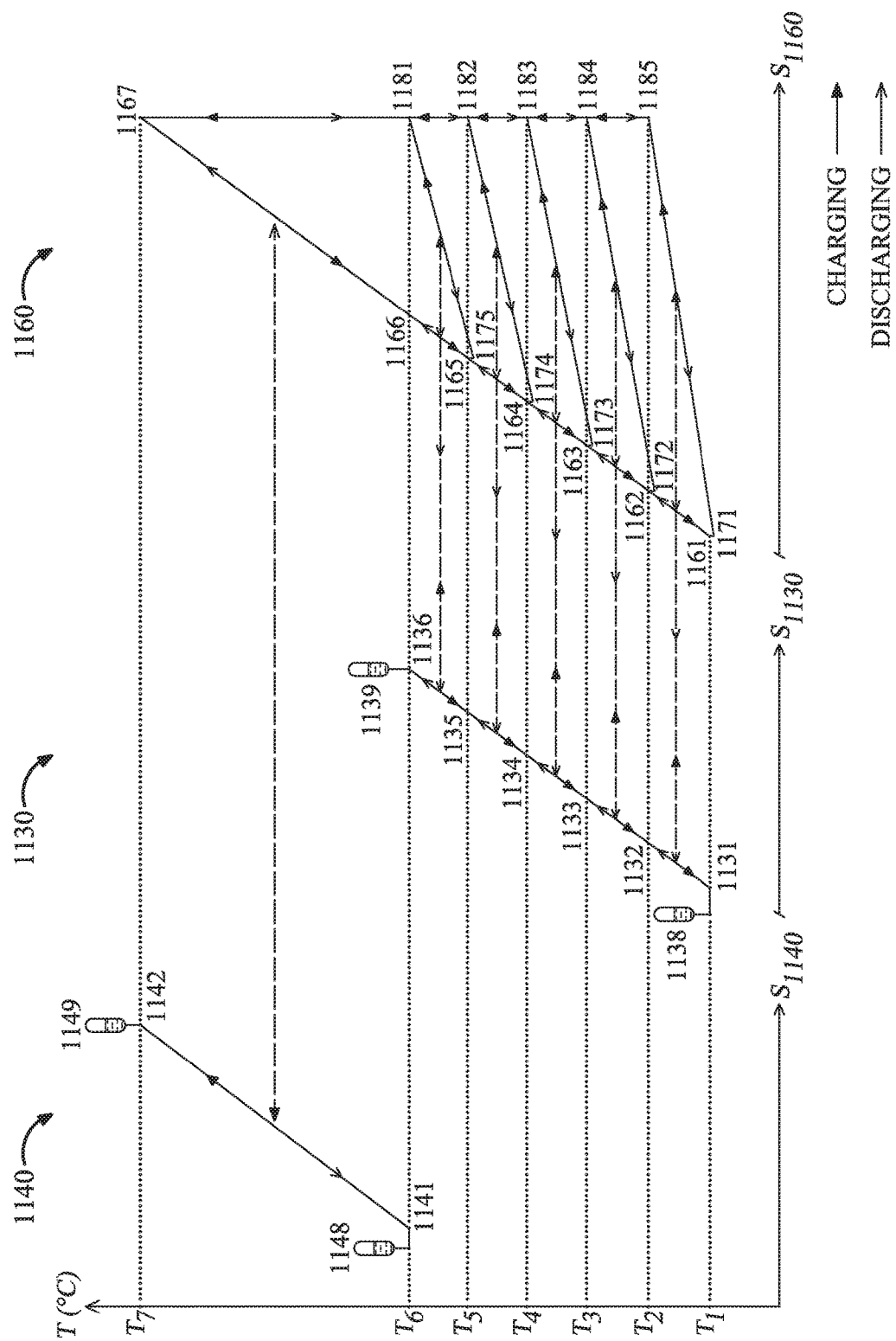
FIG. 17 shows a TS diagram for the charging and discharging modes of the device of FIG. 13 with a trilateral and a sliced heat engine/heat pump, but with zeotropic fluids, in accordance with one or more embodiments of the present invention.

FIG. 17 is a TS diagram of another exemplary STEN device 1160 (e.g., a sliced trilateral cycle) with multiple condensing (discharging mode) or vaporizing (charging mode) processes at different temperatures and pressures (e.g., at successively decreasing or increasing temperatures and pressures), in conjunction with the thermal energy storage and retrieval systems 1130 and 1140. When a zeotropic working fluid is used in the trilateral cycle 1160, the evaporating and condensing processes are not strictly isothermal, and the gradients of the evaporating and condensing processes increase the efficiency of the gradient heat transfers (e.g., between 1161 and 1165).

In charging mode, the trilateral cycle 1160 is a heat pump. Adiabatic compression processes occur at 1185-1181, 1184-1181, 1183-1181, 1182-1181, and 1181-1167. Gradient heat rejection processes occur at 1167-1166, 1166-1165, 1165-1164, 1164-1163, 1163-1162, and 1162-1161. Adiabatic expansion processes (e.g., from turbines) occur at 1165-1175, 1164-1174, 1163-1173, 1162-1172 and 1161-1171. Evaporation processes with heat absorption occur at 1171-1185, 1172-1184, 1173-1183, 1174-1182 and 1175-1181 at various different temperatures and pressures (e.g., at successively increasing temperatures and pressures). Heat from each of the heat storage fluid at 1136-1135 and the gradient heat rejection process at 1166-1165 is transferred to the evaporation process at 1175-1181. Heat from each of the heat storage fluid at 1135-1134 and the gradient heat rejection process at 1165-1164 is transferred to the evaporation process at 1174-1182. Heat from each of the heat storage fluid at 1134-1133 and the gradient heat rejection process at 1164-1163 is transferred to the evaporation process at 1173-1183. Heat from each of the heat storage fluid at 1133-1132 and the gradient heat rejection process at 1163-1162 is transferred to the evaporation process at 1172-1184. Heat from each of the heat storage fluid at 1132-1131 and the gradient heat rejection process at 1162-1161 is transferred to the evaporation process at 1171-1185. Heat from the process gradient heat rejection at 1167-1166 is transferred to the heat storage fluid at 1141-1142 of the thermal energy storage and retrieval system 1140.

In discharging mode, the trilateral cycle 1160 is a heat engine. Pumping processes occur at 1171-1161, 1172-1162, 1173-1163, 1174-1164 and 1175-1165. Gradient heat absorption processes occur at 1161-1162, 1162-1163, 1163-1164, 1164-1165, 1165-1166 and 1166-1167. Adiabatic expansion processes (e.g., from a turbine) occur at 1167-1181, 1181-1182, 1181-1183, 1181-1184 and 1181-1185, and condensation processes with heat rejection occur at 1185-1171, 1184-1172, 1183-1173, 1182-1174 and 1181-1175 at various different temperatures and pressures (e.g., at successively increasing temperatures and pressures). Heat from the condensation process at 1181-1175 is transferred to the gradient heat absorption process at 1165-1166 and to the heat storage fluid at 1135-1136. Heat from the condensation process at 1182-1174 is transferred to the gradient heat absorption process at 1164-1165 and to the heat storage fluid at 1134-1135. Heat from the condensation process at 1183-1173 is transferred to the gradient heat absorption process at 1163-1164 and to the heat storage fluid at 1133-1134. Heat from the condensation process at 1184-1172 is transferred to the gradient heat absorption process at 1162-1163 and to the heat storage fluid at 1132-1133. Heat from the condensation process at 1185-1171 is transferred to the gradient heat absorption process at 1161-1162 and to the heat storage fluid at 1131-1132. Heat from the heat storage fluid at 1142-1141 is transferred to the gradient heat absorption process at 1166-1167.

Figure 18:
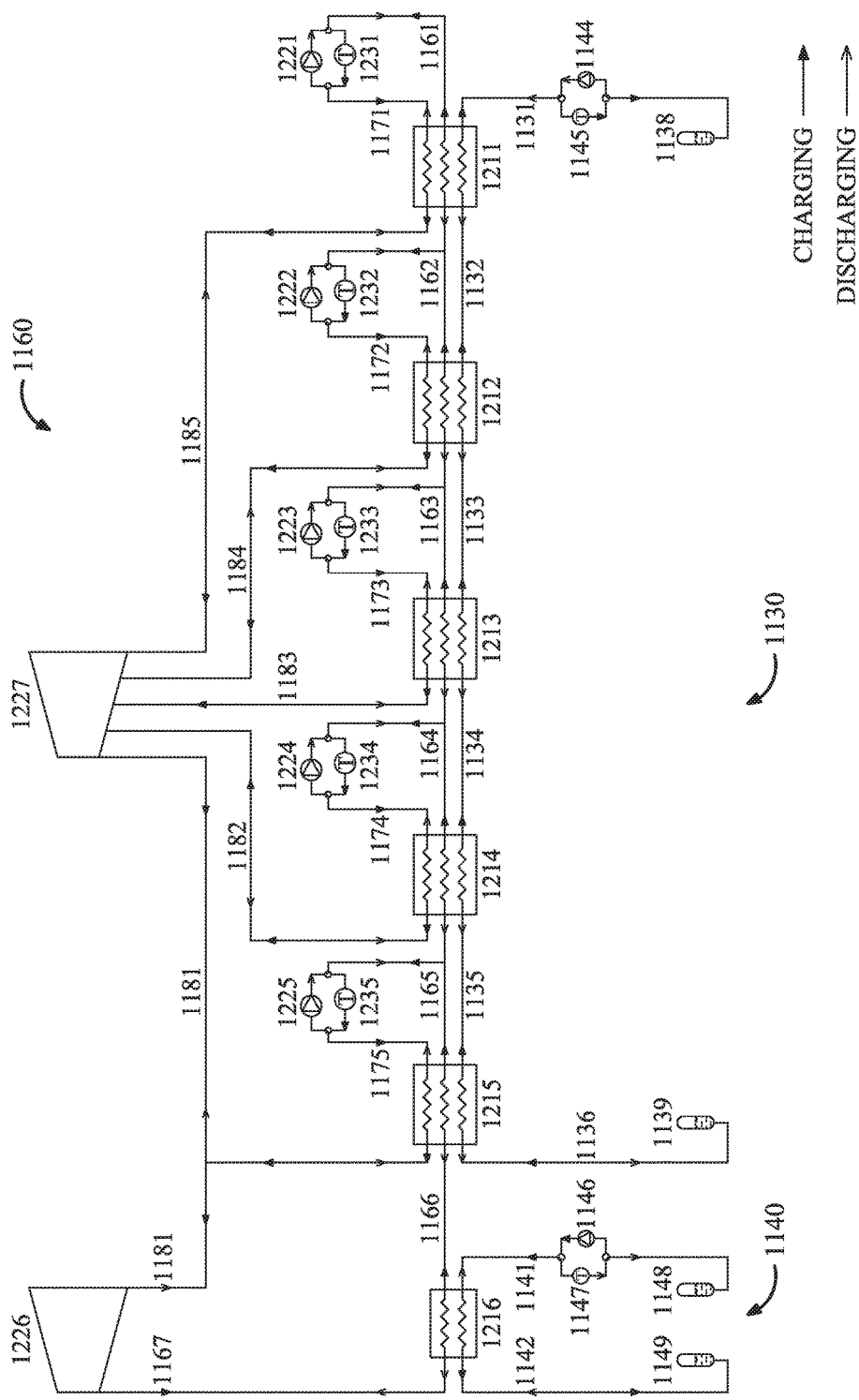
FIG. 18 shows a layout (or outlay) of a device similar to the device in FIG. 13, but with one or more zeotropic fluids in accordance with one or more embodiments of the present invention.

FIG. 18 shows an exemplary layout of an energy storage and retrieval system, implementing the heat storage systems 1130 and 1140 and the STEN device (trilateral cycle) 1160 of FIG. 17. The trilateral cycle 1160 works as heat pump in charging mode and as heat engine in discharging mode. Each condensing and vaporizing cycle (e.g., 1171-1185-1184-1172-1161-1171, 1172-1184-1183-1173-1162-1172, etc.) has at least one unique pressure changing device.

In charging mode, the exemplary energy storage and retrieval system of FIG. 18 includes compressors 1226 and 1227, turbines 1231-1235 and 1145, a pump 1146, evaporators 1211-1215, and a heat exchanger 1216. In discharging mode, the exemplary energy storage and retrieval system of FIG. 18 includes expanders 1226 and 1227, a turbine 1147, pumps 1144 and 1221-1225, condensers 1211-1215, and heat exchanger 1216. When the heat storage systems 1130 and 1140 are fully charged, the tanks 1138 and 1149 are full, and the tanks 1139 and 1148 are empty. The situation is reversed when the heat storage systems 1130 and 1140 are discharged.

Figure 19:
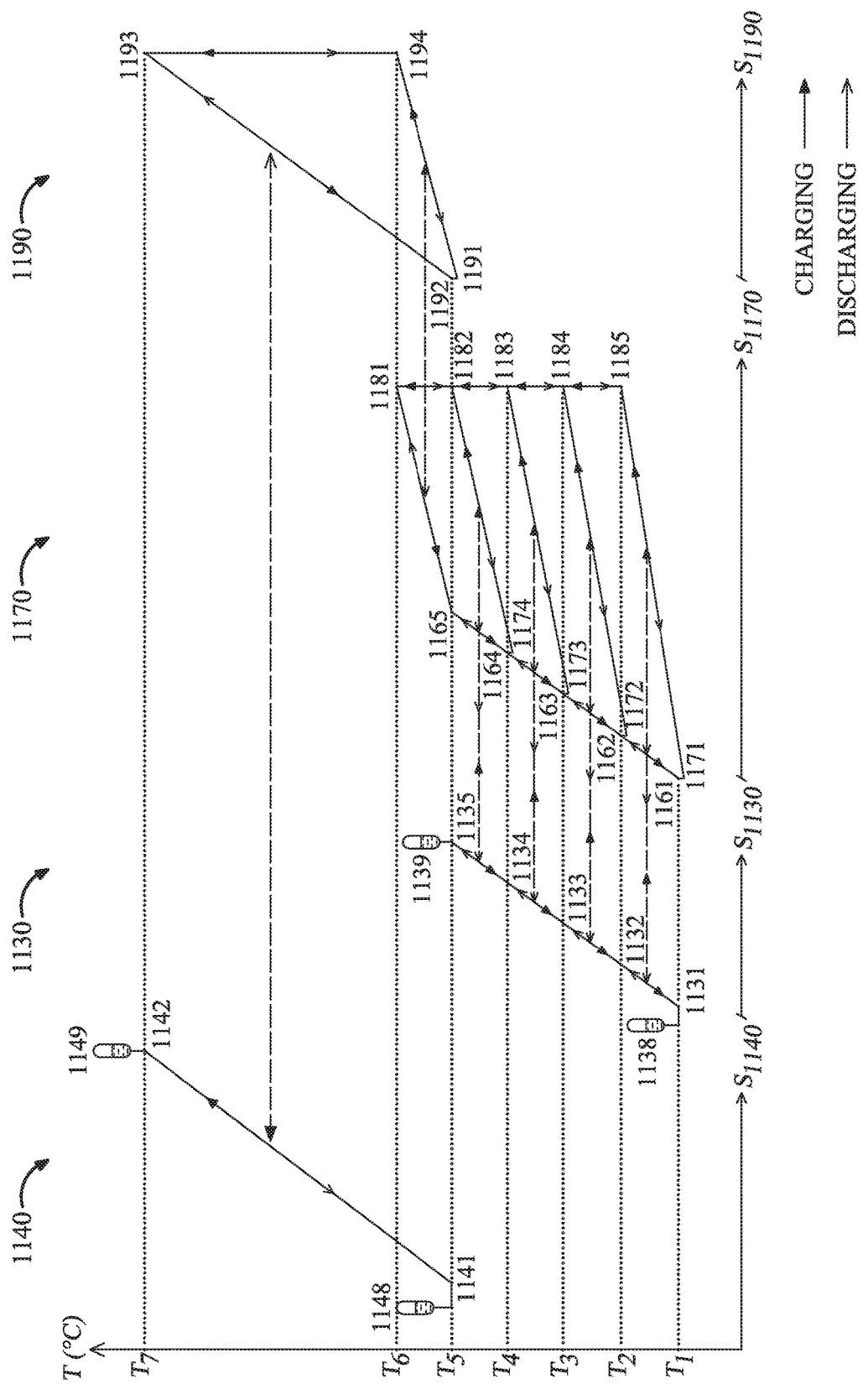
FIG. 19 shows a TS diagram for the charging and discharging modes of hot and cold wide-temperature range heat storage devices with a high-temperature trilateral heat engine/heat pump and a low-temperature sliced heat engine/heat pump, but with one or more zeotropic fluids in accordance with one or more embodiments of the present invention.

FIG. 19 is a TS diagram of combined cycle comprising a STEN device 1170 (e.g., a sliced Rankine cycle) and a trilateral cycle 1190 with zeotropic working fluids, in conjunction with the thermal energy storage and retrieval systems 1130 and 1140.

In charging mode, the Rankine cycle 1170 is a heat pump. Adiabatic compression processes occur at 1185-1181, 1184-1181, 1183-1181 and 1182-1181. A condensation process occurs at 1181-1165. Gradient heat rejection processes occur at 1165-1164, 1164-1163, 1163-1162 and 1162-1161. Adiabatic expansion processes (e.g., from turbines) occur at 1164-1174, 1163-1173, 1162-1172, and 1161-1171. Evaporation processes with heat absorption occur at 1171-1185, 1172-1184, 1173-1183 and 1174-1182 at various different temperatures and pressures (e.g., at successively increasing temperatures and pressures). Heat from each of the heat storage fluid at 1135-1134 and the gradient heat rejection process at 1165-1164 is transferred to the evaporation process at 1174-1182. Heat from each of the heat storage fluid at 1134-1133 and the gradient heat rejection process at 1164-1163 is transferred to the evaporation process at 1173-1183. Heat from each of the heat storage fluid at 1133-1132 and the gradient heat rejection process at 1163-1162 is transferred to the evaporation process at 1172-1184. Heat from each of the heat storage fluid at 1132-1131 and the gradient heat rejection process at 1162-1161 is transferred to the evaporation process at 1171-1185.

In charging mode, the trilateral cycle 1190 is a heat pump. A heat absorption process occurs at 1191-1194 from the Rankine cycle 1170 at 1181-1165. An adiabatic compression process occurs at 1194-1193. A heat rejection process occurs at 1193-1192 to the thermal energy storage and retrieval system 1140 at 1141-1142. An adiabatic expansion process occurs at 1192-1191.

In discharging mode, the Rankine cycle 1170 is a heat engine. Pumping processes occur at 1171-1161, 1172-1162, 1173-1163 and 1174-1164. Gradient heat absorption processes occur at 1161-1162, 1162-1163, 1163-1164 and 1164-1165. An evaporation process with heat absorption occurs at 1165-1181. Adiabatic expansion processes (e.g., from one or more turbines) occur at 1181-1182, 1181-1183, 1181-1184 and 1181-1185. Condensation processes with heat rejection occur at 1185-1171, 1184-1172, 1183-1173 and 1182-1174 at various different temperatures and pressures (e.g., at successively increasing temperatures and pressures). Heat from the condensation process at 1182-1174 is transferred to the gradient heat absorption process at 1164-1165 and to the heat storage fluid at 1134-1135. Heat from the condensation process at 1183-1173 is transferred to the gradient heat absorption process at 1163-1164 and to the heat storage fluid at 1133-1134. Heat from the condensation process at 1184-1172 is transferred to the gradient heat absorption process at 1162-1163 and to the heat storage fluid at 1132-1133. Heat from the condensation process at 1185-1171 is transferred to the gradient heat absorption process at 1161-1162 and to the heat storage fluid at 1131-1132.

In discharging mode, the trilateral cycle 1190 is a heat engine. A pumping process occurs at 1191-1192. A gradient heat absorption process occurs at 1192-1193 from the thermal energy storage and retrieval system 1140 at 1142-1141. An adiabatic expansion process (e.g., from a turbine) occurs at 1193-1194, and a condensation process occurs at 1194-1191 with heat rejection to the Rankine cycle 1170 at 1165-1181.

Figure 20:
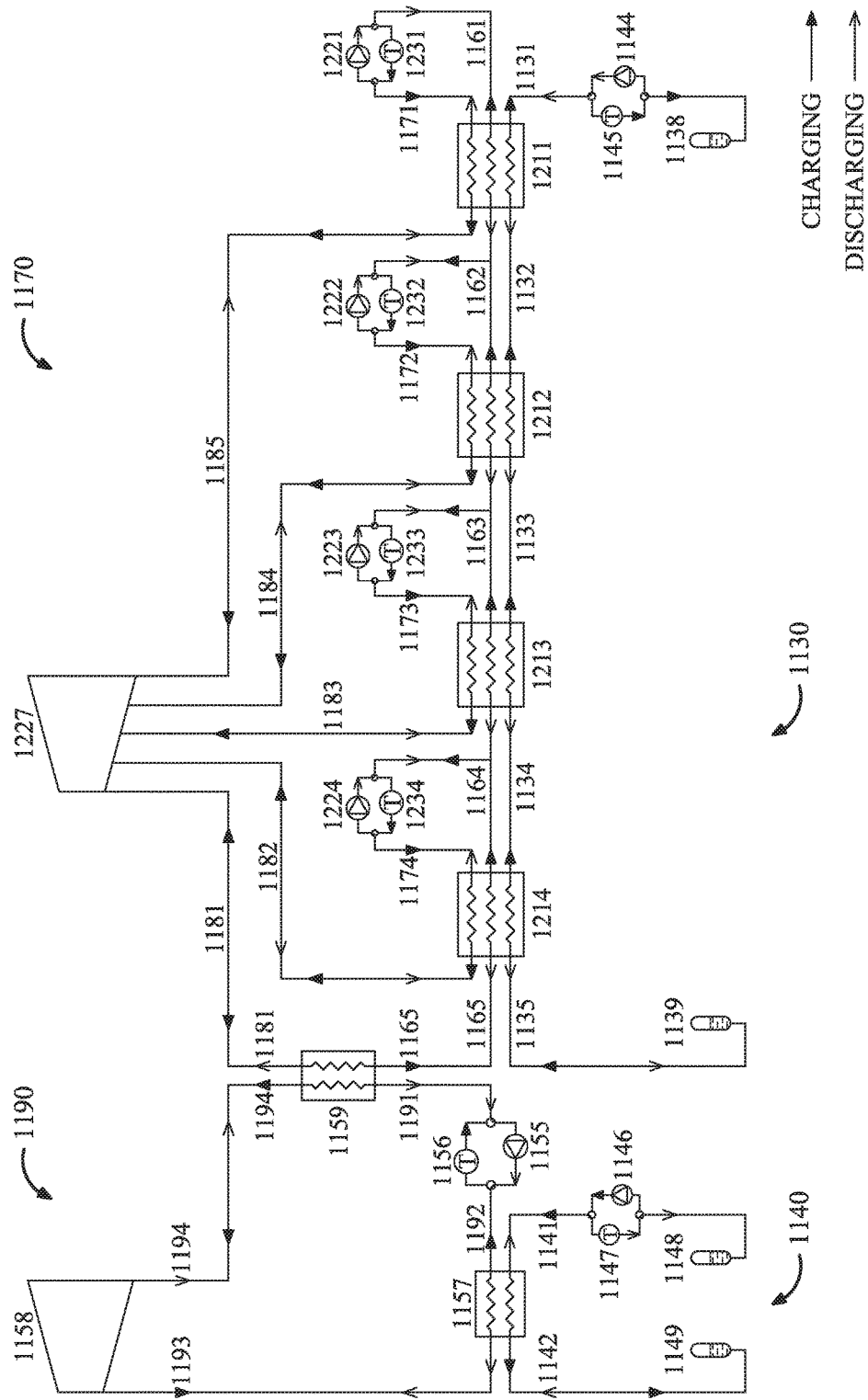
FIG. 20 shows a layout (or outlay) of a device that implements the TS diagram of FIG. 19 and similar to the device in FIG. 16, but with a zeotropic fluid in accordance with one or more embodiments of the present invention.

FIG. 20 shows a layout of an exemplary energy storage and retrieval system implementing the heat storage systems 1130 and 1140, the STEN device (sliced Rankine cycle) 1170, and the trilateral cycle 1190. The sliced Rankine cycle 1170 and the trilateral cycle 1190 work as heat pumps in charging mode and as heat engines in discharging mode. Each cycle, including each subcycle in the sliced Rankine cycle 1170, has its at least one unique pressure changing device.

In charging mode, the exemplary energy storage and retrieval system of FIG. 20 includes compressors 1227 and 1158, turbines 1145, 1231-1234 and 1156, a pump 1146, evaporators 1211-1214, and heat exchangers 1157 and 1159. In discharging mode, the exemplary energy storage and retrieval system of FIG. 20 includes expanders 1227 and 1158, a turbine 1147, pumps 1144, 1221-1224, and 1155, condensers 1211-1214, and heat exchangers 1157 and 1159. The circuit 1181-1165 of the heat exchanger 1159 is a condenser circuit, and the circuit 1191-1194 is an evaporating circuit in charging mode. The situation is reversed in discharging mode (i.e., the circuit 1181-1165 is an evaporating circuit, and the circuit 1191-1194 is a condenser circuit). When the heat storage systems 1130 and 1140 are fully charged, the tanks 1138 and 1149 are full and the tanks 1139 and 1148 are empty. The situation is reversed when the heat storage systems 1130 and 1140 are discharged.

Figure 21:
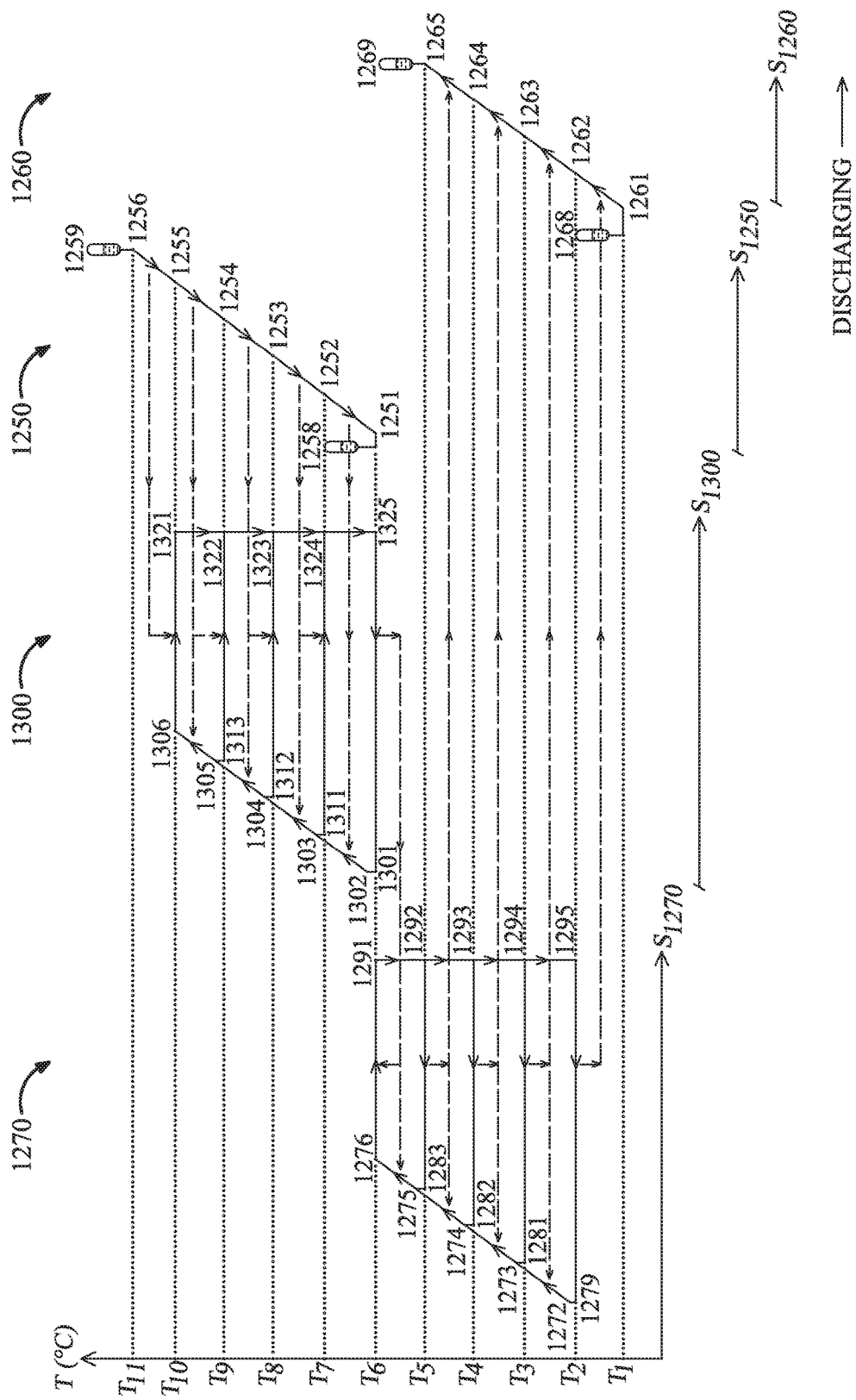
FIG. 21 shows a TS diagram for the discharging mode of hot and cold wide-temperature range heat storage devices with high-temperature and low-temperature sliced cycles with different fluids for the high- and low-temperature cycles in accordance with one or more embodiments of the present invention.

FIG. 21 is a TS diagram of combined cycle comprising exemplary STEN devices (e.g., Rankine cycles) 1270 and 1300 in discharging mode, in conjunction with the thermal energy storage and retrieval systems 1250 and 1260. The thermal energy storage and retrieval system 1250 is a high-temperature heat storage and retrieval system, and the thermal energy storage and retrieval system 1260 is a low-temperature heat storage and retrieval system.

In discharging mode, the Rankine cycle 1270 (e.g., a sliced Rankine cycle) is a heat engine. Pumping processes occur at 1279-1272, 1281-1273, 1282-1274 and 1283-1275. Gradient heat absorption processes occur at 1272-1273, 1273-1274, 1274-1275 and 1275-1276. An evaporation process with heat absorption occurs at 1276-1291. Adiabatic expansion processes (e.g., from a turbine) that start at a common point (e.g., at 1291) and end at various different temperatures and pressures (e.g., at successively decreasing temperatures and pressures) occur at 1291-1292, 1291-1293, 1291-1294 and 1291-1295. Condensation processes with heat rejection at various different temperatures and pressures (e.g., at successively decreasing temperatures and pressures) occur at 1292-1283, 1293-1282, 1294-1281 and 1295-1279. Heat from the condensation process at 1292-1283 is transferred to the heat storage fluid at 1264-1265 and to the working fluid at 1274-1275. Heat from the condensation process at 1293-1282 is transferred to the heat storage fluid at 1263-1264 and to the working fluid at 1273-1274. Heat from the condensation process at 1294-1281 is transferred to the heat storage fluid at 1262-1263 and to the working fluid at 1272-1273. Heat from the condensation process at 1295-1279 is transferred to the heat storage fluid at 1261-1262.

In discharging mode, the Rankine cycle 1300 (e.g., the sliced Rankine cycle) is a heat engine. A pumping process occurs at 1301-1302. Adiabatic expansion processes occur at 1303-1311, 1304-1312 and 1305-1313. Gradient heat absorption processes occur at 1302-1303, 1303-1304, 1304-1305 and 1305-1306. Adiabatic expansion processes (e.g., from a turbine) that end at a common point (e.g., at 1325) and that start at various different temperatures and pressures (e.g., at successively decreasing temperatures and pressures) occur at 1321-1325, 1322-1325, 1323-1325 and 1324-1325. Isothermal evaporation processes with heat absorption at various different temperatures and pressures (e.g., at successively decreasing temperatures and pressures) occur at 1306-1321, 1313-1322, 1312-1323 and 1311-1324. Heat from the heat storage fluid at 1256-1255 is transferred to the evaporation process at 1306-1321. Heat from the heat storage fluid at 1255-1254 is transferred to the working fluid at 1305-1306 and at 1313-1322. Heat from the heat storage fluid at 1254-1253 is transferred to the working fluid at 1304-1305 and at 1312-1323. Heat from the heat storage fluid at 1253-1252 is transferred to the working fluid at 1303-1304 and at 1311-1324. Heat from the heat storage fluid at 1252-1251 is transferred to the working fluid at 1302-1303. The heat from a common condensing process 1325-1301 in the heat engine 1300 is transferred to the process 1275-176 and to a common evaporating process 1276-1291 in the heat engine 1270.

Figure 22:
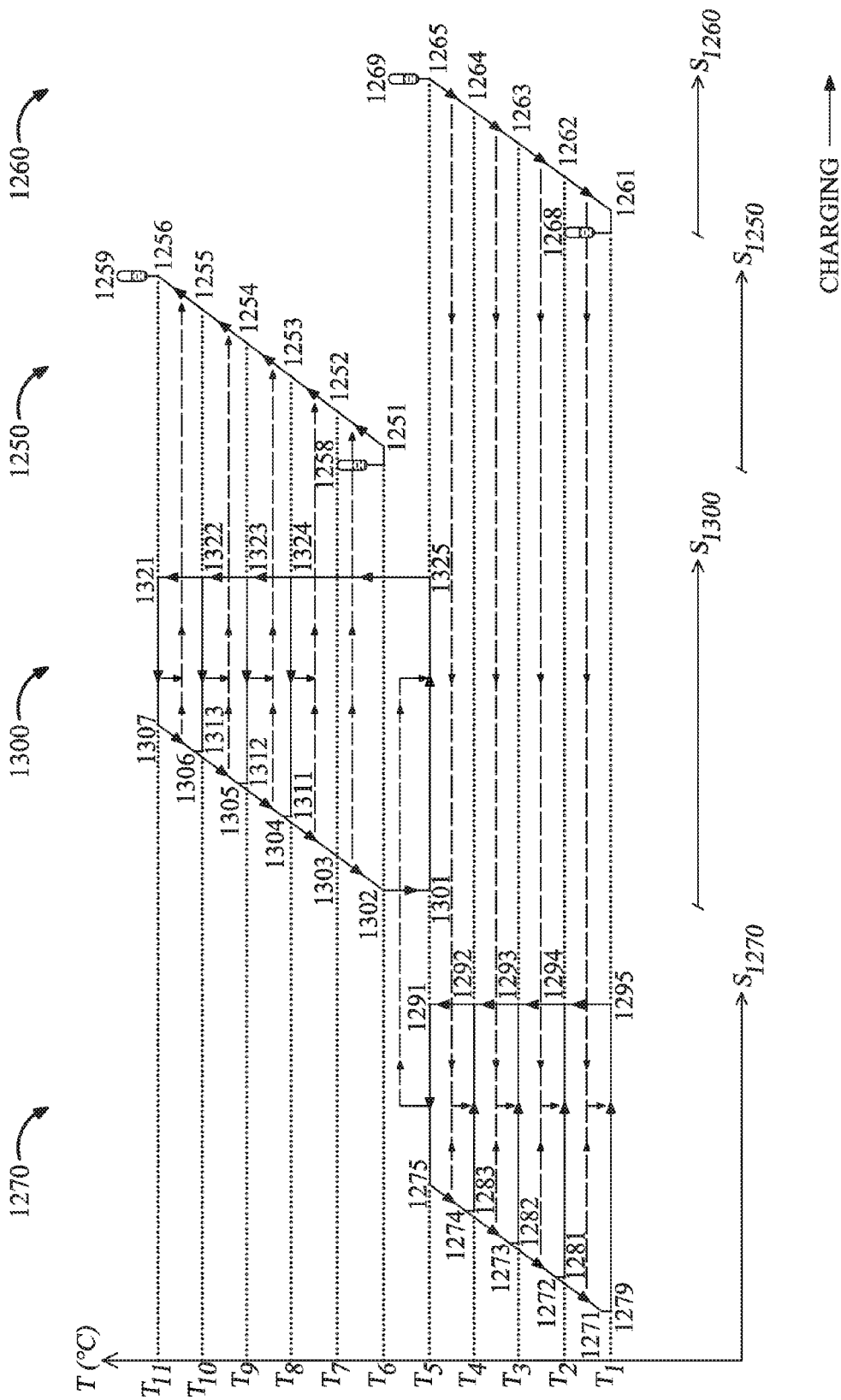
FIG. 22 shows a TS diagram for the charging mode of the device(s) in FIG. 21.

FIG. 22 is a TS diagram of a combined cycle comprising the STEN devices (Rankine cycles) 1270 and 1300 in charging mode, in conjunction with the thermal energy storage and retrieval systems 1250 and 1260.

In charging mode, the Rankine cycle 1270 (e.g., the sliced Rankine cycle) is a heat pump. Adiabatic compression processes (e.g., from a compressor) that end at a common point (e.g., at 1291) and start at various different temperatures and pressures occur at 1295-1291, 1294-1291, 1293-1291 and 1292-1291. An isothermal condensation process occurs at 1291-1275. Gradient heat rejection processes occur at 1275-1274, 1274-1273, 1273-1272 and 1272-1271. Adiabatic expansion processes (e.g., from turbines) occur at 1271-1279, 1272-1281, 1273-1282 and 1274-1283. Evaporation processes with heat absorption at various different temperatures and pressures (e.g., at successively increasing temperatures and pressures) occur at 1279-1295, 1281-1294, 1282-1293 and 1283-1292. Heat from each of the heat storage fluid at 1265-1264 and the gradient heat rejection process at 1275-1274 is transferred to the working fluid at 1283-1292. Heat from each of the heat storage fluid at 1264-1263 and the gradient heat rejection process at 1274-1273 is transferred to the working fluid at 1282-1293. Heat from each of the heat storage fluid at 1263-1262 and the gradient heat rejection process at 1273-1272 is transferred to the working fluid at 1281-1294. Heat from each of the heat storage fluid at 1262-1261 and the gradient heat rejection process at 1272-1271 is transferred to the working fluid at 1279-1295.

In charging mode, the Rankine cycle 1300 (e.g., the sliced Rankine cycle) is a heat pump. Adiabatic compression processes (e.g., from a compressor) that start at a common point (e.g., at 1325) and end at various different temperatures and pressures (e.g., at successively increasing temperatures and pressures) occur at 1325-1324, 1325-1323, 1325-1322 and 1325-1321. Gradient heat rejection processes occur at 1307-1306, 1306-1305, 1305-1304, 1304-1303 and 1303-1302. Pumping processes occur at 1311-1304, 1312-1305 and 1313-1306. An adiabatic expansion process (e.g., from a turbine) occurs at 1302-1301. Isothermal condensation processes with heat rejection at various different temperatures and pressures (e.g., at successively decreasing temperatures and pressures) occur at 1321-1307, 1322-1313, 1323-1312 and 1324-1311. An isothermal evaporation process occurs at 1301-1325 with heat absorption from the Rankine cycle 1270 at 1291-1275. Heat from the gradient heat rejection process at 1303-1302 is transferred to the heat storage fluid at 1251-1252. Heat from each of the gradient heat rejection process at 1304-1303 and the condensation process at 1324-1311 is transferred to the heat storage fluid at 1252-1253. Heat from each of the gradient heat rejection process at 1305-1304 and the condensation process at 1323-1312 is transferred to the heat storage fluid at 1253-1254. Heat from each of the gradient heat rejection process at 1306-1305 and the condensation process at 1322-1313 is transferred to the heat storage fluid at 1254-1255. Heat from each of the gradient heat rejection process at 1307-1306 and the condensation process at 1321-1307 is transferred to the heat storage fluid at 1255-1256.

Figure 23:
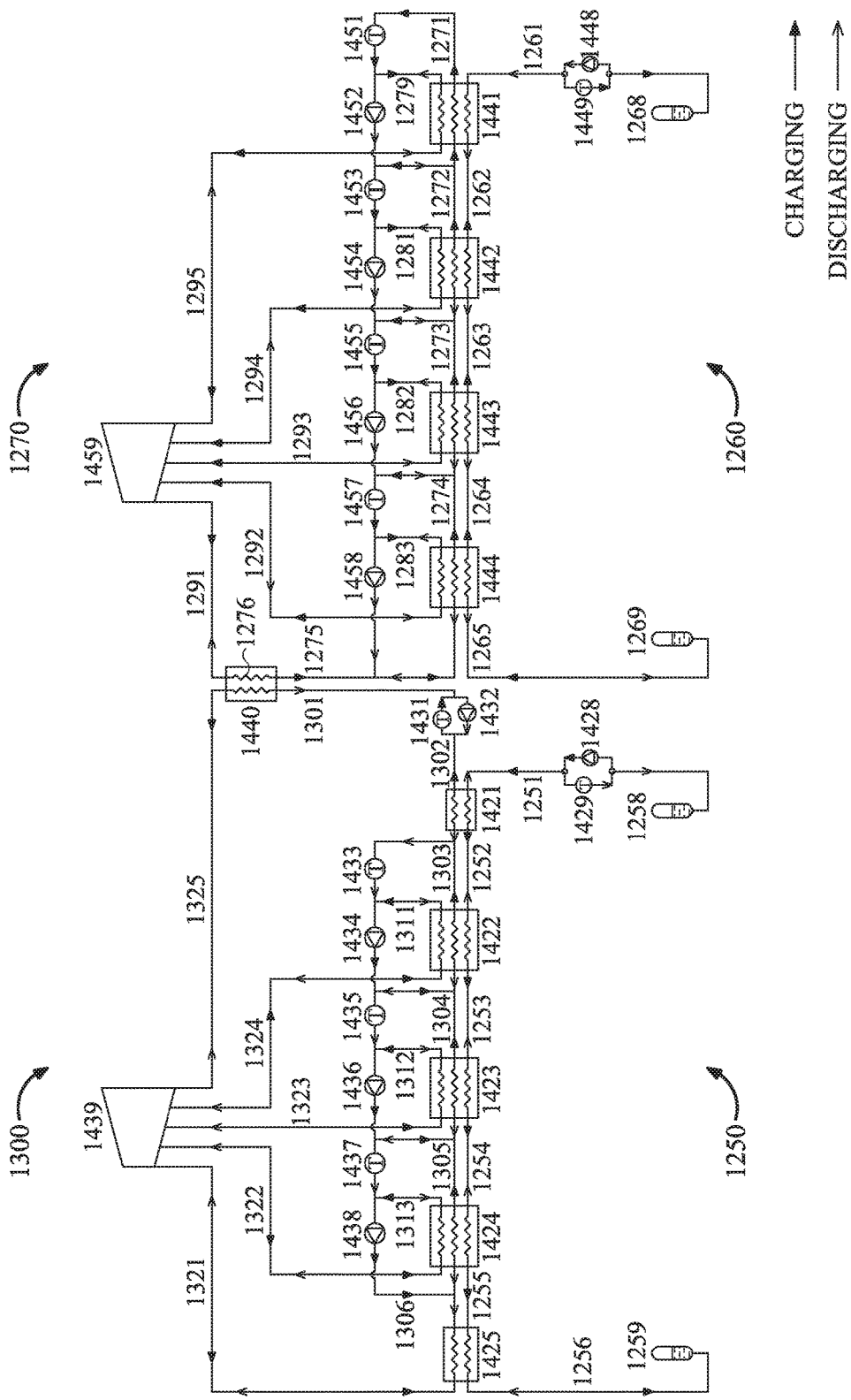
FIG. 23 shows a layout (or outlay) of hot and cold wide-temperature range heat storage devices with high-temperature and low-temperature reversible sliced cycles with different fluids for the high- and low-temperature cycles that implement the TS diagrams of FIGS. 21-22.

FIG. 23 shows a layout of an exemplary energy storage and retrieval system implementing the heat storage systems 1250 and 1260 and the STEN devices (sliced Rankine cycles) 1270 and 1300. The sliced Rankine cycles 1270 and 1300 work as heat pumps in charging mode and as heat engines in discharging mode.

In charging mode, the exemplary energy storage and retrieval system of FIG. 22 includes compressors 1439 and 1459, turbines 1431, 1449, 1451, 1453, 1455 and 1457, pumps 1428, 1434, 1436 and 1438, evaporators 1441-1444, condensers 1422-1425, and heat exchangers 1421 and 1440. In discharging mode, the exemplary energy storage and retrieval system of FIG. 21 includes expanders 1439 and 1459, turbines 1429, 1433, 1435 and 1437, pumps 1448, 1452, 1454, 1456, 1458 and 1432, condensers 1441-1444, evaporators 1422-1425, and the heat exchangers 1421 and 1440. The circuit 1291-1275 of the heat exchanger 1440 is a condenser circuit, and the circuit 1301-1325 is an evaporating circuit in charging mode. The situation is reversed in discharging mode. When the heat storage systems 1250 and 1260 are fully charged, the tanks 1259 and 1268 are full, and the tanks 1258 and 1269 are empty. The situation is reversed when the heat storage systems 1250 and 1260 are discharged.

Figure 24:
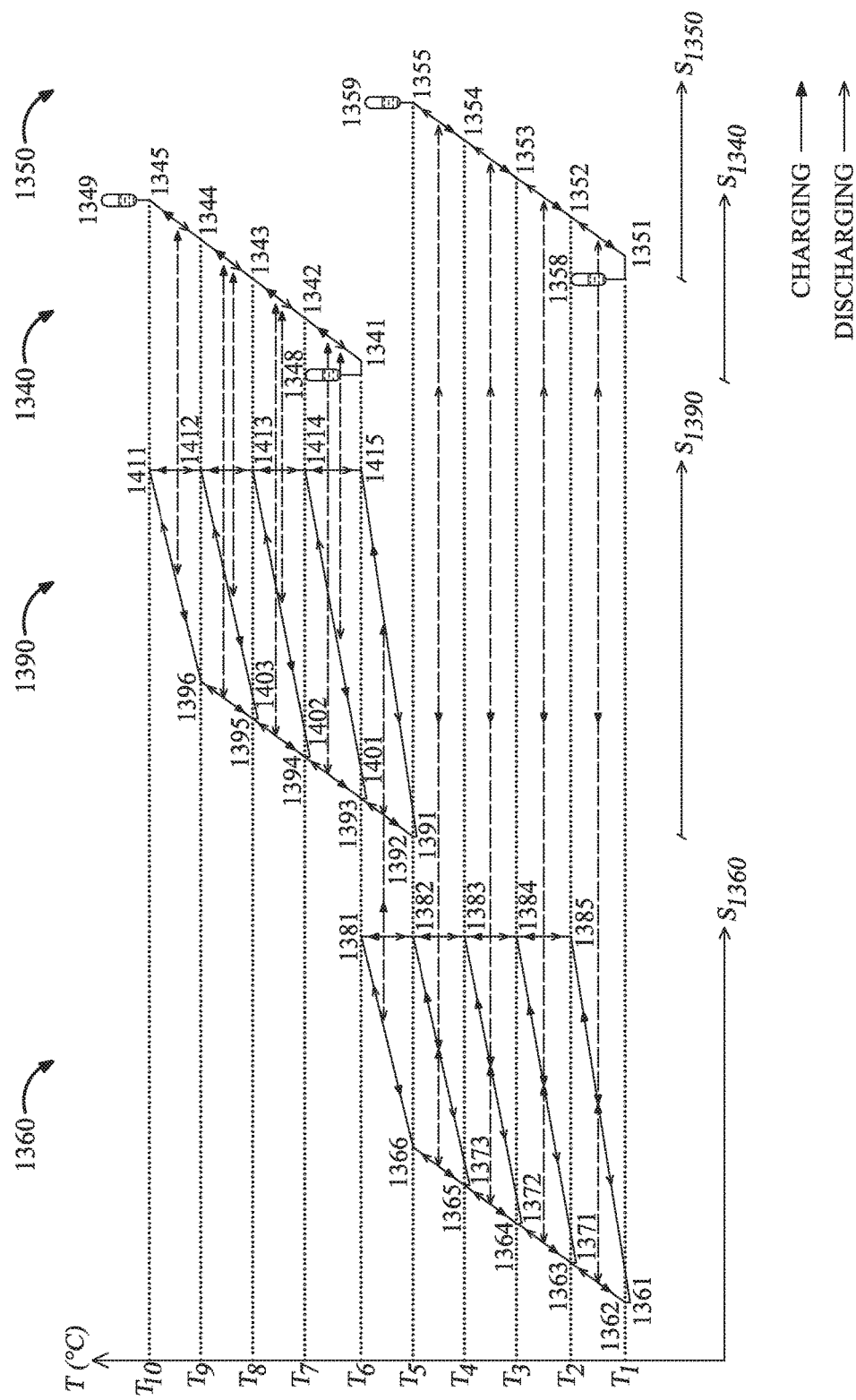
FIG. 24 shows a TS diagram for the charging and discharging modes of a device similar to the device(s) in FIG. 23, but with zeotropic fluids in accordance with one or more embodiments of the present invention.

FIG. 24 is a TS diagram of a combined cycle comprising exemplary STEN devices (e.g., Rankine cycles) 1360 and 1390 in conjunction with thermal energy storage and retrieval systems 1340 and 1350. The Rankine cycles 1360 and 1390 use zeotropic working fluids. The thermal energy storage and retrieval system 1340 is a high-temperature heat storage and retrieval system, and the thermal energy storage and retrieval system 1350 is a low-temperature heat storage and retrieval system.

In charging mode, the Rankine cycle 1360 is a heat pump. Adiabatic compression processes occur at 1385-1381, 1384-1381, 1383-1381 and 1382-1381. A condensation process occurs at 1381-1366. Gradient heat rejection processes occur at 1366-1365, 1365-1364, 1364-1363 and 1363-1362. Adiabatic expansion processes (e.g., from turbines) occur at 1365-1373, 1364-1372, 1363-1371 and 1362-1361. Evaporation processes with heat absorption at various different temperatures and pressures (e.g., at successively increasing temperatures and pressures) occur at 1361-1385, 1371-1384, 1372-1383 and 1373-1382. Heat from each of the heat storage fluid at 1352-1351 and the gradient heat rejection process at 1363-1362 is transferred to the process at 1361-1385. Heat from each of the heat storage fluid at 1353-1352 and the gradient heat rejection process at 1364-1363 is transferred to the process at 1371-1384. Heat from each of the heat storage fluid at 1354-1353 and the gradient heat rejection process at 1365-1364 is transferred to the process at 1372-1383. Heat from each of the heat storage fluid at 1355-1354 and the gradient heat rejection process at 1366-1365 is transferred to the process at 1373-1382.

In charging mode, the Rankine cycle 1390 is a heat pump. Adiabatic compression processes occur at 1415-1414, 1415-1413, 1415-1412 and 1415-1411. Condensation processes occur at 1411-1396, 1412-1403, 1413-1402 and 1414-1401. An evaporation process with heat absorption occurs at 1391-1415. Gradient heat rejection processes occur at 1396-1395, 1395-1394, 1394-1393 and 1393-1392. An adiabatic expansion process (e.g., from a turbine) occurs at 1392-1391. Pumping processes occur at 1401-1393, 1402-1394 and 1403-1395. Heat from each of the condensation process at 1381-1366 and the gradient heat rejection process at 1393-1392 is transferred to the process at 1391-1415. Heat from each of the condensation process at 1414-1401 and the gradient heat rejection process at 1394-1393 is transferred to the heat storage fluid at 1341-1342. Heat from each of the condensation process at 1413-1402 and the gradient heat rejection process at 1395-1394 is transferred to the heat storage fluid at 1342-1343. Heat from each of the condensation process at 1412-1403 and the gradient heat rejection process at 1396-1395 is transferred to the heat storage fluid at 1343-1344. Heat from the condensation process at 1411-1396 is transferred to the heat storage fluid at 1344-1345.

In discharging mode, the Rankine cycle 1360 is a heat engine. Pumping processes occur at 1361-1362, 1371-1363, 1372-1364 and 1373-1365. Gradient heat absorption processes occur at 1362-1363, 1363-1364, 1364-1365 and 1365-1366. An evaporation processes with heat absorption occurs at 1366-1381. Adiabatic expansion processes occur at 1381-1382, 1381-1383, 1381-1384 and 1381-1385. Condensation processes occur at 1382-1373, 1383-1372, 1384-1371 and 1385-1361. Heat from the condensation process at 1385-1361 is transferred to the gradient heat absorption process at 1362-1363 and to the heat storage fluid at 1351-1352. Heat from the condensation process at 1384-1371 is transferred to the gradient heat absorption process at 1363-1364 and to the heat storage fluid at 1352-1353. Heat from the condensation process at 1383-1372 is transferred to the gradient heat absorption process at 1364-1365 and to the heat storage fluid at 1353-1354. Heat from the condensation process at 1382-1373 is transferred to the gradient heat absorption process at 1365-1366 and to the heat storage fluid at 1354-1355.

In discharging mode, the Rankine cycle 1390 is also a heat engine. Pumping process occur at 1391-1392. Adiabatic expansion processes occur at 1393-1401, 1394-1402 and 1395-1403. Gradient heat absorption processes occur at 1392-1393, 1393-1394, 1394-1395 and 1395-1396. Evaporation processes with heat absorption at various different temperatures and pressures (e.g., at successively decreasing temperatures and pressures) occur at 1396-1411, 1403-1412, 1402-1413 and 1401-1414. A condensation process occurs at 1415-1391. Heat from the condensation process at 1415-1391 is transferred to the gradient heat absorption process at 1392-1393 and to the evaporation process in the Rankine cycle 1360 at 1366-1381. Heat from the heat storage fluid at 1342-1341 is transferred to the evaporation process at 1401-1414 and to the gradient heat absorption process at 1393-1394. Heat from the heat storage fluid at 1343-1342 is transferred to the evaporation at 1402-1413 and to the gradient heat absorption process at 1394-1395. Heat from the heat storage fluid at 1344-1343 is transferred to the evaporation process at 1403-1412 and to the gradient heat absorption process at 1395-1396. Heat from the heat storage fluid at 1345-1344 is transferred to the evaporation process at 1396-1411.

Figure 25:
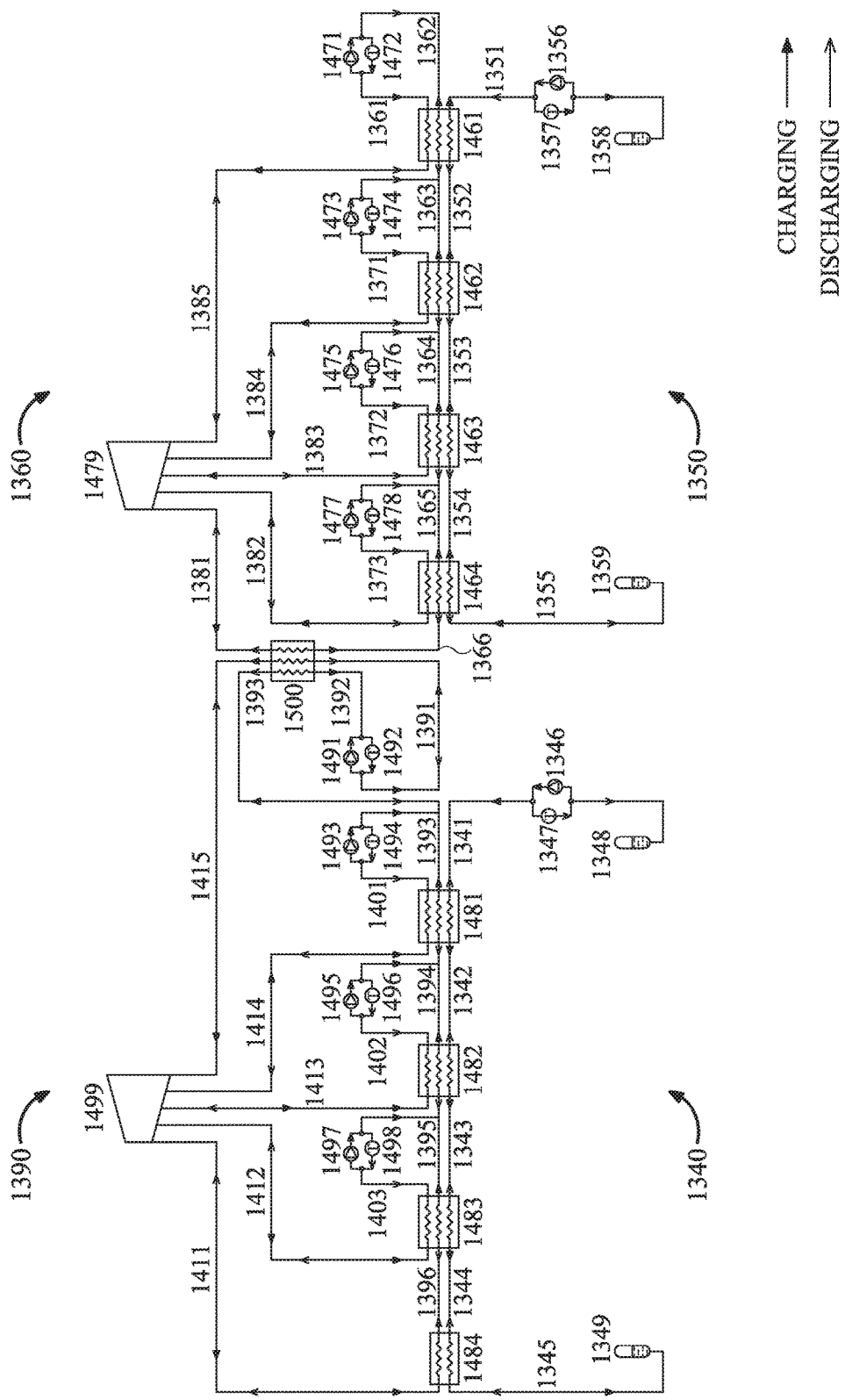
FIG. 25 shows a layout (or outlay) of a device that implements the TS diagram of FIG. 24.

FIG. 25 shows a layout of an exemplary energy storage and retrieval system implementing the heat storage systems 1340 and 1350, and the STEN devices (sliced Rankine cycles) 1360 and 1390. The sliced Rankine cycles 1360 and 1390 work as heat pumps in charging mode and as heat engines in discharging mode.

In charging mode, the energy storage and retrieval system of FIG. 25 includes compressors 1479 and 1499, turbines 1357, 1472, 1474, 1476, 1478 and 1492, pumps 1346, 1493, 1495 and 1497, evaporators 1461-1464, and condensers 1481-1484. In discharging mode, the energy storage and retrieval system of FIG. 25 includes expanders 1479 and 1499, turbines 1347, 1494, 1496 and 1498, pumps 1356, 1471, 1473, 1475, 1477 and 1491, condensers 1461-1464, and evaporators 1481-1484. the energy storage and retrieval system of FIG. 25 further includes a heat exchanger 1500. The circuit 1381-1366 is a condenser circuit and the circuit 1391-1415 is an evaporating circuit in charging mode. The situation is reversed in discharging mode (i.e., the circuit 1381-1366 is an evaporating circuit and the circuit 1391-1415 is a condenser circuit). When the heat storage systems 1340 and 1350 are fully charged, the tanks 1349 and 1358 are full or substantially full, and the tanks 1348 and 1359 are empty or substantially empty. The situation is reversed when the heat storage systems 1340 and 1350 are discharged.

Figure 26:
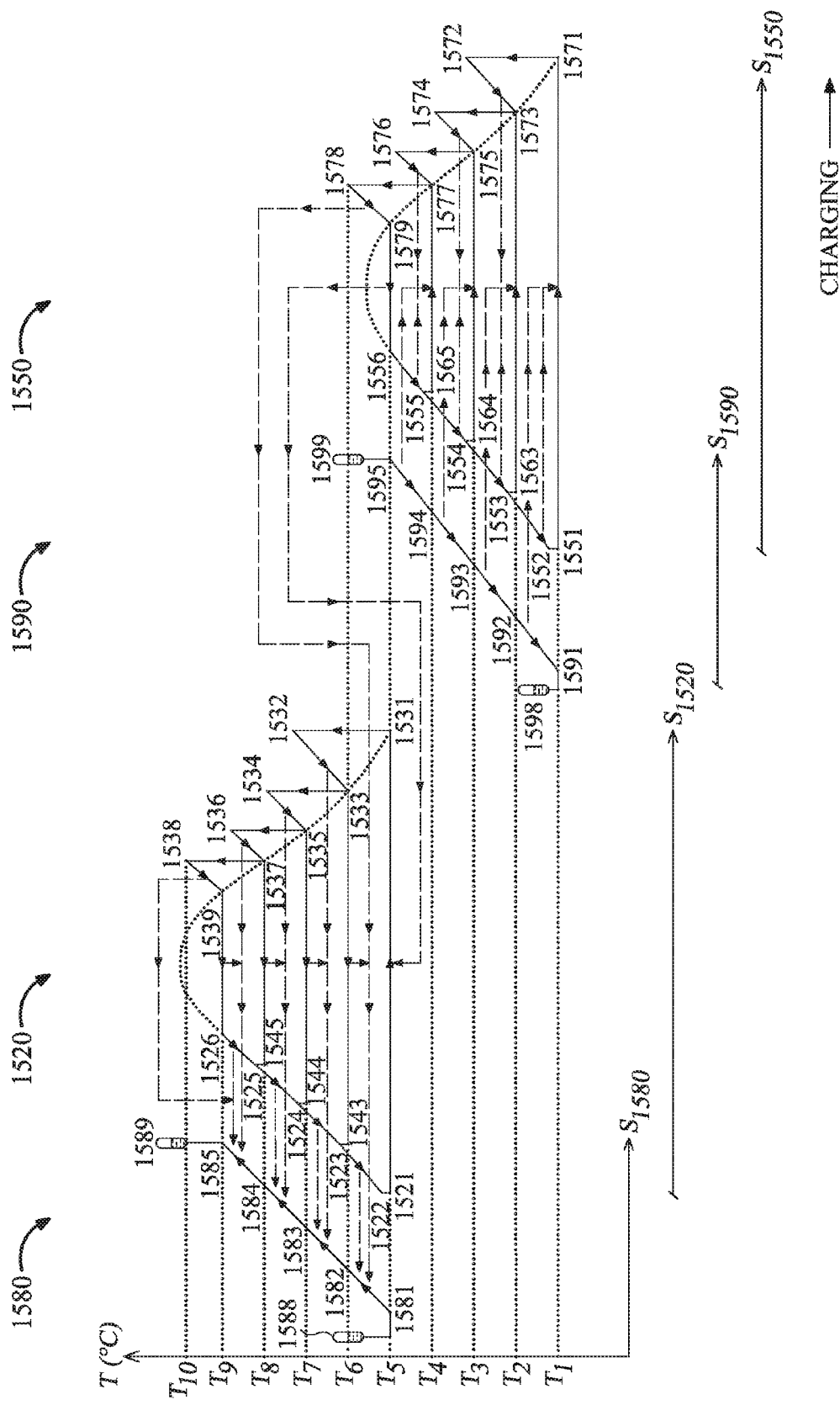
FIG. 26 shows a TS diagram for the charging mode of hot and cold wide-temperature range heat storage devices, with a sliced Rankine cycle and a reversible inverted sliced Rankine cycle having desuperheating functionality in a heat exchanger circuit and a serial compressor-expander configuration with a sliced vapor compression heat pump cycle combined with an inverted sliced vapor compression heat pump cycle in accordance with one or more embodiments of the present invention.

FIG. 26 is a TS diagram of STEN devices (combined Rankine cycles) 1520 and 1550, in conjunction with thermal energy storage and retrieval systems 1580 and 1590.

In charging mode, the Rankine cycle 1520 is a heat pump. Adiabatic compression processes occur at 1531-1532, 1533-1534, 1535-1536 and 1537-1538. Heat rejection processes occur at 1532-1533, 1534-1535, 1536-1537 and 1538-1539. Condensation processes occur at 1539-1526, 1537-1545, 1535-1544 and 1533-1543. Gradient heat rejection processes occur at 1526-1525, 1525-1524, 1524-1523 and 1523-1522. Pumping processes occur at 1545-1525, 1544-1524 and 1543-1523. An adiabatic expansion process (e.g., from a turbine) occurs at 1522-1521. An isothermal evaporation process with heat absorption occurs at 1521-1531. Heat from each of the gradient heat rejection processes at 1538-1539, 1526-1525 and 1536-1537 and the condensation process at 1539-1526 is transferred to the heat storage fluid at 1584-1585. Heat from each of the condensation process at 1537-1545 and the gradient heat rejection processes at 1525-1524 and 1534-1535 is transferred to the heat storage fluid at 1583-1584. Heat from each of the gradient heat rejection processes at 1532-1533 and 1524-1523 and the condensation process at 1535-1544 is transferred to the heat storage fluid at 1582-1583. Heat from each of the gradient heat rejection process at 1578-1579 (in the Rankine cycle 1550), the condensation process 1533-1543 and the gradient heat rejection process 1523-1522 is transferred to the heat storage fluid at 1581-1582. Heat from the condensation process at 1579-1556 (in the Rankine cycle 1550) is transferred to the evaporation process (in the Rankine cycle 1520) at 1521-1531.

In charging mode, the Rankine cycle 1550 is a heat pump. Adiabatic compression processes occur at 1571-1572, 1573-1574, 1575-1576 and 1577-1578. Heat rejection processes occur at 1572-1573, 1574-1575, 1576-1577 and 1578-1579. A condensation process occurs at 1579-1556. Gradient heat rejection processes occur at 1556-1555, 1555-1554, 1554-1553 and 1553-1552. Adiabatic expansion processes (e.g., from turbines) occur at 1555-1565, 1554-1564, 1553-1563 and 1552-1551. Evaporation processes with heat absorption at various different temperatures and pressures (e.g., at successively decreasing temperatures and pressures) occur at 1565-1577, 1564-1575, 1563-1573 and 1551-1571. Heat from each of the heat storage fluid at 1595-1594 and the gradient heat rejection processes at 1556-1555 and 1576-1577 is transferred to the evaporation process at 1565-1577. Heat from each of the heat storage fluid at 1594-1593 and the gradient heat rejection processes at 1555-1554 and 1574-1575 is transferred to the evaporation process at 1564-1575. Heat from each of the heat storage fluid at 1593-1592 and the gradient heat rejection processes at 1554-1553 and 1572-1573 is transferred to the evaporation process at 1563-1573. Heat from each of the heat storage fluid at 1592-1591 and the gradient heat rejection process at 1553-1552 is transferred to the evaporation process at 1551-1571.

Figure 27:
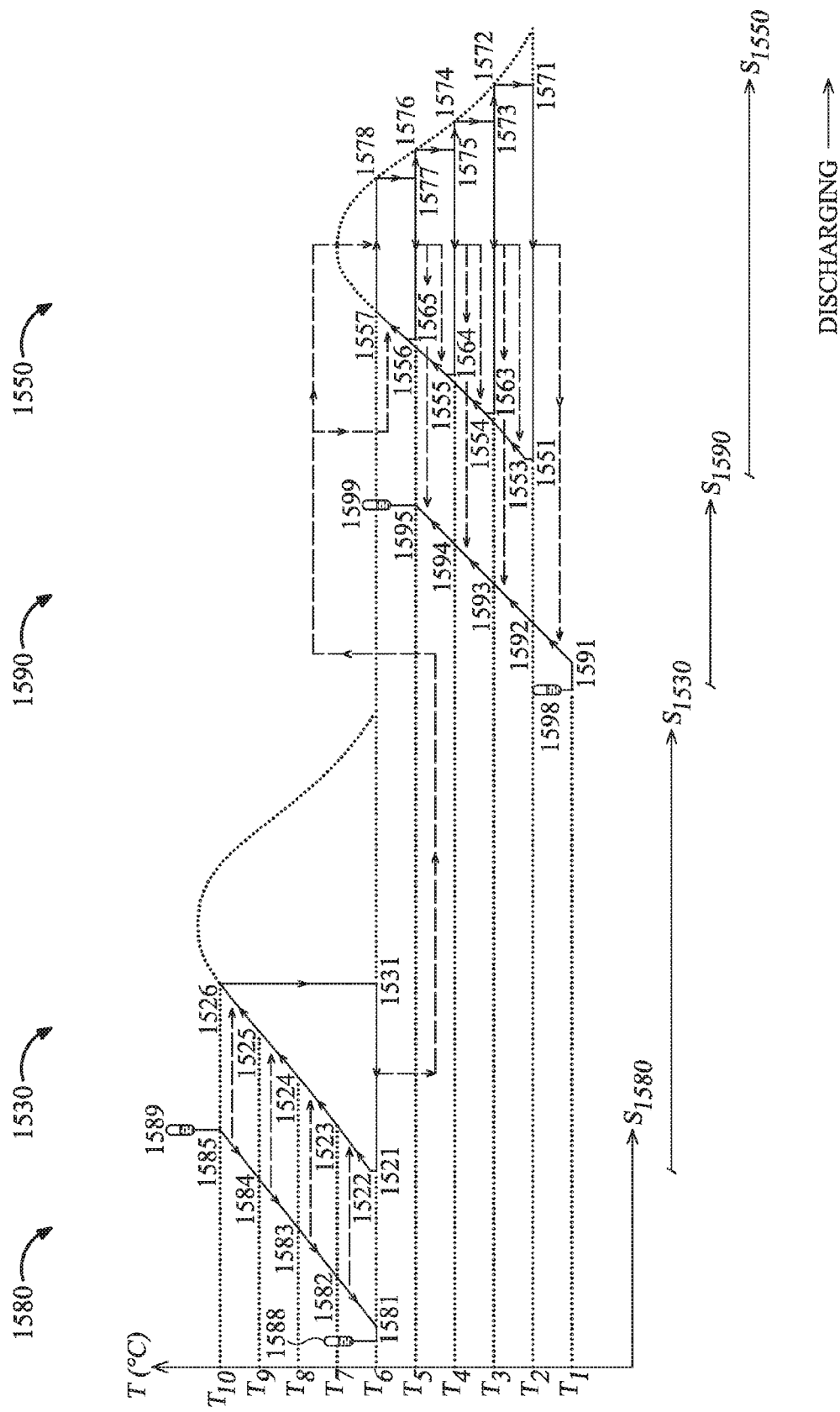
FIG. 27 shows a TS diagram for the discharging mode of the device(s) of FIG. 26 with a flash cycle heat engine in accordance with one or more embodiments of the present invention.

FIG. 27 is a TS diagram of combined cycle comprising a trilateral cycle 1530 and the STEN device (Rankine cycle) 1550, in conjunction with the thermal energy storage and retrieval systems 1580 and 1590.

In discharging mode, the trilateral cycle 1530 is a heat engine. A pumping process occurs at 1521-1522. Gradient heat absorption processes occur at 1522-1523, 1523-1524, 1524-1525 and 1525-1526. An adiabatic expansion process (e.g., from a turbine) occurs at 1526-1531. A condensation process with heat rejection occurs at 1531-1521. Heat from the heat storage fluid at 1585-1584 is transferred to the gradient heat absorption process at 1525-1526. Heat from the heat storage fluid at 1584-1583 is transferred to the gradient heat absorption process at 1524-1525. Heat from the heat storage fluid at 1583-1582 is transferred to the gradient heat absorption process at 1523-1524. Heat from the heat storage fluid at 1582-1581 is transferred to the gradient heat absorption process at 1522-1523. Heat from the condensation process at 1531-1521 is transferred to the gradient heat absorption and evaporation processes in the Rankine cycle 1550 at 1556-1557 and 1557-1578, respectively.

In discharging mode, the Rankine cycle 1550 (e.g., a sliced Rankine cycle) is a heat engine. Pumping processes occur at 1551-1553, 1563-1554, 1564-1555 and 1565-1556. Gradient heat absorption processes occur at 1553-1554, 1554-1555, 1555-1556 and 1556-1557. An evaporation process with heat absorption occurs at 1557-1578. Adiabatic expansion processes occur at 1578-1577, 1576-1575, 1574-1573 and 1572-1571. Condensation processes with heat rejection at various different temperatures and pressures (e.g., at successively decreasing temperatures and pressures) occur at 1577-1565, 1575-1564, 1573-1563 and 1571-1551. Heat from the condensation process at 1577-1565 is transferred to the gradient heat absorption process at 1555-1556, an isothermal evaporation process at 1577-1576, and the heat storage fluid at 1594-1595. Heat from the condensation process at 1575-1564 is transferred to the gradient heat absorption processes at 1554-1555, an isothermal evaporation process at 1575-1574, and the heat storage fluid at 1593-1594. Heat from the condensation process at 1573-1563 is transferred to the gradient heat absorption process at 1553-1554, the isothermal evaporation process at 1573-1572, and the heat storage fluid at 1592-1593. Heat from the condensation process at 1571-1551 is transferred to the heat storage fluid at 1591-1592.

Figure 28:
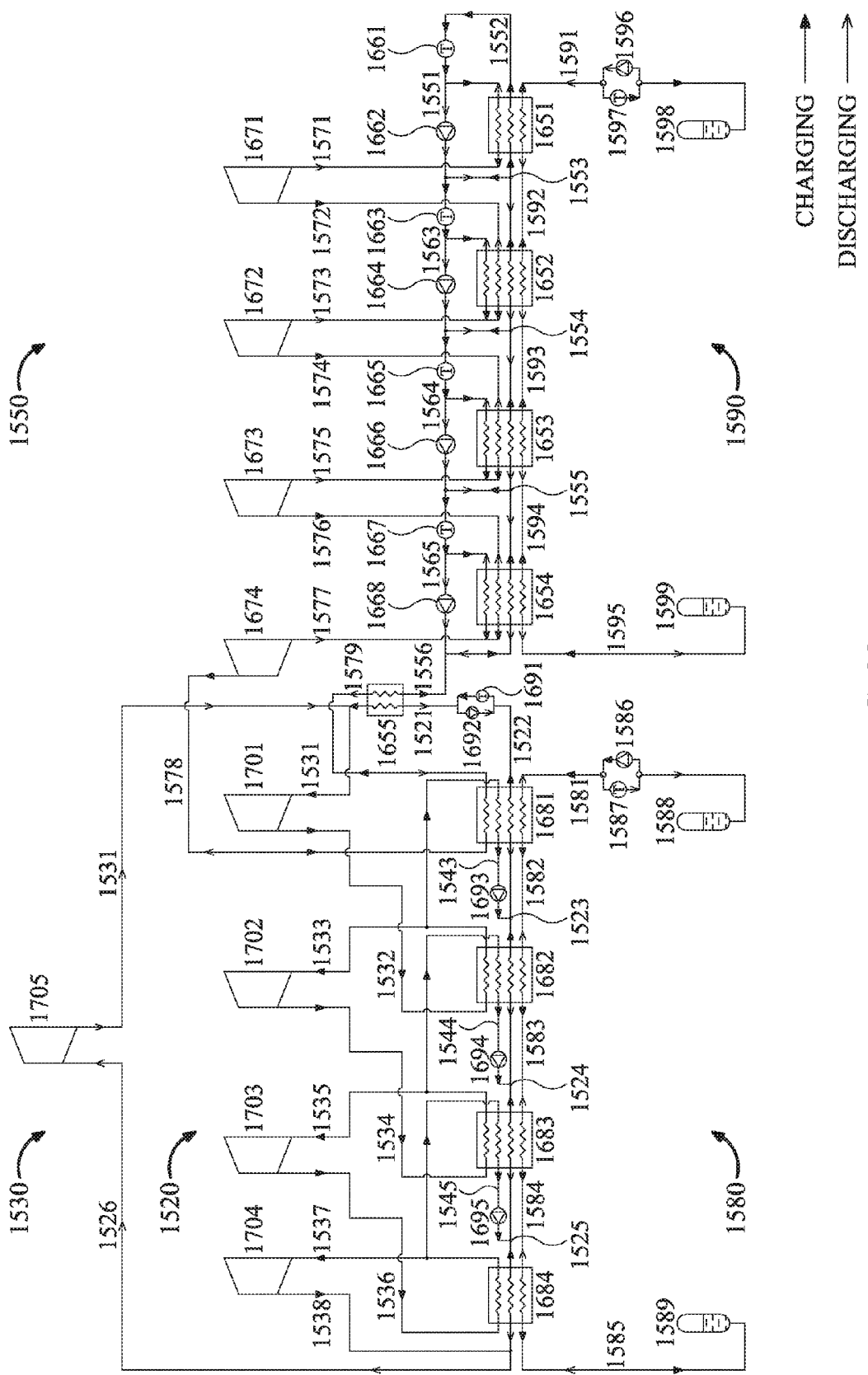
FIG. 28 shows a layout (or outlay) of hot and cold wide-temperature range heat storage devices with a sliced Rankine cycle and a reversible inverted sliced Rankine cycle having desuperheating capability in one or more heat exchanger circuits and a serial compressor-expander configuration that implements the TS diagrams of FIGS. 26-27.

FIG. 28 shows a layout of an exemplary energy storage and retrieval system implementing the heat storage systems 1580 and 1590, the trilateral cycle 1530, and the exemplary STEN devices 1550 and 1520. The STEN device 1550 is a sliced Rankine cycle that operates in both charging and discharging modes. The STEN device 1520 operates as a sliced Rankine cycle in the charging mode, but does not operate in the discharging mode. The trilateral cycle 1530 operates in the discharging mode, but not in the charging mode. The STEN device 1520 and the trilateral cycle 1530 may be parts of a reversible device that operates as a sliced Rankine cycle in the charging mode and as a trilateral cycle in the discharging mode. The sliced Rankine cycles 1550 and 1520 work as heat pumps in charging mode, and the Rankine cycle 1550 and the trilateral cycle 1530 work as heat engines in discharging mode.

In charging mode, the energy storage and retrieval system of FIG. 28 includes compressors 1671-1674 and 1701-1704, turbines 1661, 1663, 1665, 1667, 1691 and 1597, pumps 1586 and 1693-1695, evaporators 1651-1654, condensers 1681-1684, and a heat exchanger 1655. In discharging mode, the energy storage and retrieval system of FIG. 28 includes expanders 1671-1674 and 1705, a turbine 1587, pumps 1596, 1662, 1664, 1666, 1668 and 1692, heat exchangers 1655 and 1681-1684, and condensers 1651-1654. The circuit 1579-1556 of the heat exchanger 1655 is a condenser circuit and the circuit 1521-1531 is an evaporating circuit in charging mode. The situation is reversed in discharging mode. When the heat storage systems 1580 and 1590 are fully charged, the tanks 1598 and 1589 are full or substantially full, and the tanks 1599 and 1588 are empty or substantially empty. The situation is reversed when the heat storage systems 1580 and 1590 are discharged.

Figure 29:
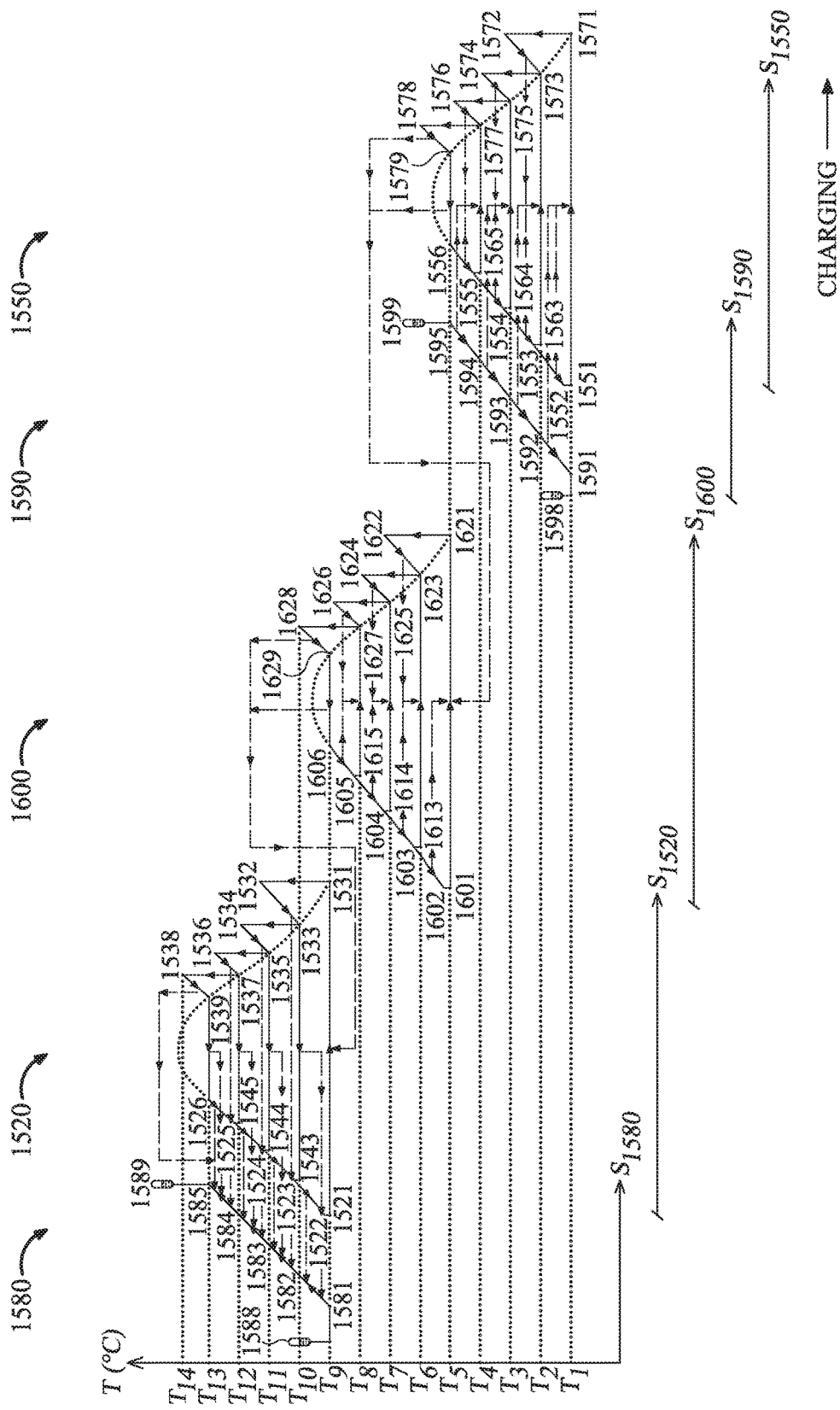
FIG. 29 shows a TS diagram for the charging mode of a device similar to the device in FIG. 28 with an intermediary regenerative reversible cycle working as a regenerative vapor compression cycle in accordance with one or more embodiments of the present invention.

FIG. 29 is a TS diagram of combined cycle comprising a plurality of STEN devices (the Rankine cycle 1520, the Rankine cycle 1550, and the Rankine cycle 1600) in conjunction with the thermal energy storage and retrieval systems 1580 and 1590.

In charging mode, the Rankine cycle 1520 is a heat pump. Adiabatic compression processes occur at 1531-1532, 1533-1534, 1535-1536 and 1537-1538. Heat rejection processes occur at 1532-1533, 1534-1535, 1536-1537 and 1538-1539. Condensation processes occur at 1539-1526, 1537-1545, 1535-1544 and 1533-1543. Gradient heat rejection processes occur at 1526-1525, 1525-1524, 1524-1523 and 1523-1522. Pumping processes occur at 1545-1525, 1544-1524 and 1543-1523. An adiabatic expansion process (e.g., from a turbine) occurs at 1522-1521. An evaporation process with heat absorption occurs at 1521-1531. Heat from each of the gradient heat rejection processes at 1538-1539, 1526-1525 and 1536-1537 and the condensation process 1539-1526 is transferred to the heat storage fluid at 1584-1585. Heat from each of the gradient heat rejection processes at 1525-1524 and 1534-1535 and the condensation process 1537-1545 is transferred to the heat storage fluid at 1583-1584. Heat from each of the gradient heat rejection processes at 1532-1533 and 1524-1523 and the condensation process at 1535-1544 is transferred to the heat storage fluid at 1582-1583. Heat from each of the gradient heat rejection process at 1523-1522 and the condensation process at 1533-1543 is transferred to the heat storage fluid at 1581-1582. Heat from each of the gradient heat rejection process in the cycle 1600 at 1628-1629 and the condensation process 1629-1606 is transferred to the evaporation process in the cycle 1520 at 1521-1531.

In charging mode, the Rankine cycle 1600 is a heat pump. Adiabatic compression processes occur at 1621-1622, 1623-1624, 1625-1626 and 1627-1628. Heat rejection processes occur at 1622-1623, 1624-1625, 1626-1627 and 1628-1629. A condensation process occurs at 1629-1606. Gradient heat rejection processes occur at 1606-1605, 1605-1604, 1604-1603 and 1603-1602. Adiabatic expansion processes (e.g., from turbines) occur at 1605-1615, 1604-1614, 1603-1613 and 1602-1601. Evaporation processes with heat absorption at various different temperatures and pressures (e.g., at successively decreasing temperatures and pressures) occur at 1615-1627, 1614-1625, 1613-1623 and 1601-1621. Heat from each of the gradient heat rejection processes at 1606-1605 and 1626-1627 is transferred to the evaporation process at 1615-1627. Heat from each of the gradient heat rejection processes at 1605-1604 and 1624-1625 is transferred to the evaporation process at 1614-1625. Heat from each of the gradient heat rejection processes at 1604-1603 and 1622-1623 is transferred to the evaporation process at 1613-1623. Heat from the gradient heat rejection process at 1603-1602 is transferred to the evaporation process at 1601-1621. Heat is also transferred from the gradient heat rejection process at 1578-1579 and the condensation process at 1579-1556 (in the Rankine cycle 1550) to the evaporation process at 1601-1621.

In charging mode, the Rankine cycle 1550 is a heat pump. Adiabatic compression processes occur at 1571-1572, 1573-1574, 1575-1576 and 1577-1578. Heat rejection processes occur at 1572-1573, 1574-1575, 1576-1577 and 1578-1579. A condensation process occurs at 1579-1556. Gradient heat rejection processes occur at 1556-1555, 1555-1554, 1554-1553 and 1553-1552. Adiabatic expansion processes (e.g., from turbines) occur at 1555-1565, 1554-1564, 1553-1563 and 1552-1551. Evaporation processes with heat absorption at various different temperatures and pressures (e.g., at successively decreasing temperatures and pressures) occur at 1565-1577, 1564-1575, 1563-1573, and 1551-1571. Heat from each of the heat storage fluid at 1595-1594 and the gradient heat rejection processes at 1556-1555 and 1576-1577 is transferred to the evaporation process at 1565-1577. Heat from each of the heat storage fluid at 1594-1593 and the gradient heat rejection processes at 1555-1554 and 1574-1575 is transferred to the evaporation process at 1564-1575. Heat from each of the heat storage fluid at 1593-1592 and the gradient heat rejection processes at 1554-1553 and 1572-1573 is transferred to the evaporation process at 1563-1573. Heat from each of the heat storage fluid at 1592-1591 and the gradient heat rejection process at 1553-1552 is transferred to the evaporation process at 1551-1571.

Figure 30:
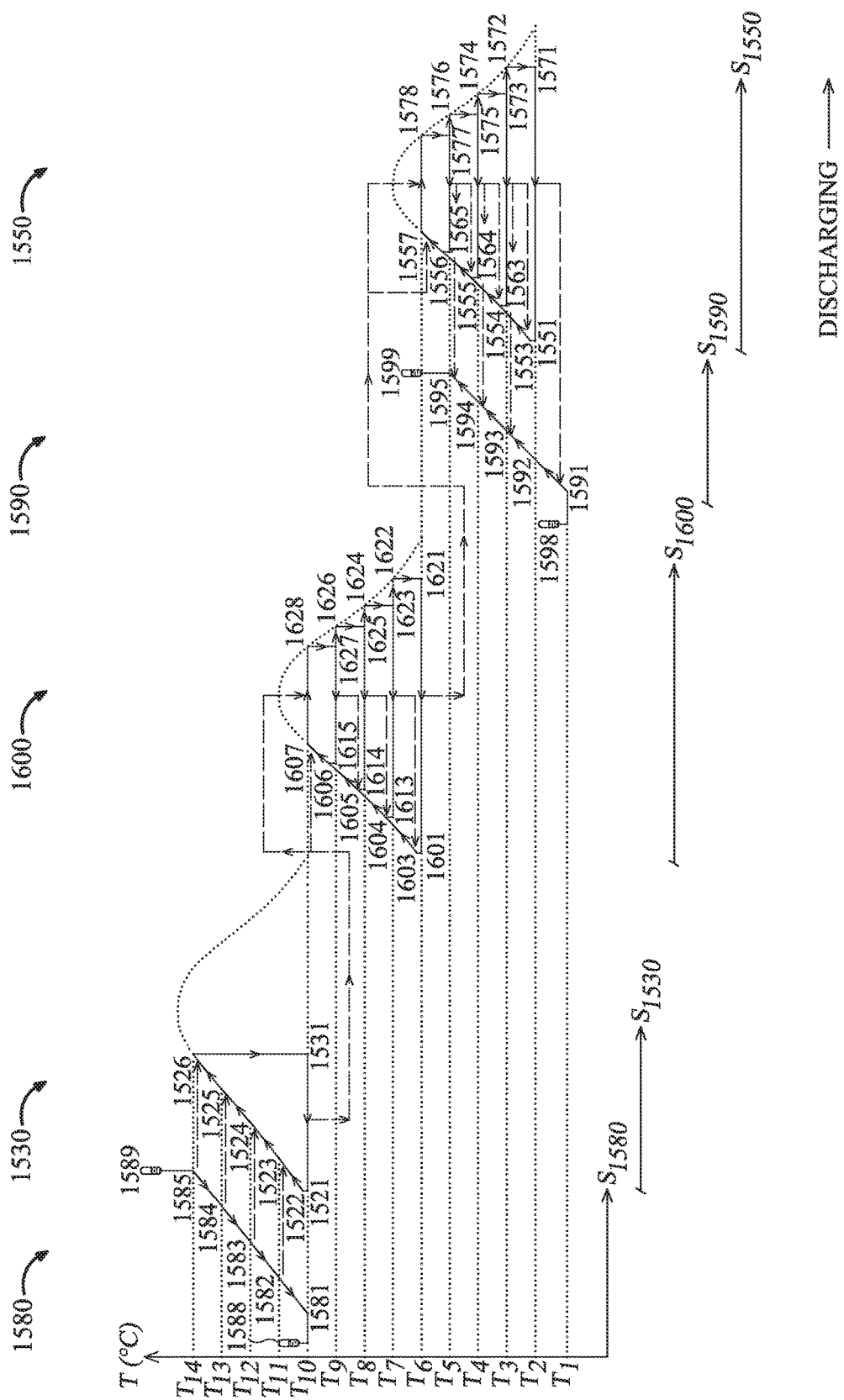
FIG. 30 shows a TS diagram for the discharging mode of the device in FIG. 28 with the intermediary cycle working as a regenerative Rankine cycle in accordance with one or more embodiments of the present invention.

FIG. 30 is a TS diagram of a combined cycle comprising a plurality of STEN devices (the Rankine cycles 1550 and 1600) in conjunction with the trilateral cycle 1530 and the thermal energy storage and retrieval systems 1580 and 1590.

In discharging mode, the trilateral cycle 1530 is a heat engine. A pumping process occurs at 1521-1522. Gradient heat absorption processes occur at 1522-1523, 1523-1524, 1524-1525 and 1525-1526. An adiabatic expansion process (e.g., from a turbine) occurs at 1526-1531. A condensation process with heat rejection occurs at 1531-1521. Heat from the heat storage fluid at 1585-1584 is transferred to the gradient heat absorption process at 1525-1526. Heat from the heat storage fluid at 1584-1583 is transferred to the gradient heat absorption process at 1524-1525. Heat from the heat storage fluid at 1583-1582 is transferred to the gradient heat absorption process at 1523-1524. Heat from the heat storage fluid at 1582-1581 is transferred to the gradient heat absorption process at 1522-1523. Heat from the condensation process at 1531-1521 is transferred to the gradient heat absorption and evaporation processes at 1606-1607 and 1607-1628, respectively, in the Rankine cycle 1600.

In discharging mode, the Rankine cycle 1600 (e.g., a sliced Rankine cycle) is a heat engine. Pumping processes occur at 1601-1603, 1613-1604, 1614-1605 and 1615-1606. Gradient heat absorption processes occur at 1603-1604, 1604-1605, 1605-1606 and 1606-1607. An evaporation process with heat absorption occurs at 1607-1628. Adiabatic expansion processes occur at 1628-1627, 1626-1625, 1624-1623 and 1622-1621. Condensation processes with heat rejection at various different temperatures and pressures (e.g., at successively decreasing temperatures and pressures) occur at 1627-1615, 1625-1614, 1623-1613 and 1621-1601. Heat from the condensation process at 1627-1615 is transferred to the gradient heat absorption process at 1605-1606 and the condensation process at 1627-1626. Heat from the condensation process at 1625-1614 is transferred to the gradient heat absorption process at 1604-1605 and the condensation process at 1625-1624. Heat from the condensation process at 1623-1613 is transferred to the gradient heat absorption process at 1603-1604 and the condensation process at 1623-1622. Heat from the condensation process at 1621-1601 is transferred to the gradient heat absorption and evaporation processes in the Rankine cycle 1550 at 1556-1557 and 1557-1578, respectively.

In discharging mode, the Rankine cycle 1550 (e.g., a sliced Rankine cycle) is a heat engine. Pumping processes occur at 1551-1553, 1563-1554, 1564-1555 and 1565-1556. Gradient heat absorption processes occur at 1553-1554, 1554-1555, 1555-1556 and 1556-1557. An evaporation process with heat absorption occurs at 1557-1578. Adiabatic expansion processes occur at 1578-1577, 1576-1575, 1574-1573 and 1572-1571. Condensation processes with heat rejection at various different temperatures and pressures (e.g., at successively decreasing temperatures and pressures) occur at 1577-1565, 1575-1564, 1573-1563 and 1571-1551. Heat from the condensation process at 1577-1565 is transferred to the gradient heat absorption process at 1555-1556, the evaporation process at 1577-1576, and the heat storage fluid at 1594-1595. Heat from the condensation process at 1575-1564 is transferred to the gradient heat absorption process at 1554-1555, the evaporation process at 1575-1574, and the heat storage fluid at 1593-1594. Heat from the condensation process at 1573-1563 is transferred to the process at gradient heat absorption 1553-1554, the evaporation process at 1573-1572, and the heat storage fluid at 1592-1593. Heat from the condensation process at 1571-1551 is transferred to the heat storage fluid at 1591-1592.

Figure 31:
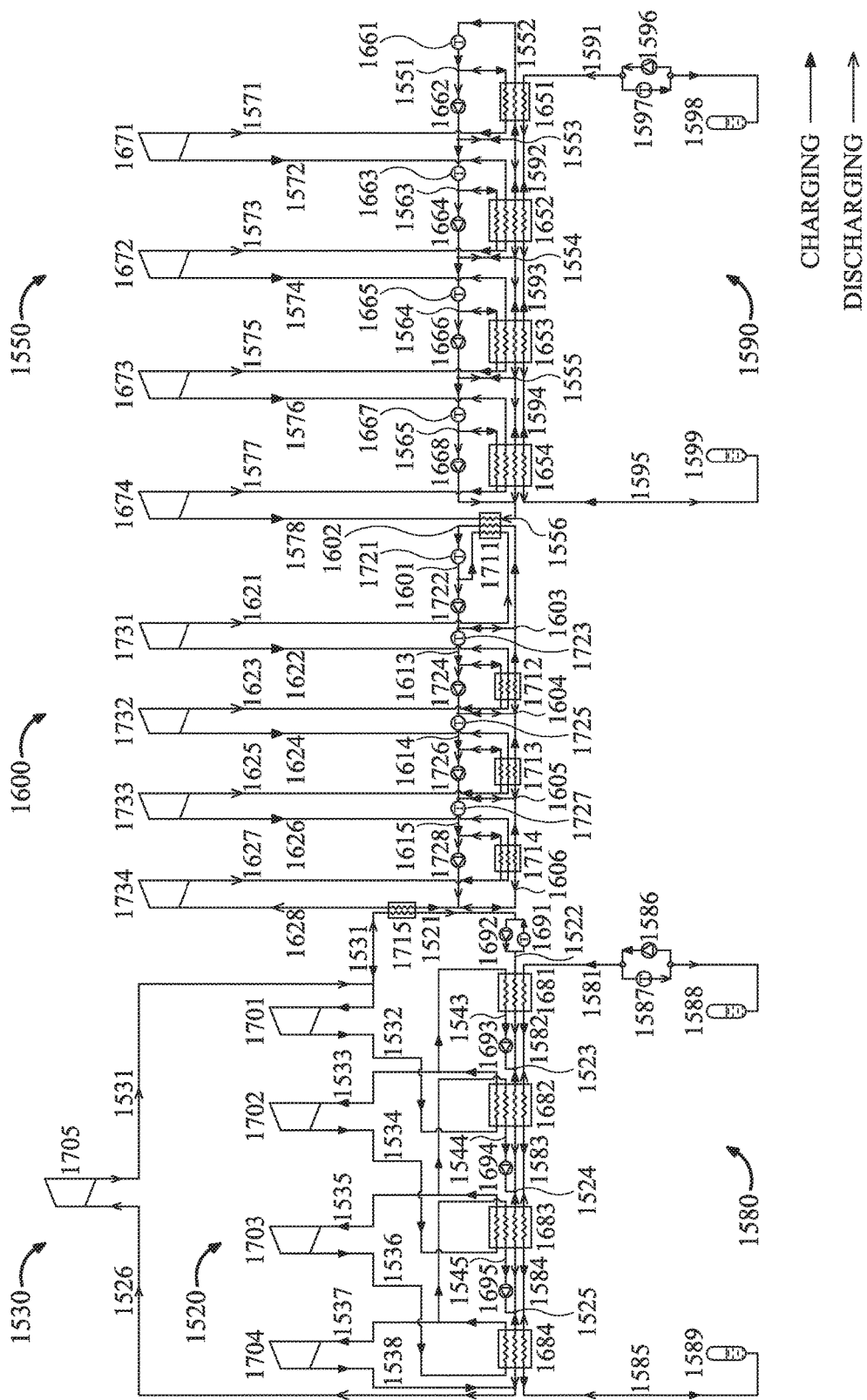
FIG. 31 shows a layout (or outlay) of a device with an intermediary regenerative reversible cycle that implement the TS diagrams of FIGS. 28-29 in accordance with one or more embodiments of the present invention.

FIG. 31 shows a layout of an exemplary energy storage and retrieval system implementing the heat storage systems 1580 and 1590, the STEN devices (sliced Rankine cycles) 1550, 1520 and 1600, and the trilateral cycle 1530. The STEN devices 1550, 1520 and 1600 operate in charging mode as heat pumps, and the STEN devices 1550 and 1600 operate in discharging mode as heat engines. In discharging mode, the trilateral cycle 1530 operates, but the sliced Rankine cycle 1520 does not operate. The STEN device 1520 and the trilateral cycle 1530 may be parts of a reversible device that operates as a sliced Rankine cycle in the charging mode and as a trilateral cycle in the discharging mode.

In charging mode, the energy storage and retrieval system of FIG. 31 includes compressors 1671-1674, 1701-1704 and 1731-1734, turbines 1661, 1663, 1665, 1667, 1691, 1597, 1721, 1723, 1725 and 1727, pumps 1693-1695 and 1586, evaporators 1651-1654 and 1712-1714, heat exchangers 1711 and 1715, and condensers 1681-1684. In discharging mode, the energy storage and retrieval system of FIG. 31 includes expanders 1671-1674, 1705 and 1731-1734, a turbine 1587, pumps 1596, 1662, 1664, 1666, 1668, 1692, 1722, 1724, 1726 and 1728, condensers 1651-1654 and 1712-1714, and heat exchangers 1681-1684, 1711 and 1715. The circuit 1578-1556 of the heat exchanger 1711 is a condenser circuit, and the circuit 1601-1621 is an evaporating circuit in charging mode. In discharging mode, the circuit 1556-1578 is an evaporating circuit, and the circuit 1621-1601 is a condenser circuit. The circuit 1628-1606 of the heat exchanger 1715 is a condenser circuit, and the circuit 1521-1531 is an evaporating circuit in charging mode. In discharging mode, the circuit 1606-1628 of the heat exchanger 1715 is an evaporating circuit, and the circuit 1531-1521 is a condenser circuit. When the heat storage systems 1580 and 1590 are fully charged, the tanks 1598 and 1589 are full or substantially full, and the tanks 1599 and 1588 are empty or substantially empty. The situation is reversed when the heat storage systems 1580 and 1590 are discharged.

Figure 32:
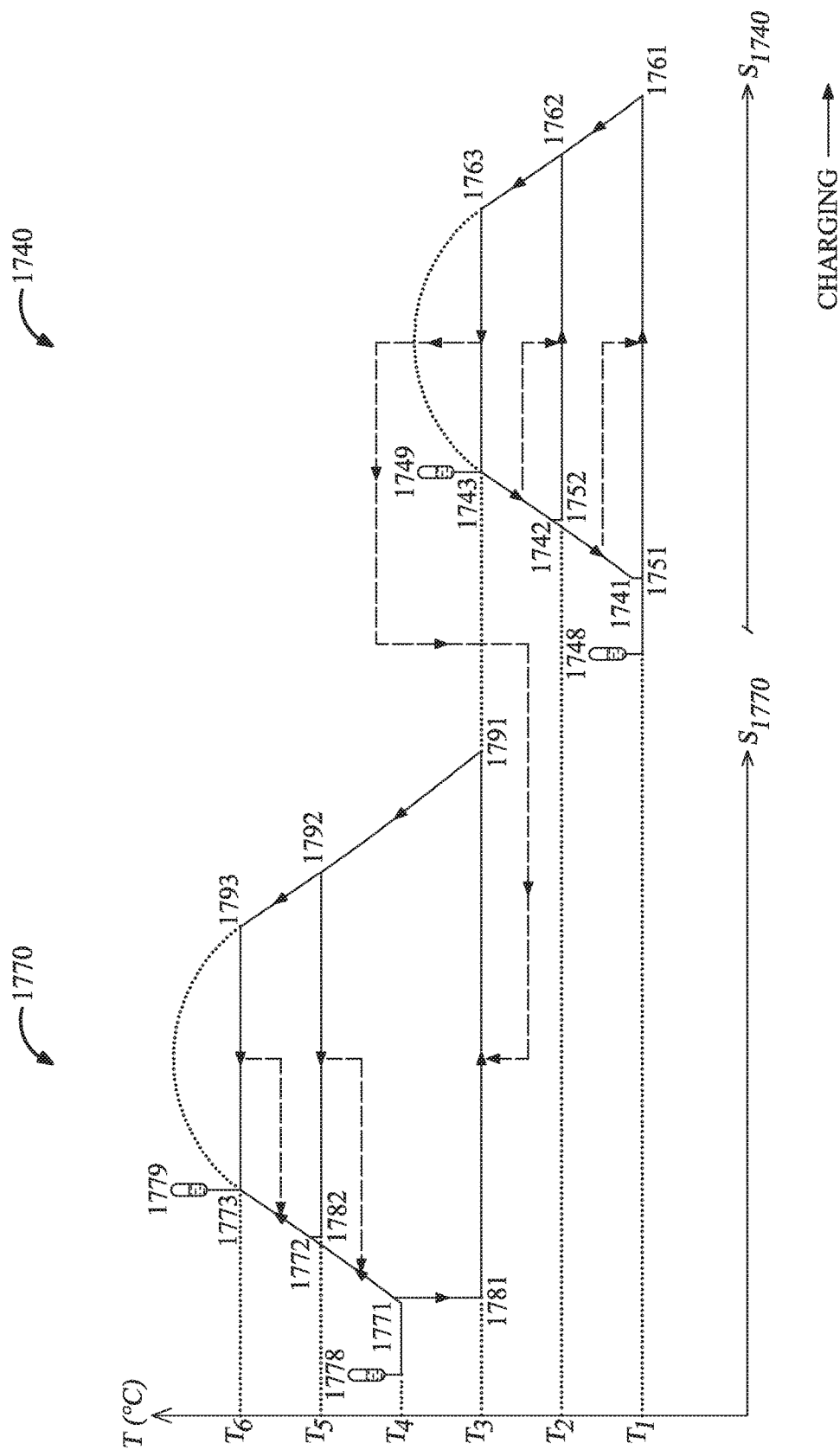
FIG. 32 shows a TS diagram for a device having hot and cold wide-temperature range heat storage devices, a sliced vapor compression heat pump cycle, a reversible inverted sliced vapor compression heat pump cycle, and a serial compressor-expander configuration in charging mode in accordance with one or more embodiments of the present invention.

FIG. 32 is a TS diagram of combined cycle comprising exemplary STEN devices (e.g., sliced cycles) 1770 and 1740 in charging mode. Cycle 1770 is similar to a Rankine cycle in the TS diagram. However, looking at it from the outside, it has an isothermal heat absorption at 1781-1791 (e.g., the bottom, at temperature $T_1$) and a gradient heat rejection cycles 1770 and 1740 and the working fluids therein are integrated with a heat storage system and heat storage fluid therein (i.e., the cycle and corresponding heat storage system use one and the same heat storage fluid or media). Where the fluid not is involved in the cycle as a working fluid (e.g., 1771-1772), it absorbs heat, rejected from the working fluid. The same principles apply for the cycle 1740, except that where the fluid not is involved as a working fluid, it rejects heat, absorbed by the working fluid.

In charging mode, the cycle 1770 works as a heat pump. The relatively cold fluid in the heat storage tank 1778 is divided into two streams, where the first stream flows at 1771-1781-1791-1792-1793-1773 as a working fluid, and the second stream flows at 1771-1772-1773 as a heat storage medium. All fluid ends up in the relatively hot heat storage tank 1779. Gradient heat absorption processes occur at 1771-1772 and 1772-1773 from the isothermal condensation processes 1792-1782 and 1793-1773, respectively. An adiabatic expansion process occurs at 1771-1781. A pumping process occurs at 1782-1772. An evaporation process occurs at 1781-1791, where heat is absorbed from a condensation process in cycle 1740 at 1763-1743. Liquid injected compression processes occur at 1791-1792 and 1792-1793. Condensation processes with heat rejection at various different temperatures and pressures (e.g., at successively increasing temperatures and pressures) occur at 1792-1782 and 1793-1773, where the heat is absorbed by the fluid at 1771-1772 and 1772-1773, respectively.

In charging mode, the cycle 1740 works as a heat pump. Liquid injected compression processes occur at 1761-1762 and 1762-1763. A condensation process occurs at 1763-1743 with heat rejection, and the heat is transferred to the evaporation process 1781-1791 in cycle 1770. Isothermal evaporation processes with heat absorption at various different temperatures and pressures (e.g., at successively decreasing temperatures and pressures) occur at 1752-1762 and 1751-1761. Gradient heat rejection processes occur at 1743-1742 and 1742-1741. Adiabatic expansion processes occur at 1742-1752 and 1741-1751. Heat from the gradient heat rejection process at 1743-1742 is transferred to the working fluid at 1752-1762. Heat from the gradient heat rejection process at 1742-1741 is transferred to the working fluid at 1751-1761.

Figure 33:
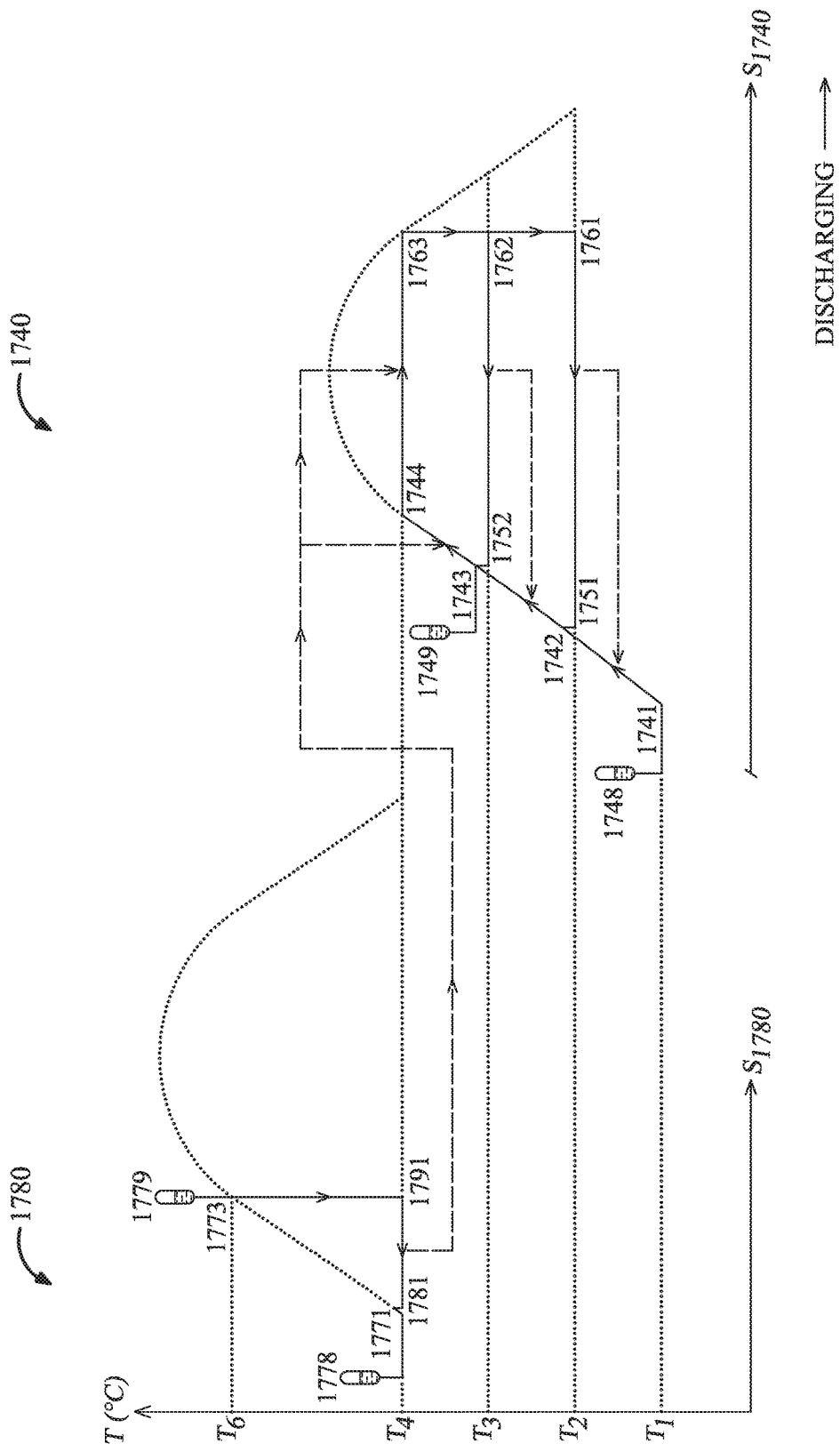
FIG. 33 shows a TS diagram for the device in FIG. 32 in discharging mode, with a flash trilateral heat engine cycle combined with an inverted sliced Rankine heat engine cycle (the inverted sliced vapor compression heat pump cycle in reverse operation) in accordance with one or more embodiments of the present invention.

FIG. 33 is a TS diagram of the combined cycle of FIG. 32, comprising the circuit 1780 (which is similar to a trilateral cycle, such as a flash cycle) and the STEN device 1740 (which is similar to a sliced Rankine cycle). The cycle conditions described above in FIG. 32 also apply to the cycle and circuit in FIG. 33.

In discharging mode, circuit 1780 and cycle 1740 are heat engines. Circuit 1780 includes an adiabatic expansion process (e.g., from a turbine) at 1773-1791 and a condensation process with heat rejection at 1791-1781. Heat from the condensation process at 1791-1781 is transferred to the working fluid in the cycle 1740 at 1743-1744-1763. A pumping process occurs at 1781-1771. In cycle 1740, pumping processes occur at 1751-1742 and 1752-1743. Gradient heat absorption processes occur at 1741-1742, 1742-1743, and 1743-1744. An evaporation process with heat absorption occurs at 1744-1763. Heat is absorbed from the heat rejection process 1791-1781 in the cycle 1780 to the processes at 1743-1744 and 1744-1763, respectively, in the cycle 1740. Adiabatic expansion processes occur at 1763-1762 and 1762-1761. Condensation processes with heat rejection at various different temperatures and pressures (e.g., at successively decreasing temperatures and pressures) occur at 1762-1752 and 1761-1751. Heat from the condensation process at 1762-1752 is transferred to the working fluid at 1742-1743. Heat from the condensation process at 1761-1751 is transferred to the working fluid at 1741-1742.

Figure 34:
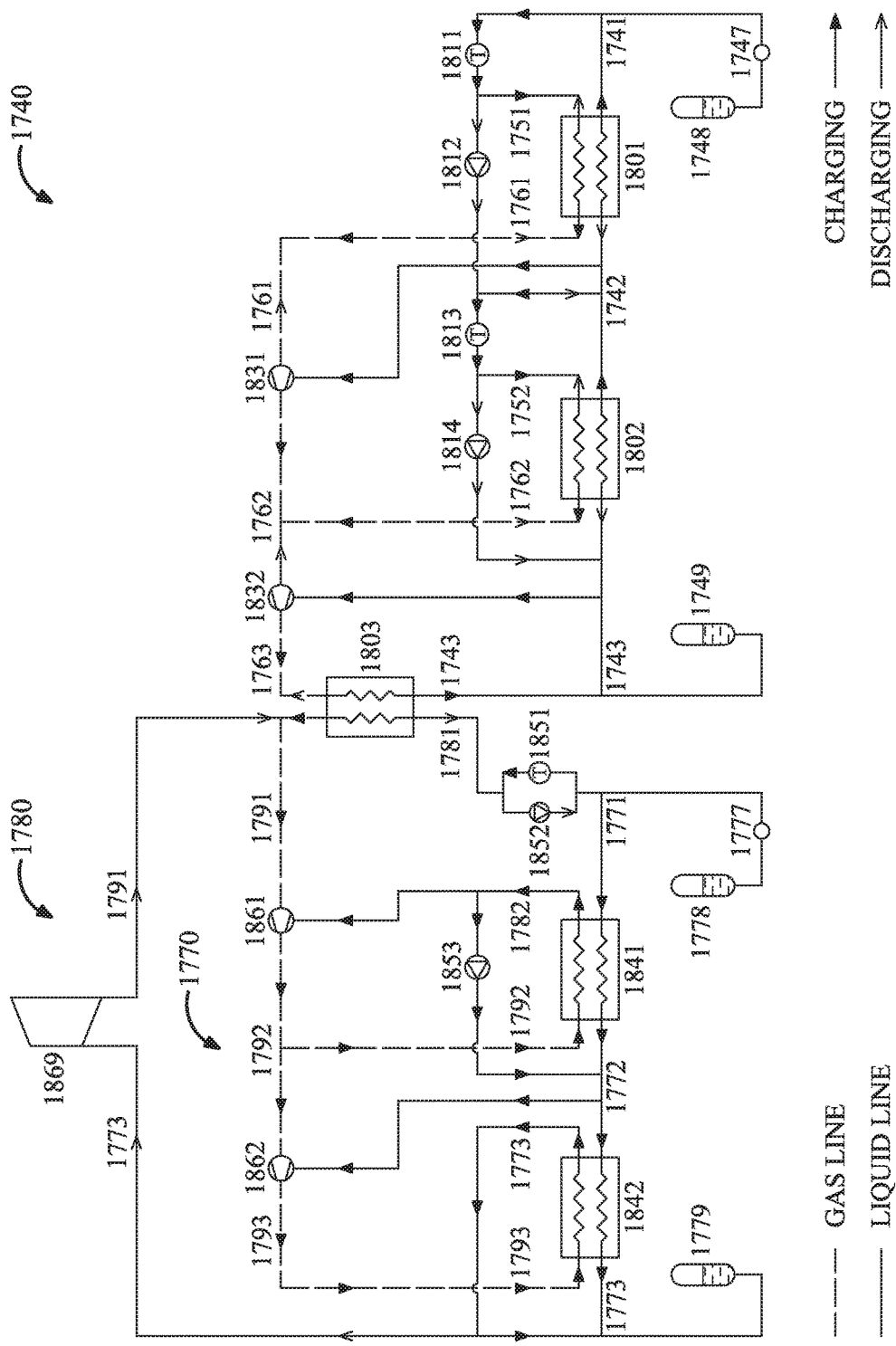
FIG. 34 shows a layout (or outlay) of hot and cold wide-temperature range heat storage devices in combination with a sliced Rankine cycle, a reversible inverted sliced Rankine cycle, and a serial compressor-expander configuration, with liquid injection desuperheating capability and/or functionality, that implements the TS diagrams of FIG. 32-33 in accordance with one or more embodiments of the present invention.

FIG. 34 shows a layout of a liquid heat storage system. The left side of FIG. 34 shows the circuit 1780 and STEN device 1770 (which is similar to a sliced Rankine cycle) working as a trilateral heat pump in charging mode and as a trilateral heat engine in discharging mode. The right side of FIG. 34 shows the STEN device 1740 (which is also similar to a sliced Rankine cycle) working as a trilateral heat pump in charging mode and as a trilateral heat engine in discharging mode.

In charging mode, the liquid heat storage system of FIG. 34 includes liquid injected compressors 1831-1832 and 1861-1862, turbines 1811, 1813 and 1851, pumps 1853 and 1777, condensers 1841-1842, heat exchanger 1803, and evaporators 1801-1802. In discharging mode, the liquid heat storage system of FIG. 34 includes pumps 1812 and 1814, expanders 1831-1832 and 1869, pumps 1747 and 1852, heat exchanger 1803, and condensers 1801-1802. The circuit 1763-1743 of the heat exchanger 1803 is a condenser circuit and the circuit 1781-1791 is an evaporating circuit in charging mode. The situation is reversed in discharging mode. When the heat storage system is fully charged, the tanks 1779 and 1748 are full or substantially full, and the tanks 1778 and 1749 are empty or substantially empty. The situation is reversed when the heat storage system is discharged.

Figure 35:
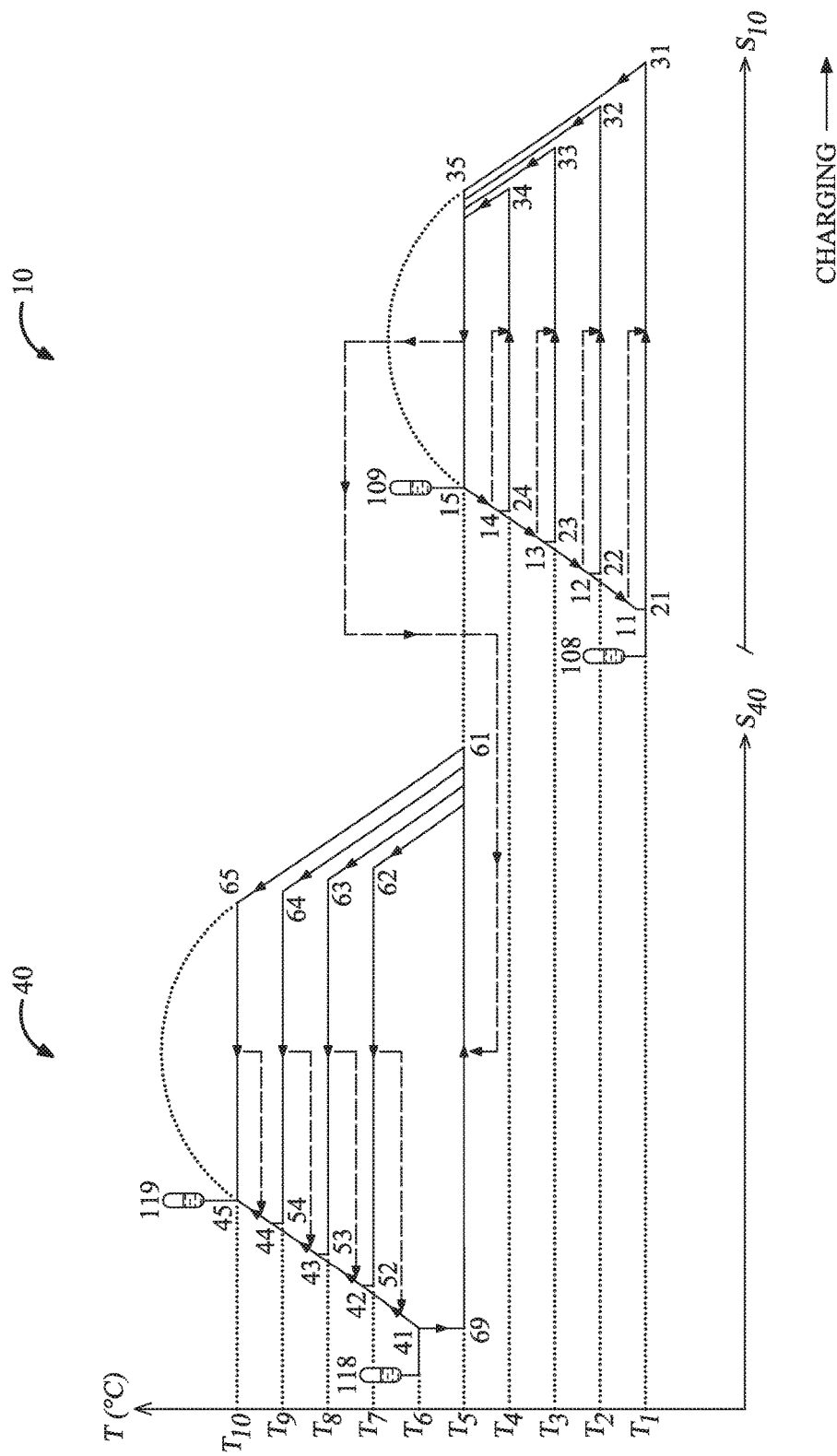
FIG. 35 shows a TS diagram for a device including hot and cold wide-temperature range heat storage devices, a sliced vapor compression heat pump cycle, a reversible inverted sliced vapor compression heat pump cycle, and a parallel compressor-expander configuration, with liquid injection desuperheating capability and/or functionality, in charging mode in accordance with one or more embodiments of the present invention.

FIG. 35 shows a TS diagram of a liquid energy storage system (discussed in more detail below with regard to FIG. 37) in charging mode. The STEN device 40 uses a first universal fluid as both a heat storage fluid and a working fluid. The flow of the first universal fluid from storage tank 118 branches at 41, with working fluid portions of the flow rejoining the heat storage fluid flow at 42, 43 and 44. All flows are joined at 45. Each of the circuits 41-69-61-65-45, 41-69-61-64-54-44, 41-69-61-63-53-43 and 41-69-61-62-52-42 works as an open cycle heat pump. Each cycle receives heat in a common heat absorption process 69-61, rejects heat to the heat storage fluid flow of the first universal fluid in successive temperature ranges (e.g., 41-42 then 42-43, then 43-44, etc.), and is then collected in a storage tank 119.

The STEN device 10 uses a second universal fluid as both heat storage fluid and working fluid. The heat storage fluid flow of the second universal fluid from tank 109 branches at 14, 13, 12 and 11 to form working fluid flows. The working fluid flows join the heat storage fluid flow at 15. The device 10 has four vapor compression cycles 15-11-21-31-35-15, 15-12-22-32-35-15, 15-13-23-33-35-15 and 15-14-24-34-35-15. Each vapor compression cycle rejects heat in a common rejection (e.g., condensation) process 35-15, and absorbs heat from the heat storage fluid flow of the second universal fluid in successive temperature ranges (e.g., 15-14, 14-13, 13-12, etc.) when the second universal fluid flows from the storage tank 109 to storage tank 108. All vapor compression cycles have a liquid injection desuperheating compression process (e.g., at 31-35, 32-35, 33-35 and 34-35, respectively).

All processes with arrow pointing to the right are evaporating processes and all processes with arrow pointing to the left are condensing processes. The liquid energy (e.g., heat) storage system of FIG. 35 includes pumping processes 54-44, 53-43 and 52-42, pressure reducing processes 14-24, 13-23 and 12-22, and liquid injection desuperheating compression processes 61-65, 61-64, 61-63, 61-62, 31-35, 32-35, 33-35 and 34-35.

Figure 36:
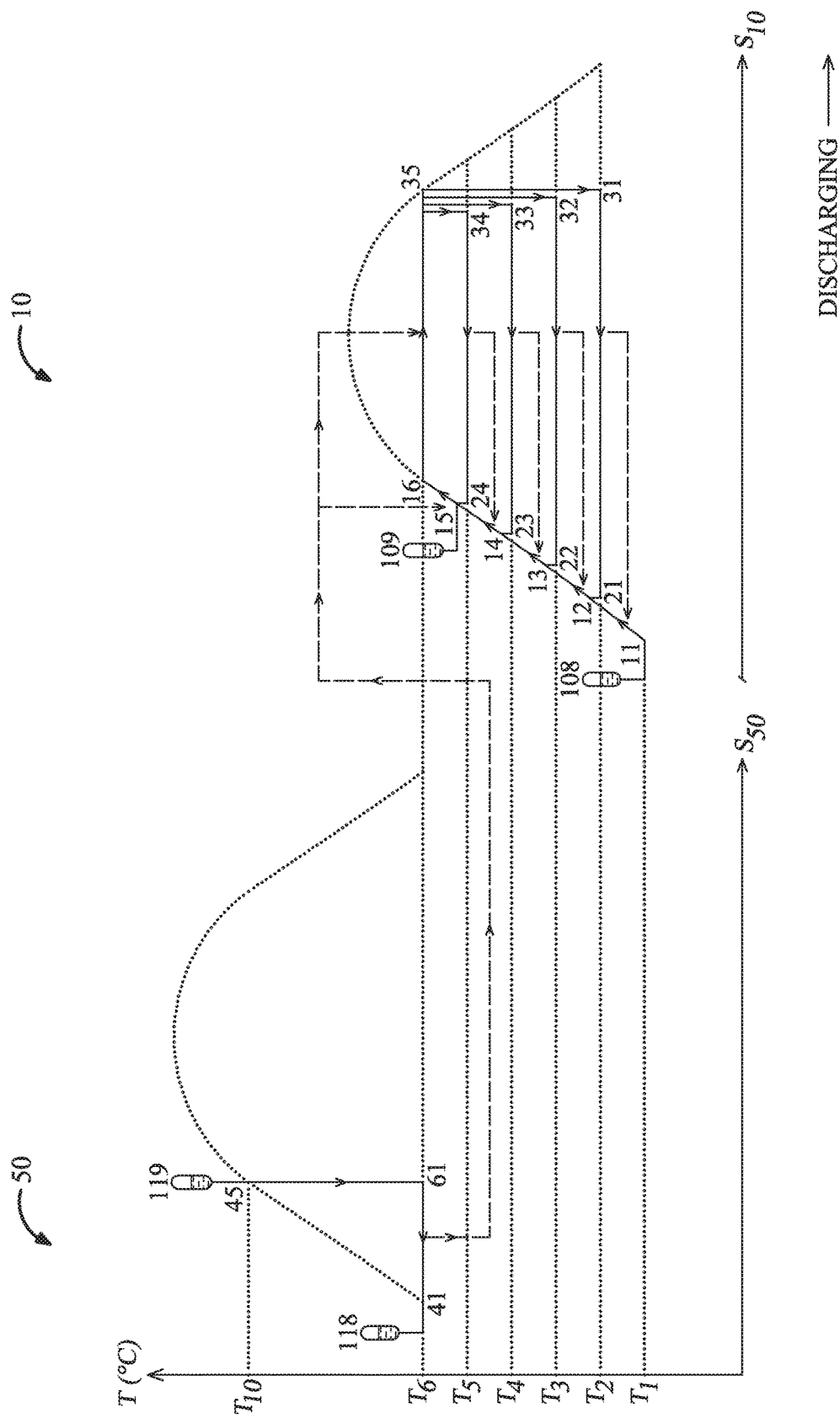
FIG. 36 shows a TS diagram of the device in FIG. 35 in discharging mode, with a flash trilateral heat engine cycle combined with an inverted sliced Rankine heat engine cycle (the inverted sliced vapor compression heat pump cycle in reverse operation) in accordance with one or more embodiments of the present invention.
Figure 37:
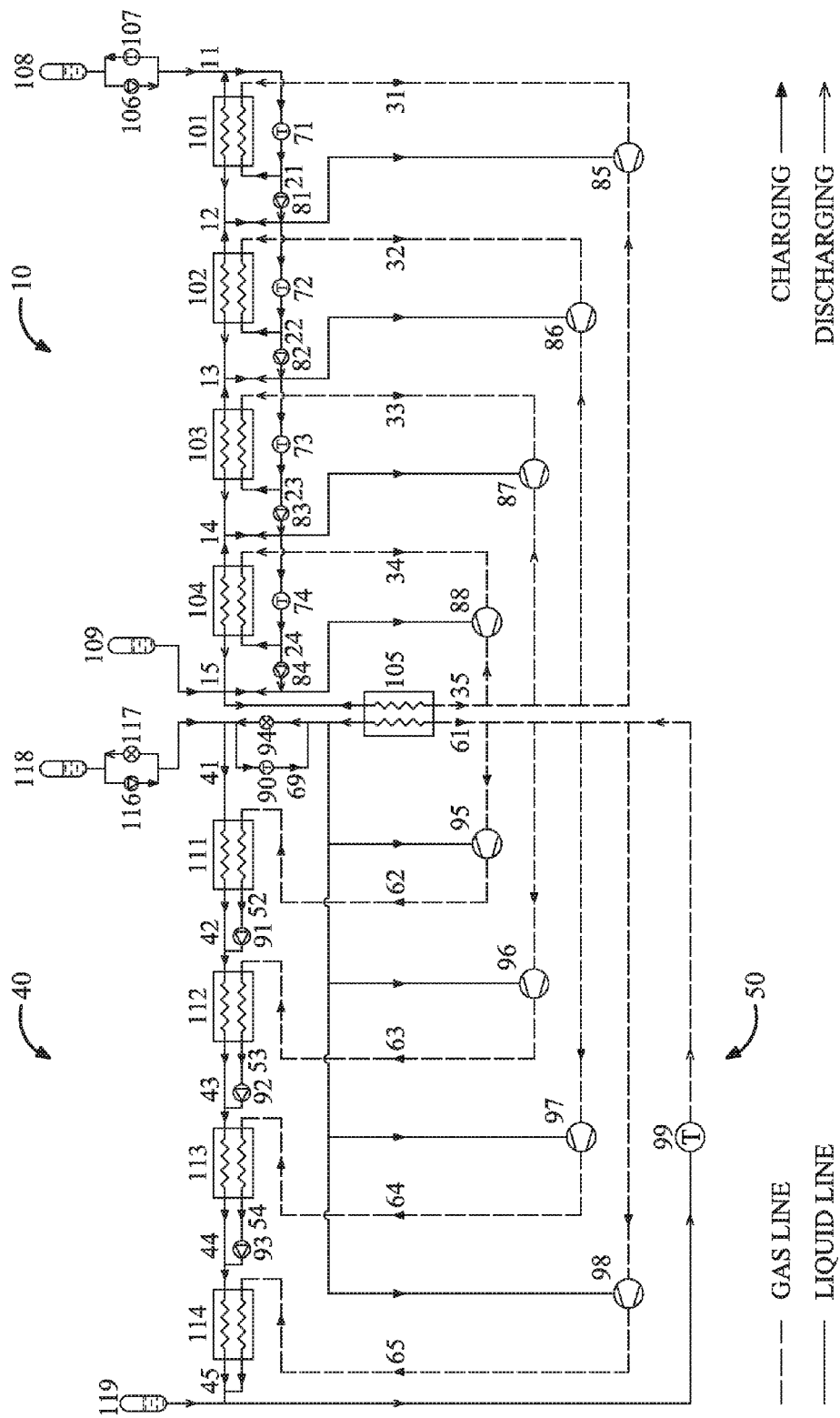
FIG. 37 shows a layout (or outlay) of hot and cold wide-temperature range heat storage devices, a sliced Rankine cycle, a reversible inverted sliced Rankine cycle, and a parallel compressor-expander configuration with liquid injection desuperheating capability and/or functionality, that implements the TS diagrams of FIGS. 35-36 in accordance with one or more embodiments of the present invention.

FIG. 36 shows a TS diagram of the liquid energy storage system described with regard to FIG. 37 in discharging mode. The STEN device 50 is a trilateral flash cycle with a first heat storage liquid from a high-pressure tank 119 that expands (e.g., in a two-phase expander) from 45 to 61 and condenses in a heat rejection process at 61-41. A first heat storage liquid in the cycle 50 is collected in a low-temperature tank 118. The heat from the condensation process 61-41 is absorbed by the process 15-16 and a common heat absorption process 16-35 in the cycle 10. The STEN device 10 includes sliced Rankine cycles 16-35-31-21-12-16, 16-35-32-22-13-16, 16-35-33-23-14-16 and 16-35-34-24-15-16. Each cycle receives heat from a common gradient heat absorption process at 15-16 and a common heat absorption (e.g., evaporation) process 16-35, and rejects heat to a second heat storage liquid from a low-temperature tank 108 over successive (e.g., successively increasing) temperature ranges (e.g., at 11-12, 12-13, 13-14 and 14-15), and the second heat storage liquid is collected in a high-temperature tank 109.

FIG. 37 shows a layout of an exemplary energy storage and retrieval system implanting the diagrams in FIGS. 35 and 36. The energy storage and retrieval system of FIG. 37 includes a flash cycle turbine 99 and a STEN (sliced trilateral) device 40 on the left side, and another STEN (inverted sliced trilateral) device 10 on right side. The trilateral device 50 and the inverted trilateral device 10 work as heat pumps in charging mode. The turbine 99 and the inverted trilateral device 10 work as heat engines in discharging mode. In charging mode, the energy storage and retrieval system of FIG. 37 includes liquid injected compressors 85-88 and 95-98, pumps 91-93 and 116, turbines 71-74, 90 and 107, condensers 111-114, heat exchanger 105, and evaporators 101-104. In discharging mode, the energy storage and retrieval system of FIG. 37 includes expanders 85-88 and 95-98, pumps 81-84 and 106, the turbine 99, a valve 117, evaporators 111-114, and condensers 101-104. In charging mode, the circuit 15-35 of the heat exchanger 105 is a condenser circuit and the left circuit 41-61 is an evaporating circuit. The situation is reversed in discharging mode. When the heat storage system is fully charged, the tanks 119 and 108 are full or substantially full, and the tanks 118 and 109 are empty or substantially empty. The situation is reversed when the heat storage system is discharged.

The main difference between the system in FIG. 34 and the system in FIG. 37 is that the compressors and expanders in FIG. 34 (e.g., 1831-1832 and 1861-1862) work in series, but in FIG. 37, each loop has its own compressor/expander (e.g., 85-88 and 95-98).

Figure 38:
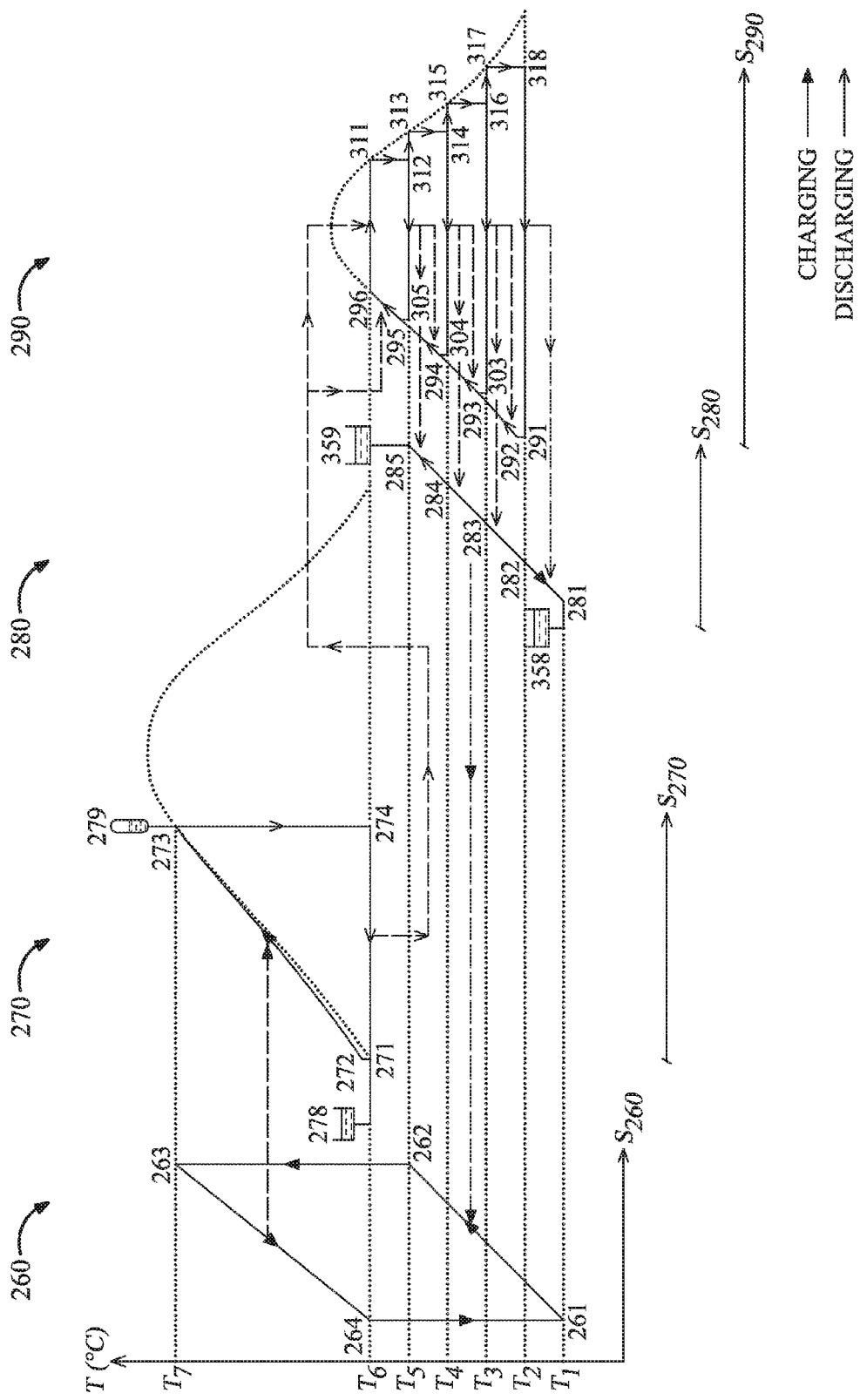
FIG. 38 shows a TS diagram of a wide-temperature range heat storage device including a Brayton charging cycle and a combined trilateral and STEN device discharging cycle in accordance with one or more embodiments of the present invention.

FIG. 38 shows a TS diagram of a thermal energy storage and retrieval system comprising a Brayton cycle 260, a warm thermal energy storage subsystem 270, a cool thermal energy storage subsystem 280, and a STEN device 290. The STEN device 290 is a sliced Rankine cycle that operates as a heat engine, and only in the discharging mode. The Brayton cycle 260 is a heat pump that operates only in the charging mode.

In the charging mode, a gradient heat transfer (e.g., heat absorption) process occurs at 261-262 (e.g., from the cool thermal energy storage subsystem 280) in the Brayton cycle 260. An adiabatic compression process occurs at 262-263. A heat rejection process occurs at 263-264 (e.g., to the warm thermal energy storage subsystem 270). An expansion process occurs at 264-261. Heat from the gradient heat rejection process at 263-264 is transferred to the warm heat storage fluid at 272-273. Heat from the heat storage fluid at 285-281 in the cool thermal energy storage subsystem 280 is transferred to the gradient heat absorption process at 261-262. A pumping process occurs at 271-272 in the warm thermal energy storage subsystem 270.

In the discharging mode, the warm thermal energy storage subsystem 270 operates as a heat engine similarly to a trilateral cycle (such as a flash cycle) at 273-274-271. An adiabatic expansion process (e.g., from a turbine) occurs at 273-274. Energy may be recovered from the turbine, for example in the form of electricity generation. A condensation process with heat rejection occurs at 274-271. Heat from the condensation process at 274-271 is transferred to the gradient heat absorption and evaporation processes at 295-296 and 296-311, respectively, in the STEN device 290. In cycle 290, a pumping process occurs at each of 291-292, 303-293, 304-294 and 305-295. Gradient heat absorption processes occur at 292-293, 293-294, 294-295 and 295-296. An adiabatic expansion process occurs at each of 311-312, 313-314, 315-316 and 317-318 (e.g. from turbines). Condensation processes with heat rejection at various different temperatures and pressures (e.g., at successively decreasing temperatures and pressures) occur at 312-305, 314-304, 316-303 and 318-291. Heat from the condensation process at 312-305 is transferred to the gradient heat absorption processes (e.g., the working fluid in the STEN cycle 290) at 294-295 and to the cool heat storage fluid at 284-285. Heat from the condensation process at 314-304 is transferred to the gradient heat absorption processes at 293-294 and to the cool heat storage fluid at 283-284. Heat from the condensation process at 316-303 is transferred to the gradient heat absorption processes at 292-293 and to the cool heat storage fluid at 282-283. Heat from the condensation process at 318-291 is transferred to the cool heat storage fluid in the gradient heat absorption process at 281-282. Separation processes (e.g., liquid, gas-liquid mixture, or gas separation processes) occur at 312-313, 314-315, and 316-317.

The thermal energy storage and retrieval system of FIG. 38 has four advantages. First, 70% (or about 70%) of the charging can be done in about a four-hour period around midday (e.g., noon) in a photovoltaic (PV) plant with fixed panels. The system can be made and/or implemented with inexpensive and powerful dual compressor-expander devices. Second, the losses in the compressor are generally high-temperature heat, which is useful in the heat storage subsystem. Third, the relatively lower efficiency of the Brayton charging cycle has no significant influence on the total cost of ownership of the system since only the charging cost is influenced, and not the cost of the energy storage (which is generally the more expensive part of the system). Fourth, the discharging cycle can be up to 18 hours long, and can be made and/or implemented with a high-efficiency combined trilateral cycle and STEN device.

Figure 39:
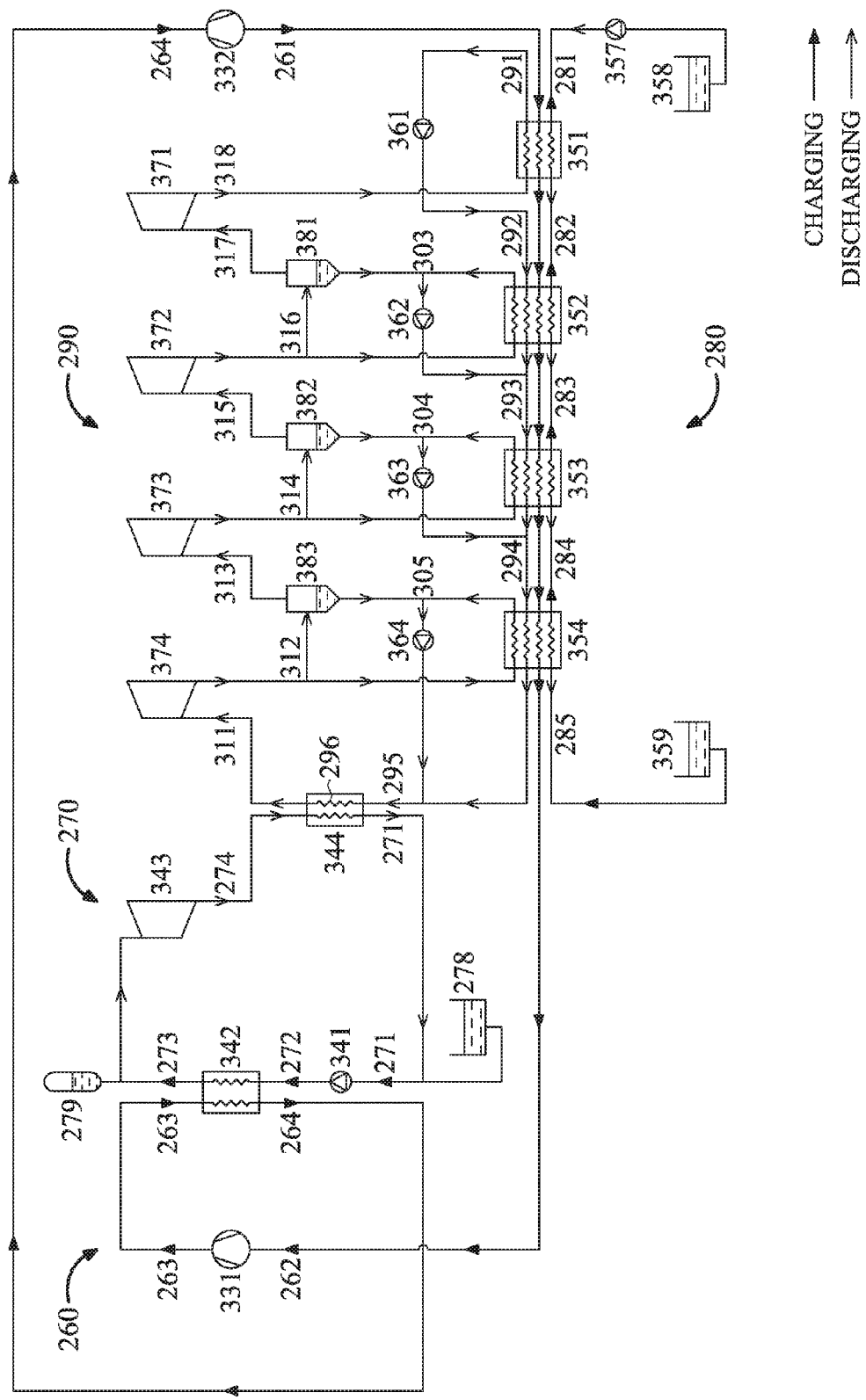
FIG. 39 shows a layout (or outlay) of hot and cold wide-temperature range heat storage devices with bubbler-based combined desuperheaters and heat exchangers in accordance with one or more embodiments of the present invention.

FIG. 39 shows a layout of the Brayton cycle 260, the warm thermal energy storage subsystem 270, the cool thermal energy storage subsystem 280, and the STEN device 290 of FIG. 38. In charging mode, the Brayton cycle 260 includes heat exchangers 351-354, compressor 331, heat exchanger 342, and expander 332. The warm thermal energy storage subsystem 270 includes pump 341, heat exchanger 342 and tanks 278 and 279. The cool thermal energy storage and retrieval subsystem 280 includes pump 357 and tanks 358 and 359.

In discharging mode, the warm thermal energy storage subsystem 270 includes turbine 343 and heat exchanger 344. The STEN device 290 includes pumps 361-364, heat exchangers 351-354 and 344, turbines 371-374, and liquid-gas separators 381-383. The cool thermal energy storage and retrieval subsystem 280 includes pump 357 and tanks 358 and 359. When the cool thermal energy storage and retrieval subsystem 280 is fully charged, the tank 358 is full or substantially full, and the tank 359 is empty or substantially empty. The situation is reversed when the cool thermal energy storage and retrieval subsystem 280 is discharged.

Figure 40:
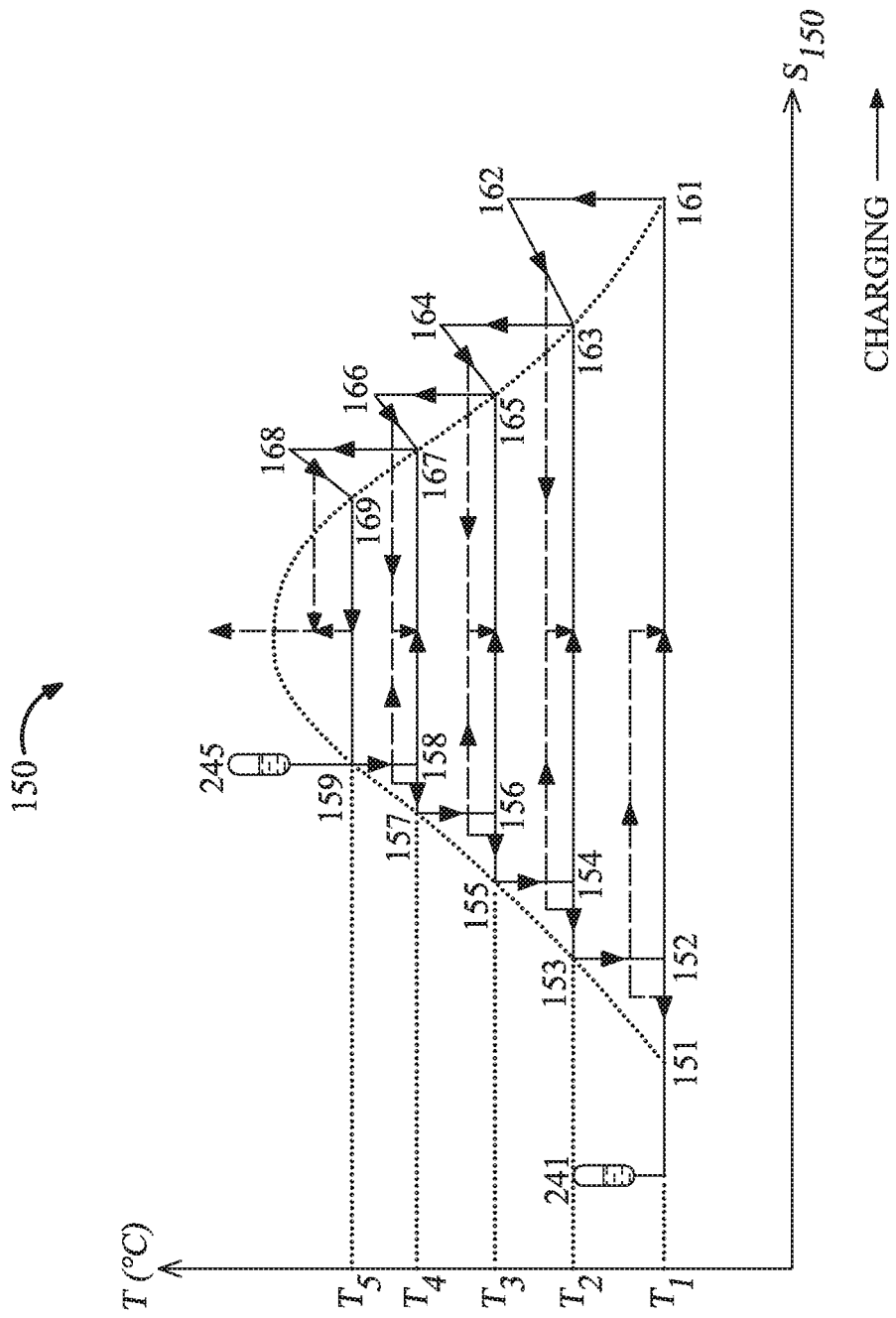
FIG. 40 shows a TS diagram of a wide-temperature range cold heat storage STEN device in charging mode with bubbler-based combined desuperheaters and heat exchangers in accordance with one or more embodiments of the present invention.

FIG. 40 is a TS diagram of an exemplary STEN device 150 (e.g., a sliced thermodynamic cycle) in charging mode. Adiabatic compression processes occur at 161-162, 163-164, 165-166, and 167-168. Adiabatic expansion processes occur at 153-152, 155-154, 157-156, and 159-158. Heat from the process at 152-151 is transferred to the process at 152-161. Heat from each of the process at 154-153 and the process at 162-163 is transferred to the evaporation process at 154-163. Heat from each of the process at 156-155 and the process at 164-165 is transferred to the evaporation process at 156-165. Heat from each of the process at 158-157 and the process at 166-167 is transferred to the evaporation process at 158-167. Heat from each of the process at 168-169 and the process at 169-159 is transferred to a tank 961 in a thermal energy storage and retrieval system 920.

Figure 41:
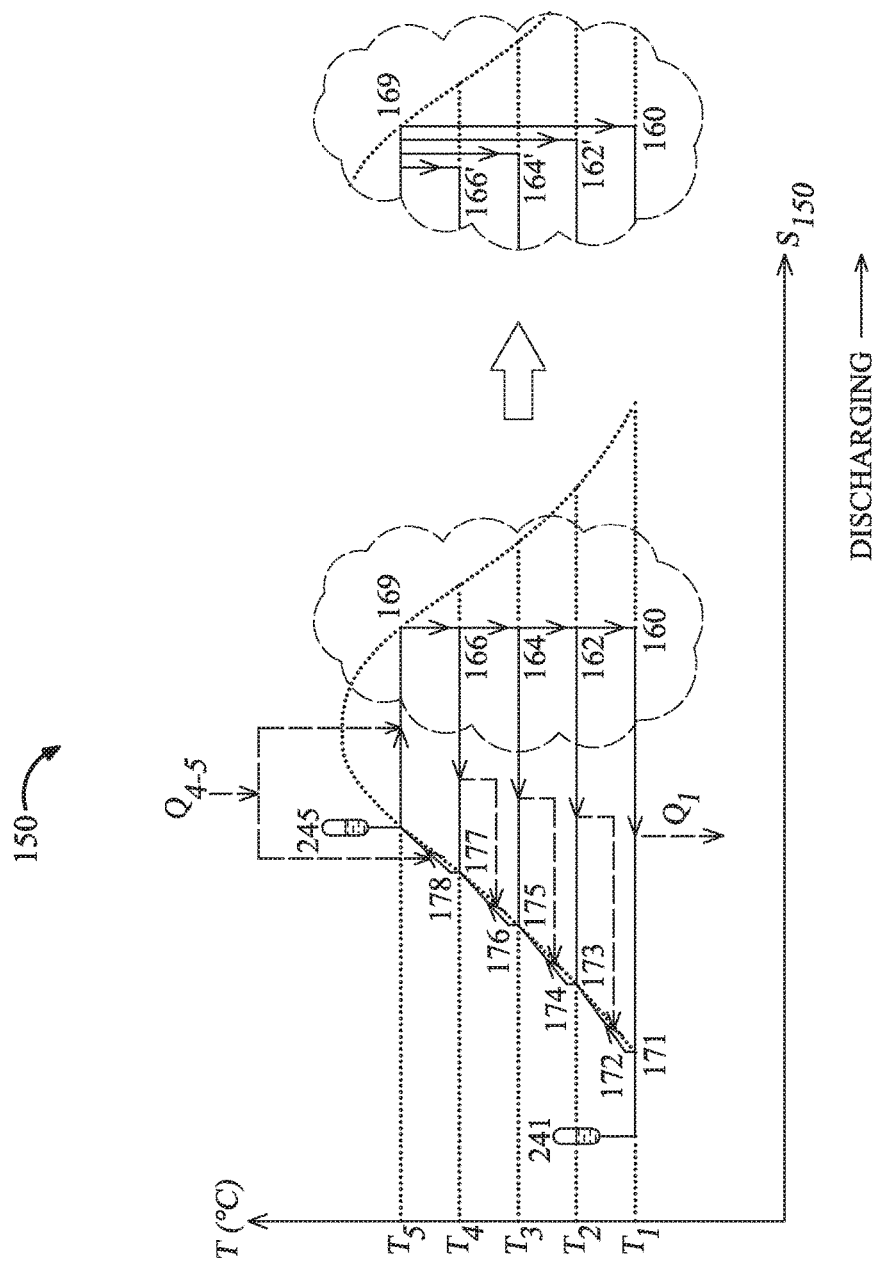
FIG. 41 shows a TS diagram of a wide-temperature range heat storage STEN device in discharging mode with bubbler-based combined desuperheaters and heat exchangers in accordance with one or more embodiments of the present invention.

FIG. 41 is a TS diagram of the exemplary STEN device 150 in discharging mode. Adiabatic expansion processes occur at 169-166, 166-164, 164-162 and 162-160. An isothermal condensation process occurs at 160-171. An isothermal condensation process occurs at 162-173, where heat is transferred to the process 172-173. An isothermal condensation process occurs at 164-175, where heat is transferred to the process 174-175. An isothermal condensation process occurs at 166-177, where heat is transferred to the process 176-177. Pumping processes occur at 171-172, 173-174, 175-176 and 177-178. Gradient heat absorption processes occur at 172-173, 174-175, 176-177 and 178-169. The part of the drawing to the right showing 169, 166', 164', 162' and 160 shows an alternative in which the adiabatic expansion processes are in parallel, and can be a substitute for the serial adiabatic expansion processes 169-160 described above.

Figure 42:
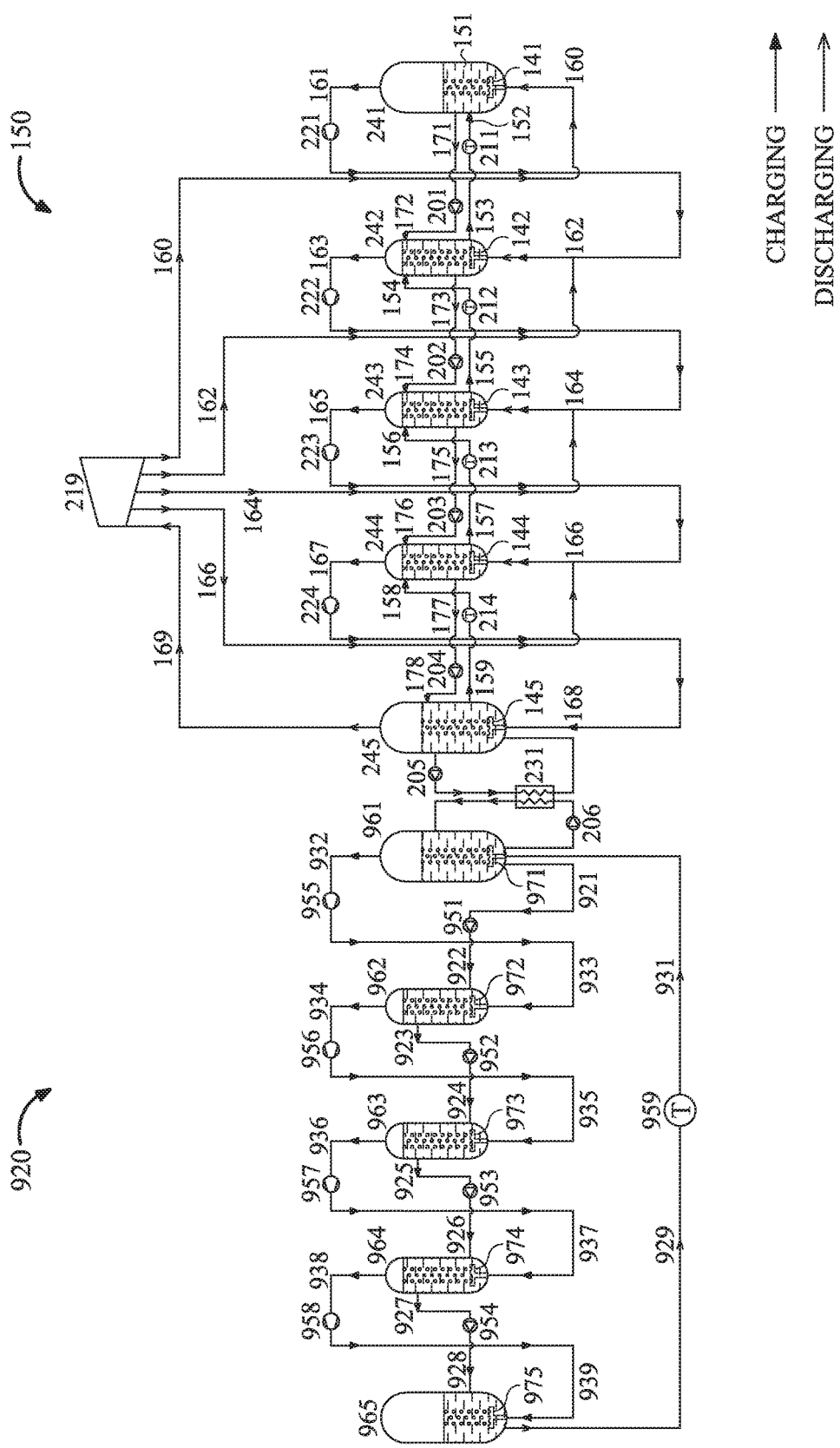
FIG. 42 shows a layout (or outlay) of hot and cold wide-temperature range heat storage devices with bubbler-based combined desuperheaters and heat exchangers that implements the TS diagrams of FIGS. 40-41 in accordance with one or more embodiments of the present invention.

FIG. 42 shows a layout of a liquid heat storage system implementing the exemplary STEN device 150 in FIGS. 40 and 41 and the thermal energy storage and retrieval system 920 in charging and discharging modes. The STEN device 150 includes pumps 201-205, turbines 211-214, heat exchangers 241-245 and 231, gas ejectors or distributors 141-145, compressors 221-224, and multi-stage turbine 219. The turbine 219 may be a steam tap turbine adapted for use in a Rankine cycle, and can be substituted with parallel turbines, such as turbines 85-88 in FIG. 37, or serial turbines, such as turbines 373-371 in FIG. 39. The heat exchangers 241-245 generally comprise bubblers or tanks in which the heat exchange occurs at a gas-liquid interface in the bubbler or tank. The thermal energy storage and retrieval system 920 includes pumps 951-954 and 206, heat exchangers 961-965, gas ejectors or distributors 971-975, compressors 955-958, and turbine 959. The heat exchangers 961-965 comprise bubblers or tanks similar or identical to heat exchangers 241-245.

The advantages of the bubble tanks 961-965 include forming the liquid line, the condensing process and the superheating/desuperheating all in the same tank, avoiding any need for a separate or external heat exchanger, facile control of the liquid line flow (level control), and automatic desuperheating (which means less power is consumed by or for the compressor[s]).

Figure 43:
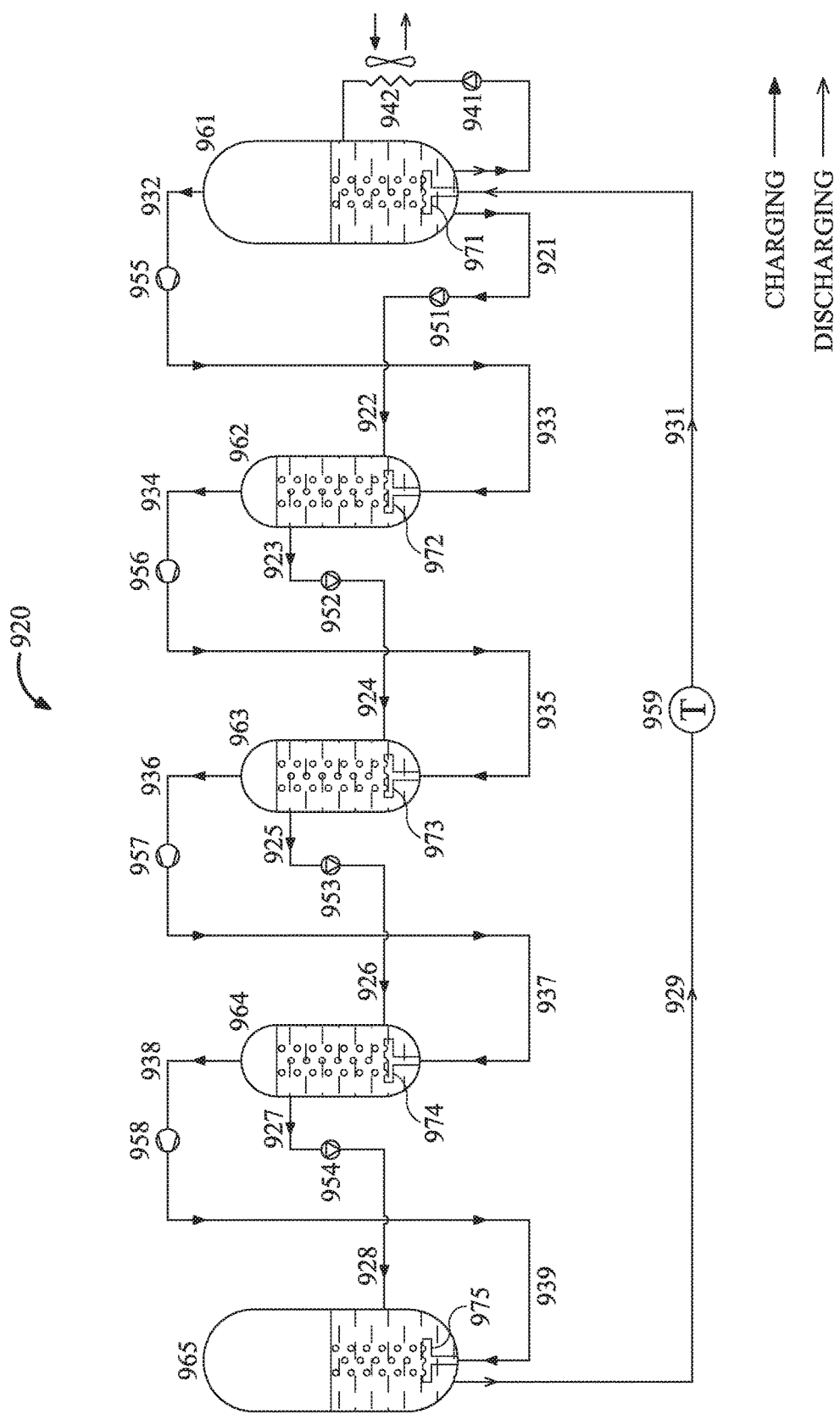
FIG. 43 shows a layout (or outlay) of a hot wide-temperature range heat storage device with bubbler-based combined desuperheaters and heat exchangers in accordance with one or more embodiments of the present invention.

FIG. 43 shows a layout of the thermal energy storage and retrieval system 920. In charging mode, the thermal energy storage and retrieval system 920 includes pumps 941 and 951-954, heat exchangers 942 and 961-965, gas ejectors or distributors 971-975, and compressors 955-958. The heat exchangers 961 and 965 are also heat storage tanks. In discharging mode, the thermal energy storage and retrieval system 920 includes the turbine 959, heat exchanger 942 and pump 941. The heat exchanger 942 exchanges heat with an environment (e.g., an external environment, such as outdoor air, or an internal environment, such as the inside of a house). In charging mode, the heat exchanger 942 absorbs heat from the environment, and in the discharging mode, the heat exchanger 942 rejects heat to the environment. Thus, the thermal energy storage and retrieval system 920 can function as a cooling system for an internal environment in the charging mode, and as a heating system for the internal environment in the discharging mode.

In the present disclosure, some of the expanders can also work as compressors and vice versa (except certain compressors with check valves), and all intake ports can switch to exhaust ports and vice versa, and generally, all cycles and circuits are reversible (i.e., in which the fluid flow may be in either of two opposite directions). Alternatively, an expander can be transformed to a compressor and vice versa by keeping the rotation direction of the piston and cylinder and changing the port connections, or changing the timing of the opening and closing of the ports.

CONCLUSIONS

The present invention relates to thermal energy storage and retrieval systems and devices. The present thermal energy storage and retrieval device includes a working fluid and a plurality of thermodynamic circuits. Every thermodynamic circuit has a first phase change process exchanging heat with a first material in a first temperature range common for all of the thermodynamic circuits. Every thermodynamic circuit has a second phase change process exchanging heat with a liquid in a second temperature range. the second temperature range for each thermodynamic circuit does not overlap with that of the other thermodynamic circuits except at most at one or more endpoints. The second temperature ranges from the thermodynamic circuits constitute together a continuous temperature range in which the device exchanges heat with the liquid. Each thermodynamic circuit includes a gas pressure changing device and a liquid pressure changing device.

The present thermal energy storage and retrieval systems and devices enable wide, flexible operating temperature range(s) and operating pressure range(s), a wide variety of working and heat storage fluids and fluid mixtures, and device reversibility for heat storage cycles in PV power plants and wind turbines. For example, the heat storage liquid may comprise a liquid metal mixture in a reversible gradient heat storage system. In examples of the present thermal energy storage and retrieval systems and devices that include sliced Rankine (and/or other) cycles, different fluids may be used in a reversible system to optimize efficiency in thermal energy storage and retrieval.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A sliced thermodynamic engine (STEN) device having at least one working fluid and a plurality of thermodynamic circuits, wherein:
   a. each thermodynamic circuit in said STEN device has a first isothermal process exchanging heat with a first material in a first temperature range and at a first pressure, the first temperature range and the first pressure being common for all of said thermodynamic circuits;
   b. each thermodynamic circuit in said STEN device has a gradient process exchanging heat with a second material in a second temperature range and at a second pressure, wherein said second material comprises a heat storage material or a working fluid in another circuit or another device, said second temperature range is lower than said first temperature range, and said second pressure is lower than said first pressure; and
   c. each thermodynamic circuit in said STEN device includes a gas pressure changing device and a liquid pressure changing device.

2. The STEN device of claim 1, wherein said second temperature range is different for each thermodynamic circuit.

3. The STEN device of claim 1, wherein each thermodynamic circuit in said STEN device has a second process and a working fluid, and in all except one of said thermodynamic circuits, said second material includes the working fluid in the second process.

4. The STEN device of claim 1, operating as a heat pump, wherein said second material includes a cold heat energy storage material.

5. The STEN device of claim 1, operating as a heat engine, wherein second material includes a cold heat energy storage material.

6. The STEN device of claim 1, wherein the STEN device is reversible and works as a heat pump in a forward mode and as a heat engine in reverse mode, wherein said second material includes a cold heat energy storage material.

7. A combined device, comprising:
   a. the STEN device of claim 1; and
   b. a second STEN device having at least one second working fluid and a plurality of second thermodynamic circuits, wherein:
      i. at least one of the second thermodynamic circuits has a third process exchanging heat with the first isothermal process;
      ii. at least one of the one or more second thermodynamic circuits has a fourth process exchanging heat with a third material; and
      iii. each second thermodynamic circuit includes a gas pressure changing device and a liquid pressure changing device.

8. The combined device of claim 7, wherein one of the gradient and fourth processes exchanges heat with a warm heat energy storage material, and another one of the gradient and fourth processes exchanges heat with a cold heat energy storage material.

9. The combined device of claim 8, operating as a heat pump.

10. The combined device of claim 8, operating as a heat engine.

11. The combined device of claim 8, wherein the combined device is reversible and operates as a heat pump in charging mode and as a heat engine in discharging mode.

12. A combined device, comprising the STEN device of claim 1 and a trilateral thermodynamic device having a second isothermal process, wherein the first isothermal process exchanges heat with the second isothermal process.

13. The combined device of claim 12, wherein said trilateral thermodynamic device has a high pressure process, the high pressure process in said trilateral thermodynamic device exchanges heat with a warm heat storage material, and said gradient process in said STEN device exchanges heat with a cold heat storage material.

14. The combined device of claim 12, operating as a heat pump.

15. The combined device of claim 12, operating as a heat engine.

16. The combined device of claim 12, wherein the combined device is reversible and operates as a heat pump in charging mode and as a heat engine in discharging mode.

17. The combined device of claim 15, comprising a reversible Brayton cycle device charging a warm heat storage material in discharging mode and a cold heat storage material in charging mode.

18. The STEN device of claim 1, wherein the first isothermal process comprises an isobaric, isothermal process.

19. The STEN device of claim 18, wherein the gradient process comprises an isobaric gradient process.

* * * * *